United States Patent
Meaney et al.

(10) Patent No.: US 8,631,326 B2
(45) Date of Patent: Jan. 14, 2014

(54) SEGMENTED TIMELINE FOR A MEDIA-EDITING APPLICATION

(75) Inventors: Brian Meaney, San Jose, CA (US); Melissa Breglio, San Francisco, CA (US); Mike Stern, San Francisco, CA (US); Jerremy Holland, Los Altos Hills, CA (US); Dave Cerf, San Francisco, CA (US); Colleen Pendergast, Livermore, CA (US); Peter A. Steinauer, San Francisco, CA (US); Michaelle Stikich, San Francisco, CA (US); Charles Lyons, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 767 days.

(21) Appl. No.: 12/551,559

(22) Filed: Aug. 31, 2009

(65) Prior Publication Data

US 2010/0281383 A1 Nov. 4, 2010

Related U.S. Application Data

(60) Provisional application No. 61/227,070, filed on Jul. 20, 2009, provisional application No. 61/174,491, filed on Apr. 30, 2009, provisional application No. 61/174,490, filed on Apr. 30, 2009.

(51) Int. Cl.
  *G06F 3/0481* (2013.01)
(52) U.S. Cl.
  USPC ............ 715/723; 715/721; 715/731; 715/853
(58) Field of Classification Search
  USPC .................................. 715/723, 721, 731, 853
  See application file for complete search history.

(56) References Cited

U.S. PATENT DOCUMENTS

| | | |
|---|---|---|
| 5,442,744 A | 8/1995 | Piech et al. |
| 5,519,828 A | 5/1996 | Rayner |
| 5,613,909 A | 3/1997 | Stelovsky |
| 5,659,539 A | 8/1997 | Porter et al. |
| 5,664,216 A | 9/1997 | Blumenau |
| 5,682,326 A | 10/1997 | Klingler et al. |
| 5,781,188 A | 7/1998 | Amiot et al. |
| 5,893,062 A | 4/1999 | Bhadkamkar et al. |
| 5,930,446 A | 7/1999 | Kanda |
| 6,057,833 A | 5/2000 | Heidmann et al. |

(Continued)

FOREIGN PATENT DOCUMENTS

| | | |
|---|---|---|
| GB | 2464123 | 4/2010 |
| WO | WO 2007/120694 | 10/2007 |
| WO | WO 2010/106586 | 9/2010 |

OTHER PUBLICATIONS

U.S. Appl. No. 12/551,557, filed Aug. 31, 2009, Meaney, Brian, et al.

(Continued)

*Primary Examiner* — Namitha Pillai
(74) *Attorney, Agent, or Firm* — Adeli & Tollen LLP

(57) ABSTRACT

Some embodiments provide a method that receives a timeline that includes several pieces of content. The method receives user input to divide the timeline into hierarchical segments of varying duration. The method defines associations between the pieces of content and at least one hierarchical level of the segments. In some embodiments, the method is performed by a media-editing application and the pieces of content are media clips inserted into the timeline by a user.

14 Claims, 60 Drawing Sheets

(56) References Cited

U.S. PATENT DOCUMENTS

| | | | |
|---|---|---|---|
| 6,154,600 A | 11/2000 | Newman et al. | |
| 6,154,601 A | 11/2000 | Yaegashi et al. | |
| 6,161,115 A | 12/2000 | Ohanian | |
| 6,204,840 B1 | 3/2001 | Petelycky et al. | |
| 6,324,335 B1 | 11/2001 | Kanda | |
| 6,539,163 B1 | 3/2003 | Sheasby et al. | |
| 6,544,294 B1 | 4/2003 | Greenfield et al. | |
| 6,546,188 B1 | 4/2003 | Ishii et al. | |
| 6,628,303 B1 | 9/2003 | Foreman et al. | |
| 6,650,826 B1 | 11/2003 | Hatta | |
| 6,658,194 B1 | 12/2003 | Omori | |
| 6,674,955 B2 | 1/2004 | Matsui et al. | |
| 6,744,968 B1 | 6/2004 | Imai et al. | |
| 6,928,613 B1 | 8/2005 | Ishii et al. | |
| 6,956,574 B1 | 10/2005 | Cailloux et al. | |
| 6,965,723 B1 | 11/2005 | Abe et al. | |
| 7,020,381 B1 | 3/2006 | Kato et al. | |
| 7,035,435 B2 | 4/2006 | Li et al. | |
| 7,043,137 B2 | 5/2006 | Slone | |
| 7,207,007 B2 | 4/2007 | Moriwake et al. | |
| 7,313,755 B2 | 12/2007 | Rahman et al. | |
| 7,325,199 B1 | 1/2008 | Reid | |
| 7,362,946 B1 | 4/2008 | Kowald | |
| 7,398,002 B2 | 7/2008 | Hsiao et al. | |
| 7,432,940 B2 | 10/2008 | Brook et al. | |
| 7,437,674 B2 | 10/2008 | Chen | |
| 7,444,593 B1 | 10/2008 | Reid | |
| 7,546,532 B1 | 6/2009 | Nichols et al. | |
| 7,623,755 B2 | 11/2009 | Kuspa | |
| 7,653,550 B2 | 1/2010 | Schulz | |
| 7,668,869 B2 | 2/2010 | Weinberger et al. | |
| 7,669,130 B2 | 2/2010 | Agarwal et al. | |
| 7,710,439 B2 | 5/2010 | Reid et al. | |
| 7,805,678 B1 | 9/2010 | Niles et al. | |
| 7,836,389 B2 | 11/2010 | Howard et al. | |
| 7,889,975 B2 | 2/2011 | Slone | |
| 8,006,186 B2 * | 8/2011 | Kellock et al. | 715/728 |
| 2001/0020953 A1 | 9/2001 | Moriwake et al. | |
| 2001/0036356 A1 | 11/2001 | Weaver et al. | |
| 2002/0023103 A1 | 2/2002 | Gagne | |
| 2002/0154140 A1 | 10/2002 | Tazaki | |
| 2002/0154156 A1 | 10/2002 | Moriwake et al. | |
| 2002/0156805 A1 | 10/2002 | Schriever et al. | |
| 2003/0001880 A1 | 1/2003 | Holtz et al. | |
| 2003/0002851 A1 | 1/2003 | Hsiao et al. | |
| 2003/0117431 A1 | 6/2003 | Moriwake et al. | |
| 2004/0027369 A1 | 2/2004 | Kellock et al. | |
| 2004/0090462 A1 | 5/2004 | Graham | |
| 2004/0125124 A1 | 7/2004 | Kim et al. | |
| 2004/0201609 A1 | 10/2004 | Obrador | |
| 2006/0008247 A1 | 1/2006 | Minami et al. | |
| 2006/0277454 A1 | 12/2006 | Chen | |
| 2007/0154190 A1 | 7/2007 | Gilley et al. | |
| 2007/0189708 A1 | 8/2007 | Lerman et al. | |
| 2007/0262995 A1 | 11/2007 | Tran | |
| 2008/0044155 A1 | 2/2008 | Kuspa | |
| 2009/0100339 A1 | 4/2009 | Wharton-Ali et al. | |
| 2010/0281381 A1 | 11/2010 | Meaney et al. | |
| 2010/0281382 A1 | 11/2010 | Meaney et al. | |
| 2010/0287475 A1 | 11/2010 | van Zwol et al. | |

OTHER PUBLICATIONS

U.S. Appl. No. 12/551,558, filed Aug. 31, 2009, Meaney, Brian, et al.

Adobe Premiere Elements 7, "Arranging clips in the Sceneline", http://help.adobe.com/en_US/PremiereElements/7.0/WSB04491A8-859D-41e7-975F-0E26B9AECB9B.html, NPL Date Unknown.

"Video Browsing with Fischlar", http://www.computing.dcu.ie/~hlee/FischlarUldescription/FischlarFamily2.html, NPL Date Unknown.

Myers, Brad A., et al., "A Multi-View Intelligent Editor for Digital Video Libraries", The First ACM+IEEE Joint Conference on Digital Libraries (JCDL'01), Jun. 24-28, 2001, Roanoke, VA, 10 pages, available at http://www.informedia.cs.cmu.edu/documents/dl2001paper.pdf.

Author Unknown, "Editing Stereoscopic 3D Video in Vegas Pro 9", Workflow Paper, Apr. 2, 2010, pp. 1-6, Sony Creative Software Inc., Madison, WI, USA.

Casares, Juan, et al., "Simplifying Video Editing Using Metadata," Proceedings of Designing Interactive Systems (DIS 2002), Jun. 2002, pp. 157-166, London, United Kingdom.

Diakopoulos, Nicholas, et al., "Videotater: An Approach for Pen-Based Digital Video Segmentation and Tagging," Proceedings of the $19^{th}$ Annual ACM Symposium on User Interface Software and Technology (UIST'06), Oct. 15-18, 2006, pp. 221-224, Montreux, Switzerland.

Long, A. Chris, et al., "Video Editing Using Lenses and Semantic Zooming," Month N/A, 2002, pp. 1-9, Carnegie Mellon University, Pittsburgh, PA, USA.

Updated portions of prosecution history of U.S. Appl. No. 12/551,557, Jun. 5, 2012, Meaney, Brian, et al.

Updated portions of prosecution history of U.S. Appl. No. 12/551,558, Apr. 4, 2012, Meaney, Brian, et al.

Portions of prosecution history of U.S. Appl. No. 12/551,557, Mar. 7, 2012, Meaney, Brian, et al.

Portions of prosecution history of U.S. Appl. No. 12/551,558, Jan. 10, 2012, Meaney, Brian, et al.

Author Unknown, "Adobe Premiere Pro CS3: User Guide," Month Unknown, 2007, 455 pages, Adobe Systems Incorporated, San Jose, California, USA.

Author Unknown, "Adobe Director 11: User Guide," Month Unknown, 2008, 498 pages, Adobe Systems Incorporated, San Jose, California, USA.

Author Unknown, "Apple Announces Final Cut Pro 4," NAB, Apr. 6, 2003, pp. 1-3, Apple Inc., Las Vegas, Nevada, USA.

Author Unknown, "iMovie '08 Getting Started," Month Unknown, 2008, pp. 1-50, Apple Inc., USA.

Author Unknown, "Using Adobe Flash CS4 Professional," Month Unknown, 2008, 474 pages, Adobe Systems Incorporated, San Jose, California, USA.

Author Unknown, "Using Adobe Premiere Elements 8 Editor," Month Unknown, 2009, 313 pages, Adobe Systems Incorporated, San Jose, California, USA.

Brenneis, Lisa, "Final Cut Pro 3 for Macintosh: Visual QuickPro Guide," Apr. 2002, 288 pages, Peachpit Press, Berkeley, California, USA.

Wang, Yijin, et al. "My Videos—A System for Home Video Management," Proceedings of the 10th ACM International Conference on Multimedia, Dec. 1-6, 2002, pp. 412-413, Juan-les-Pins, France.

* cited by examiner

SEGMENTED TIMELINE FOR A MEDIA-EDITING APPLICATION

CLAIM OF BENEFIT TO PRIOR APPLICATION

This application claims the benefit of U.S. Provisional Application 61/227,070, entitled "Segmented Timeline for a Media-Editing Application", filed Jul. 20, 2009, U.S. Provisional Application 61/174,491, entitled "Editing Key-Indexed Graphs in Media-Editing Applications", filed Apr. 30, 2009, and U.S. Provisional Application 61/174,490, entitled "Media Clip Auditioning Used to Evaluate Uncommitted Media Content", filed Apr. 30, 2009. U.S. Provisional Applications 61/227,070, 61/174,491, and 61/174,490 are incorporated herein by reference.

CROSS REFERENCE TO RELATED APPLICATIONS

This Application is related to the following applications: U.S. patent application Ser. No. 12/551,557 filed Aug. 31, 2009, now published as U.S. Publication No. 2010/0281381; and U.S. patent application Ser. No. 12/551,558, filed Aug. 31, 2009, now published as U.S. Publication No. 2010/0281382, now issued as U.S. Pat. No 8,533,598.

FIELD OF THE INVENTION

The invention is directed towards media editing. Specifically, the invention is directed towards a media-editing application that enables segmenting of a composite media presentation.

BACKGROUND OF THE INVENTION

Digital graphic design, image editing, audio editing, and video editing applications (hereafter collectively referred to as media content editing applications or media editing applications) provide graphical designers, media artists, and other users with the necessary tools to create a variety of media content. Examples of such applications include Final Cut Pro® and iMovie®, both sold by Apple Computer, Inc. These applications give users the ability to edit, combine, transition, overlay, and piece together different media content in a variety of manners to create a resulting media project. The resulting media project specifies a particular sequenced composition of any number of text, audio clips, images, or video content that is used to create a media presentation.

Various media editing applications facilitate such composition through electronic means. Specifically, a computer or other electronic device with a processor and computer readable storage medium executes the media content editing application. In so doing, the computer generates a graphical interface whereby editors digitally manipulate graphical representations of the media content to produce a desired result.

In many cases, the editors using a media-editing application are using it to tell a story, which will generally have a structure. This structure can be in the form of an exposition, rising action, conflict, falling action, and denouement, or it can be in the Shakespearean scene/act breakdown. However, current media-editing applications have no useful way of incorporating the structure of the story being told into either the user interface of the application or the editing process.

For example, editors will often create each scene in a presentation as a separate sequence, then copy and paste each sequence into a single master sequence for rendering. If the editor then decides to change the scene order, a very tedious process ensues as there is no structure to the master sequence.

Accordingly, there is a need in the art for a media-editing application that supports the creation and evolution of rich story structure as a natural aspect of the editing process. Ideally, such a story structure will provide a clear visual representation of the story and be useful in the editing process as well.

SUMMARY OF THE INVENTION

Some embodiments of the invention provide a hierarchically structured timeline of content (e.g., audio, video, etc.). The timeline is an arrangement of content over a period of time (e.g., audio and video clips forming a movie). In some embodiments, the hierarchical structure of the timeline includes multiple levels and is determined independent of the content. In some embodiments, different attributes and functionalities are applied differently to the multiple levels of the hierarchy.

In the multiple levels of the hierarchy, content items arranged in the timeline are at the lowest level of the hierarchy in some embodiments. Above the content items in the hierarchy are one or more levels of hierarchical structures. The structures are slices of the timeline in some embodiments. That is, each structure includes a particular duration of time in the timeline, and includes any lower-level structures (including content items) falling within that particular duration.

The slices of the timeline are user-determined in some embodiments. Users determine the length of the slices (e.g., three seconds, ten minutes, etc.) and the dividing points along the timeline between the slices. As mentioned above, these slices are determined independent of the content in the timeline. That is, there is no necessary correlation between the content and the dividing points or the length of the timeline slices.

In some embodiments, the hierarchically structured timeline is for a media-editing application. The media-editing application of some embodiments includes a display area for displaying a composite presentation that the application creates by compositing several media clips (e.g., audio clips, video clips)—the content items. The media-editing application of some embodiments also includes a composite display area for displaying at least a portion of the timeline. The timeline of some embodiments includes multiple tracks upon which are displayed graphical representations of the media clips that are part of the composite presentation. The graphical representations are displayed in such a way that the timeline provides a visual illustration of how the media clips will be composited to create the media presentation.

Users of the media-editing application can divide the timeline into user-modifiable segments by way of a variety of operations in the composite display area. For instance, different embodiments enable users to insert segments before, after, or in the middle of a current segment, split segments in two, merge segments, etc. The segments need not line up with the media clips, and can be of arbitrary or default duration.

Once segments are defined, users can modify the duration of the segments in some embodiments through a variety of interactions. The segment durations may be modified explicitly (e.g., by moving a segment boundary in the composite display area) or implicitly (e.g., by modifying the duration of a media clip in the segment).

The segments can also be moved in the timeline in some embodiments. That is, a user can pick up a segment from a first location in the timeline and move the segment to a new location in the timeline. When a segment is moved, all of the media clips in the segment are moved with it. When clips overlap the border of a segment, different embodiments include the media clip in the segment, exclude the media clip from the segment, or only include the portion within the segment boundary (or leave the choice up to the user). When a segment is then inserted into a new location in the timeline, different embodiments have different ways of handling any overlaps between clips.

In some embodiments, users may define multiple levels of segments. Segments that are one level above the media clips may be grouped into supersegments, which may be grouped into yet a higher level. For instance, when the media presentation is a movie, the user may want to define scenes that include multiple clips and then group the scenes into acts.

Some embodiments of the media-editing application also include an outline window that displays a list of the segments defined for the media presentation as well as any supersegments or other levels for dividing the timeline. In some embodiments, each item in the list is a selectable item representing a segment. These selectable items may be used to navigate to different segments in the timeline, zoom in or out to focus on a particular segment or segments, create new segments, hide a segment from view, move segments, etc.

In addition to the outline window, some embodiments of the media-editing application include a clip library area for displaying representations of media clips that are not in the timeline (and thus not a part of the composite media presentation). In some embodiments, the clip library includes folders that match up with the various items in the hierarchy (i.e., the segments, supersegments, etc.). Users can place a particular media clip in a particular folder in the clip library to associate the particular clip with the particular hierarchical item represented by the particular folder, without assigning the particular clip to the composite presentation itself.

As mentioned above, different attributes and functionalities are applied differently to different levels of the hierarchy in some embodiments. In the case of the media-editing application, different attributes and functionalities are applied differently to media clips, segments (e.g., scenes), and supersegments (e.g., acts), and any other levels of hierarchy. For instance, media clips and segments may be displayed in the timeline, while supersegments and any higher levels of hierarchy are only displayed in the outline window. A media clip may be split among two or more segments, while each segment must be fully contained within one supersegment in some embodiments. Various other functionalities and attributes (e.g., how the items may be edited) are applied differently to the different levels in some embodiments as well.

The segments have a variety of uses for an editor that is using the media-editing application to create composite media presentations. In various embodiments, segments can be copied and pasted within a particular media presentation or from one media presentation to the next. In some embodiments, a media presentation can include multiple versions of a particular segment (e.g., if an editor is creating multiple different versions or debating which version of a scene to use for the final product). Some embodiments of the media-editing application allow a user to flag a segment such that the segment is not rendered with the composite media presentation. Segments can also be used to impose timing requirements, such as the time between commercial breaks for a television show. Along this line, some embodiments include libraries of preset groups of segments based on timing, story arc, etc.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. For instance, many of the examples illustrate a timeline spanned by two audio and two video tracks. One of ordinary skill will realize that this is merely an illustrative example, and that the invention can apply to timelines with only one track, many tracks, different groups of tracks, etc.

Some embodiments provide a hierarchically structured timeline of content (e.g., audio, video, etc.). The timeline is an arrangement of content over a period of time (e.g., audio and video clips forming a movie). In some embodiments, the hierarchical structure of the timeline includes multiple levels and is determined independent of the content. In some embodiments, different attributes and functionalities are applied directly to the multiple levels of the hierarchy.

Figure 1:
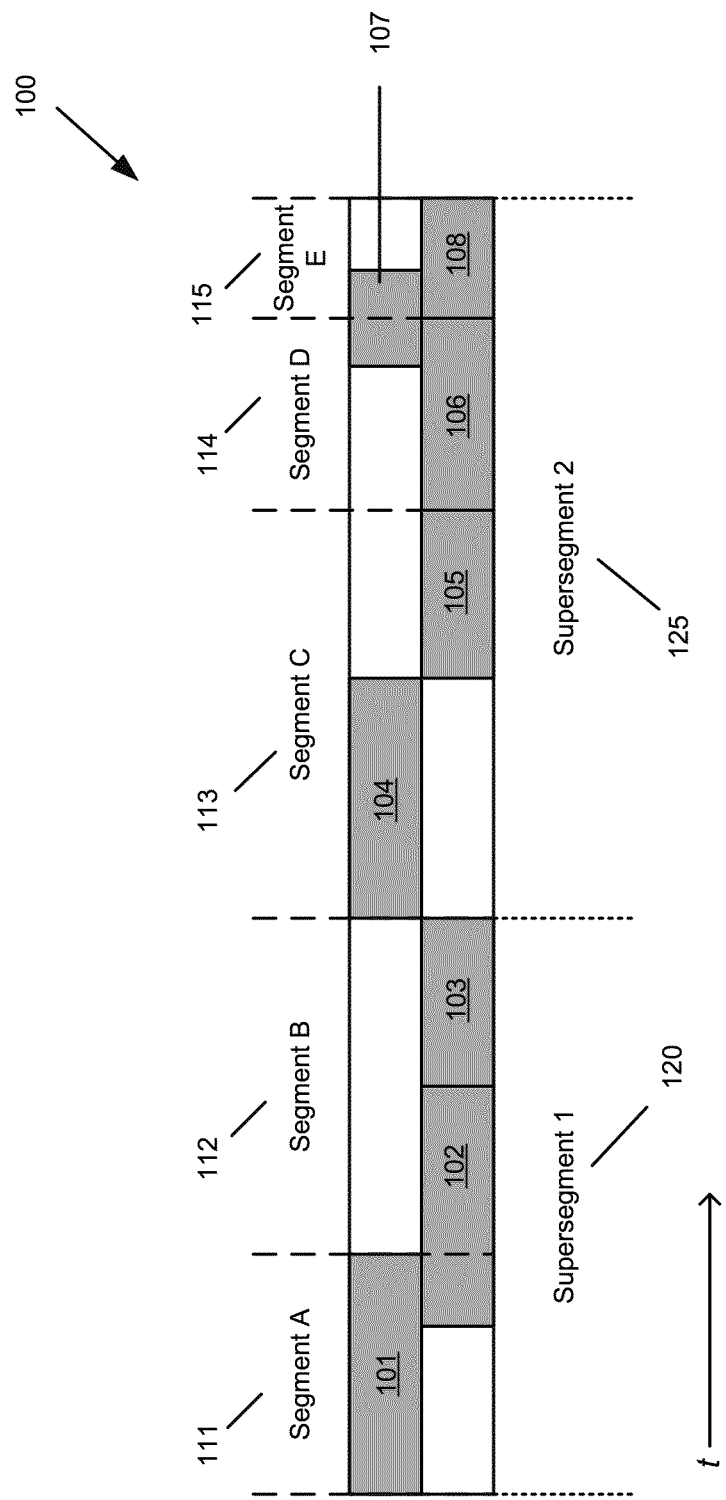
FIG. 1 illustrates a hierarchically structured timeline of some embodiments.

FIG. 1 illustrates such a timeline 100 of some embodiments. Timeline 100 includes eight pieces of content (i.e., content items) 101-108 spread over time. The pieces of content are at the lowest level of the hierarchy of the timeline in this example. In some embodiments, above the content pieces are one or more levels of hierarchical structures that include the content. In FIG. 1, timeline 100 has two levels of hierarchical structure above the content.

Timeline 100 includes five segments 111-115 at a first level and two supersegments 120 and 125 at a second level. In some embodiments, as in this example, each of the structures (here, the segments and supersegments) is defined as a slice of the timeline. That is, each of the structures includes a particular duration of time in the timeline, and includes any lower-level structures (including content items) that fall within the particular duration.

Thus, Segment A 111 includes content 101 and a portion of content 102, Segment B 112 includes a portion of content 102 and content 103, Segment C 113 includes content 104 and content 105, etc. Supersegment 1 120 includes Segment A 111 and Segment B 112 and the content in each of the included segments. These slices are user-determined in some embodiments. A user may determine the length of the slices (e.g., five seconds, seven minutes, one hour, etc.) and the dividing points along the timeline between the slices. As mentioned above, the slices are determined independent of the content in the timeline in some embodiments. That is, there is no necessary correlation between the content and the dividing points or the length of the timeline slices. For instance, pieces of content 102 and 107 are both split between two segments.

Figure 2:
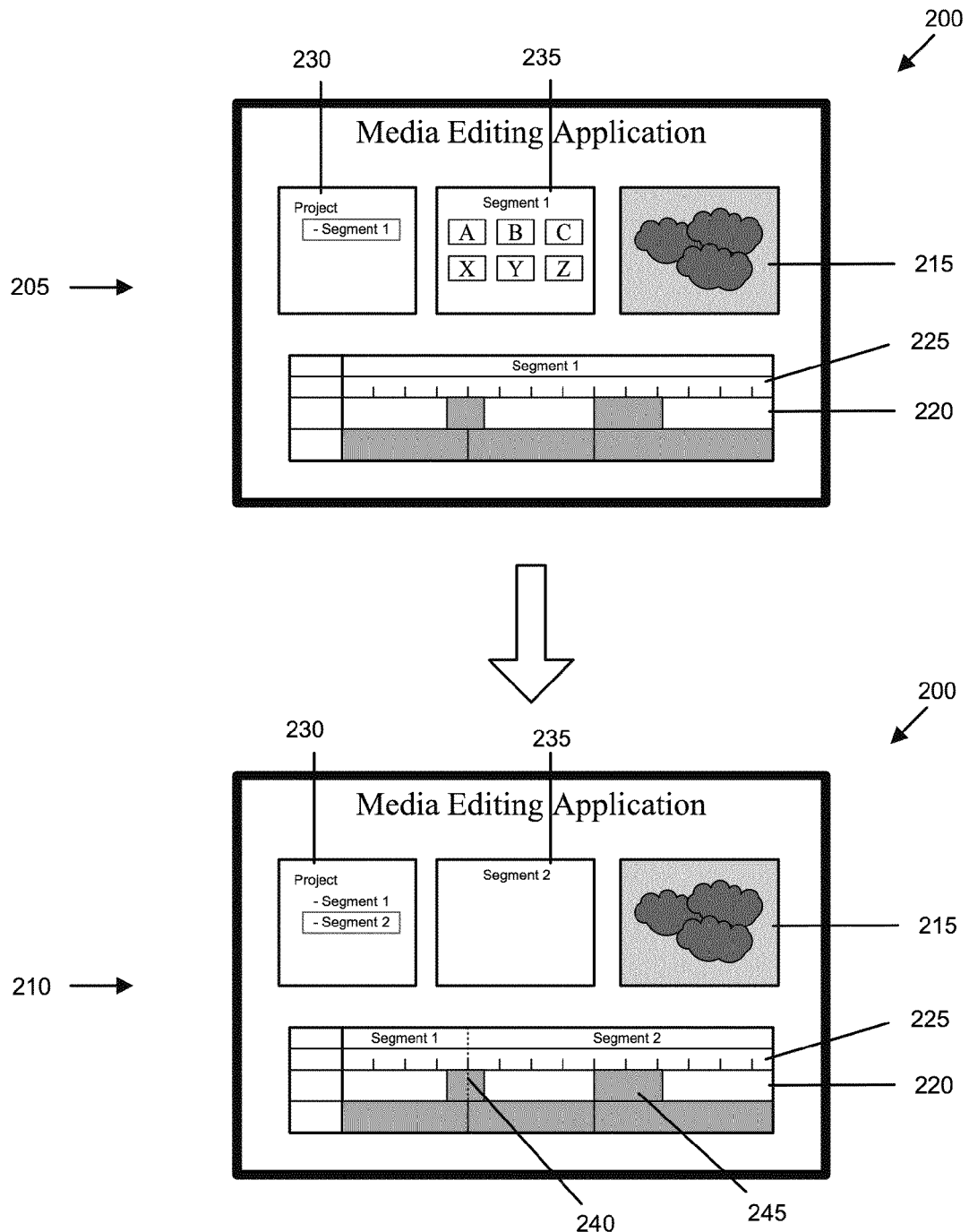
FIG. 2 illustrates breaking a timeline into two segments.

In some embodiments, the hierarchically structured timeline is a timeline for a media-editing application that creates composite presentations by combining several media clips. In some embodiments, the media clips are any kind of clip that can be used to create a composite presentation, such as audio clips, video clips, text overlays, pictures, and/or other media. An audio or video clip, in some embodiments, references a source audio or video file with in and out points that specify times in the source audio or video at which the clip starts and ends. FIG. 2 illustrates a graphical user interface ("GUI") 200 of a media-editing application with such a timeline. Specifically, FIG. 2 illustrates the GUI 200 at two different stages. At the first of these stages 205, a timeline 225 is defined as one segment, while at the second stage 210 the timeline 225 has been broken into two segments. These stages will be described further below.

As illustrated in FIG. 2, the GUI 200 includes a preview display area 215, a composite display area 220 that includes the timeline 225, a hierarchy outline window 230 and a media browser 235. The preview display area 215 displays a preview of a composite presentation that the application creates by compositing several media clips.

The composite display area 220 provides a visual representation of the composite presentation being created by the user. Specifically, it displays a portion of the timeline 225. The timeline of some embodiments is spanned by multiple tracks (in the example of composite display area 220, there are two tracks), along which are displayed graphical representations of the media clips that are part of the composite media presentation. The graphical representations indicate when during the composite media presentation the media clip begins and ends, based on where along the timeline the graphical representation is displayed. Like timeline 100, timeline 225 in composite display area 220 may be divided (e.g., by a user) into various slices of time at different levels of hierarchy.

The hierarchy outline window 230 displays a list or other representation of the hierarchy defined for the timeline. At stage 205, the timeline only has one segment, which is displayed in outline window 230 and indicated at the top of composite display area 220. In some embodiments, items at different levels of hierarchy are displayed differently in the outline window 230 (e.g., with different amounts of indentation or different graphics). The hierarchy outline is used in some embodiments to navigate to different segments in the timeline, zoom in or out to focus on a particular segment, create new segments, etc.

The media browser 235, or clip library, is a display area in the GUI 200 that displays representations of media clips which a user may add to the composite presentation. To add a clip to the presentation, in some embodiments, a user can select a representation of the clip in the media browser and drag the clip to a particular track at a particular time in the timeline. The user may then edit the clip in the timeline (e.g., modify in and out points, modify the duration, add effects to the clip, etc.).

In some embodiments, some of the clips represented in the media browser are already part of the composite media presentation, while some are not. In some embodiments, the media browser may include folders that correspond to the different hierarchical items (e.g., segments, supersegments, etc.) of the timeline. Thus, a user may associate a number of clips with a particular segment without adding all of those clips to the composite media presentation. For instance, stage 205 illustrates that there are at least six clips associated with Segment 1 that are displayed in media browser 235. In some embodiments, the clips displayed in the media browser 235 are those that are associated with a segment that is selected in the hierarchy outline window 230. At stage 205, Segment 1 (the only segment at this stage) is highlighted, and the clips associated with Segment 1 are displayed in media browser 235.

Stage 210 illustrates that the portion of the timeline 225 that is displayed in composite display area 220 has been split into two segments with the dividing point at time 240. Users can divide the timeline for a composite presentation into user-modifiable segments by way of a variety of operations in some embodiments. These operations may involve user interaction with UI items in the composite display area, the outline window, or elsewhere in the GUI. Different embodiments enable users to insert segments before, after, or in the middle of a particular segment, split segments in two, merge segments, etc. The segments need not line up with the media clips, and can be of arbitrary or default duration.

For instance, the new segment at stage 210 could have been created in some embodiments by a user selecting time 240 (e.g., by placing a playhead at time 240) and selecting a user interface ("UI") item to split the segment at the selected time. Such a UI item may be an option in a drop-down menu, a selectable button in the UI, etc. Some embodiments also allow access to the segment creation functionality via shortcut keys. Creating the new segment causes an entry for the new segment to appear in the composite display area 220 as well as in the outline window 230 in some embodiments, as shown. At stage 210, the new segment is now selected in the outline window 230, but has no associated media clips in media browser 235. Some embodiments, though, associate with a segment any media clips that are within the segment. Thus, for example, the clip represented by graphical object 245 would be displayed in the media browser 235 for Segment 2.

In addition to creating a first level of segments, some embodiments allow a user to create segments at multiple levels (as in the case above for timeline 100). For instance, when the composite media presentation is a movie, the user may define the first level of segments as scenes and a higher level of segments as acts. Some embodiments enable the user to change the title of segments (e.g., "Scene 5" or "Coffee Shop Conversation").

Once a segment is created, a user can modify the duration of the segment in some embodiments. The segment duration may be modified explicitly (e.g., by moving a segment boundary in the composite display area or by typing in a start time, end time, and/or duration) or implicitly (e.g., by modifying the duration of a media clip in the segment).

Figure 3:
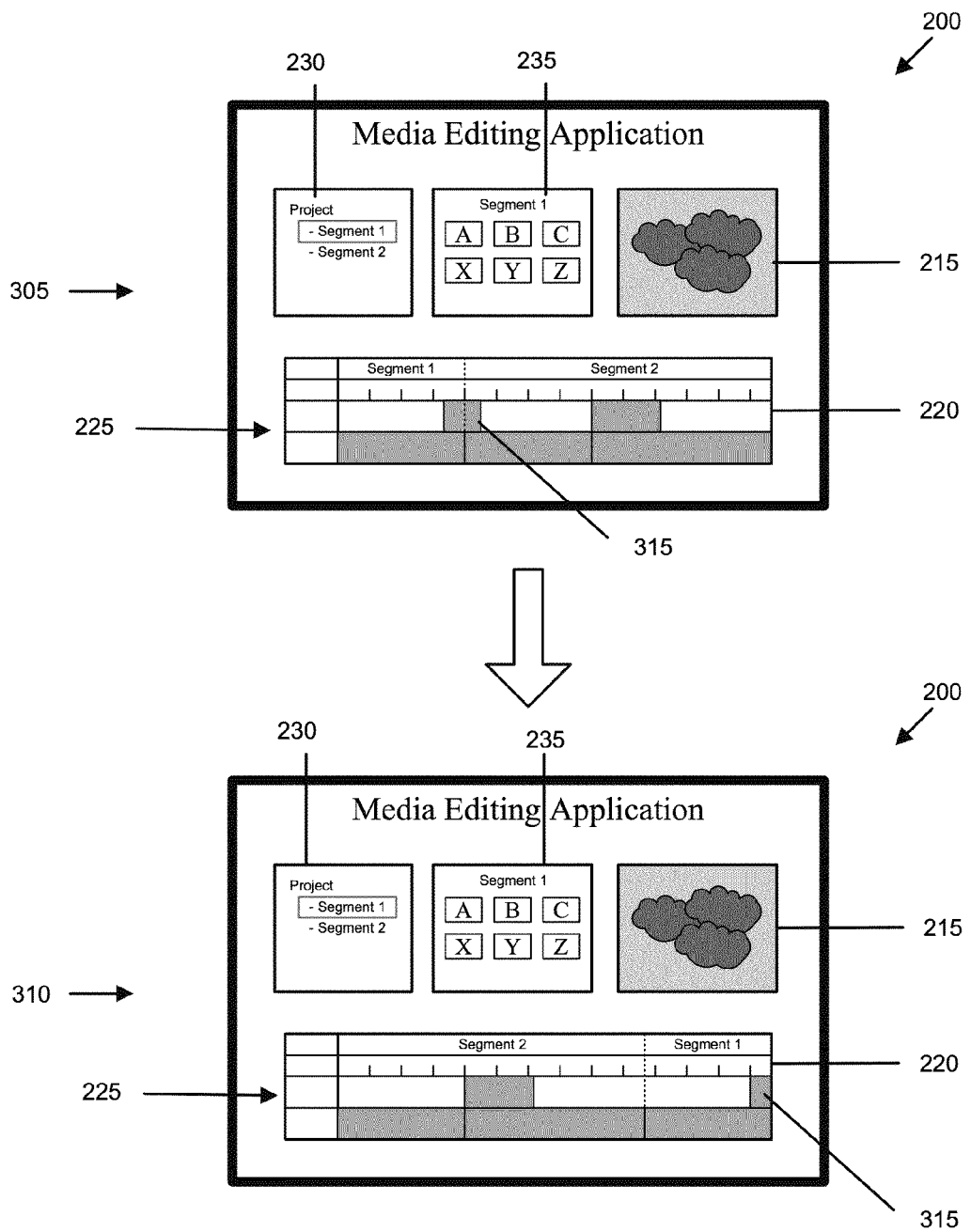
FIG. 3 illustrates the editing of a media presentation represented in a timeline by moving a segment within the timeline.

FIG. 3 illustrates the editing of the media presentation represented in timeline 225 by moving a segment within the timeline. Specifically, FIG. 3 illustrates GUI 200 at two different stages. At a first stage 305, Segment 1 is before Segment 2 in timeline 225. At a second stage 310, Segment 1 (and the clips within it) has been moved after Segment 2 in the timeline 225.

As illustrated at stage 305, Segment 1 is highlighted in the outline window 230, indicating that it is selected. In some embodiments, selecting a segment also selects all of the media clips in the selected segment. As explained in greater detail below in Section IV, different embodiments determine differently whether a clip that overlaps a segment boundary (e.g., media clip 315) is actually in the segment. Some embodiments include the entire clip in the selected segment, while other embodiments do not include the clip or only include a portion of the clip.

At stage 310, the selected Segment 1 has been moved such that it is after Segment 2 in the timeline 225. Thus, the clips in Segment 1 will appear later in the media presentation represented in timeline 225. As illustrated at stage 310, at least a portion of media clip 315 is included with Segment 1 in this case and is therefore at the far right end of the composite display area 220. Some embodiments only select and move the portion of the clip that is within the segment boundaries, while some embodiments select and move the entire clip.

As mentioned above, different attributes and functionalities are applied differently to different levels of the hierarchy in some embodiments. In the case of the media-editing application, some embodiments apply different attributes and functionalities differently to media clips, segments (e.g., scenes), supersegments (e.g., acts), and any other levels of hierarchy. For instance, media clips and segments may be displayed in the timeline, while supersegments and any higher levels of hierarchy are only displayed in the outline window. A media clip can be split among two or more segments, while each segment must be fully contained within one supersegment in some embodiments. Various other functionalities and attributes (e.g., how the items may be edited) are applied differently to the different levels in some embodiments as well.

The segments have a variety of uses for an editor that is using the media-editing application to create composite media presentations. In various embodiments, segments can be copied and pasted within a particular media presentation or from one media presentation to the next. In some embodiments, a media presentation can include multiple versions of a particular segment (e.g., if an editor is creating multiple different versions or debating which version of a scene to use for the final product). Some embodiments of the media-editing application allow a user to flag a segment such that the segment is not rendered with the composite media presentation. Segments can also be used to impose timing requirements, such as the time between commercial breaks for a television show. Along this line, some embodiments include libraries of preset groups of segments based on timing, story arc, etc.

Several more detailed embodiments of the invention are described in the sections below. Section I provides a conceptual description of a hierarchically structured timeline. Next, Section II describes detailed examples of the GUI of some embodiments. Section III describes the creation of segments in the media-editing application, while Section IV describes the movement of such segments in the timeline. Section V discusses different ways to adjust the duration of a segment and related topics. Section VI then describes the navigation and display of the timeline in the composite display area via the story outline window. Section VII discusses various different uses for segments to edit the composite media presentation. Section VIII describes the software architecture of a media-editing application of some embodiments, while Section IX follows that with a description of a process used to define and store the application. Finally, Section X describes a computer system which implements some embodiments of the invention.

I. Hierarchically Structured Timeline

As mentioned above, some embodiments of the invention provide a hierarchically structured timeline of content. The content in some embodiments is audio, video, graphics, etc., or a combination thereof. In some embodiments, the content is arranged over time in the timeline in order to form a composite presentation, such as a movie, episode of a television show, composite audio program, etc.

Figure 4:
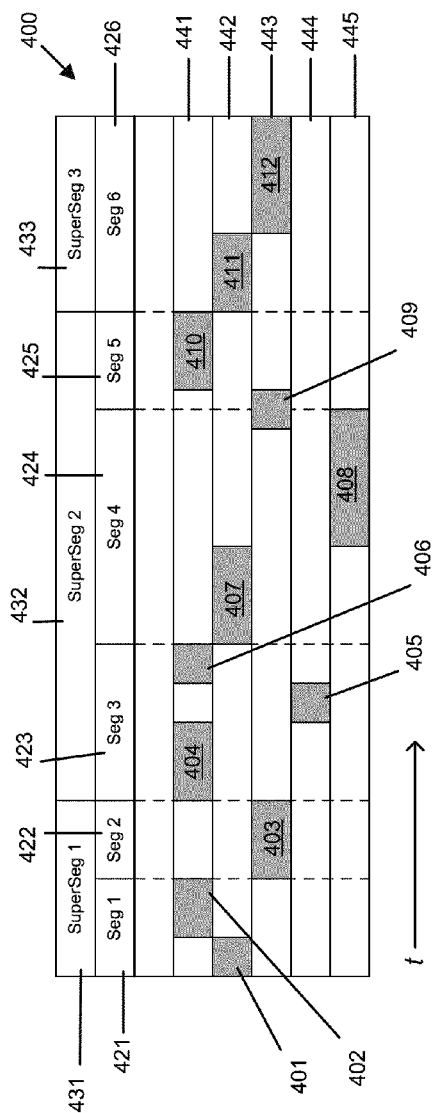
FIG. 4 illustrates a hierarchically structured timeline of some embodiments that includes content arranged over time.

FIG. 4 illustrates such a hierarchically structured timeline 400 of some embodiments that includes content arranged over time. The timeline 400 includes pieces of content 401-412 that are at the lowest level of the hierarchy. The pieces of content 401-412 are arranged along five tracks 441-445 that span the timeline 400.

One level up in the hierarchy from the pieces of content are segments 421-426. Each of these segment includes at least one piece of content, while some include more than one piece of content. Content piece 409 is split between the boundary of segment 424 and segment 425.

As can be seen, each of the segments is a particular slice of time. That is, each segment can be defined by a start time and an end time, or one of a start time and end time along with a duration. In some embodiments, the slices of time are user-defined and are not directly related to the content. That is, a user may consider the content in determining the segments, but the segments are not defined by the content in any way and the content may be moved along the timeline and in or out of the segments freely. For instance, a user could move content piece 403 along track 443 into segment 424 without affecting segment 422, except that content piece 403 would no longer be associated with segment 422.

In fact, in some embodiments a user can segment a timeline into such a structured hierarchy without any content in the timeline at all. Section VII, for example, describes preconfigured timelines that initially have no content. When a content item is placed into such a structured timeline, it is then associated with a segment or segments based on the location in the timeline at which the content item is placed.

Some embodiments include multiple levels of segments. The timeline 400, as shown, includes "supersegments" 431-433. The supersegments are slices of time at one level higher than the segments 421-426. While the first level of segments are defined in some embodiments based on at least two of a start time, an end time, and a duration, some embodiments define the second level by associating a supersegment with one or more of the lower-level segments. For instance, supersegment 431 may be defined by reference to segments 421 and 422 rather than a particular time and duration. The slice of time for the supersegment is then defined implicitly from the times and durations for the associated lower-level segments. Any higher levels of segments may be defined implicitly in a similar manner.

In some embodiments, however, segments may be split among supersegments just as content pieces may be split between segments. In such embodiments, then, supersegments are defined based on at least two of a start time, end time, and a duration, in the same way that the first-level segments are defined.

Figure 5:
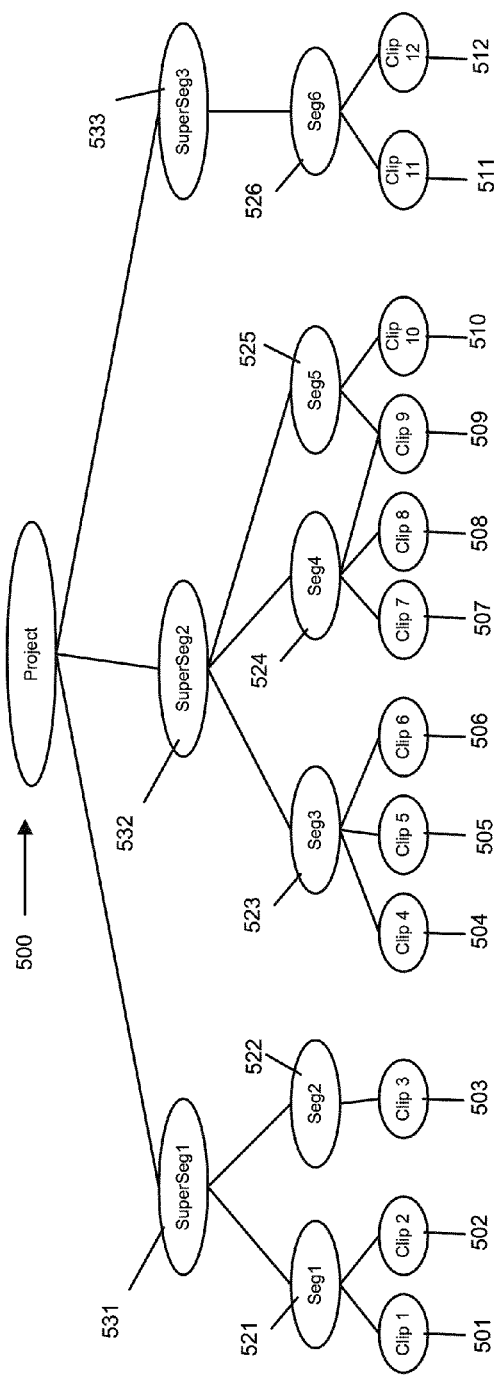
FIG. 5 illustrates associations between items at different levels of the hierarchy for the timeline of FIG. 4.

Associations between content, segments, supersegments, etc. are defined for the timeline in some embodiments in order to define the hierarchical structure. Each content piece is associated with one or more segments, each segment with one supersegment, etc., all the way up the hierarchy. FIG. 5 illustrates the associations between items at different levels of the hierarchy for timeline 400. The timeline 400 is a timeline for a project 500. The three supersegments 431-433 are associated with project 500, as represented by items 531-533. Two segments, represented by items 521 and 522, are associated with the first supersegment, three segments are associated with the second supersegment, and only one segment is associated with the third supersegment.

A piece of content is associated with one or more segments based on the time spanned by the piece of content in the timeline and the slice of time that defines the one or more segments. For instance, content piece 403, represented by item 503, is associated with the segment represented by item 522. Most of the content pieces in timeline 400 are only associated with one segment as they are fully contained within one segment. Content piece 409, however, splits the boundary between segments 424 and 425. As such, associations are defined between item 509, representing content piece 409, and items 524 and 525, which represent the two segments.

Some embodiments, however, only define an association between a piece of content and a segment when the piece of content is fully contained within the segment. As such, content pieces such as 409 that cross a segment boundary are not associated with any segment. Other embodiments define an association between the piece of content and only one of the segments (e.g., the segment in which the piece of content starts or the segment in which the piece of content ends).

In some embodiments, this structure information is stored as metadata about a particular timeline. If the timeline is stored and later placed into a larger timeline, this metadata regarding the structure of the timeline is retained and made part of the metadata for the structure of the larger timeline. In the case of the media-editing application, as is described below, this enables a user to paste one timeline into another (e.g., for creating a final project out of numerous smaller timelines) and retain all of the structural information about the timeline.

FIG. 5 illustrates a hierarchy in which each region of the hierarchy has the same depth. That is, each of the supersegments includes at least one segment, and each of the segment includes at least one content piece. This is not a requirement for the hierarchy in some embodiments. For example, in some embodiments there could be a supersegment with no segments. Instead, the content items would be associated directly with the supersegment. Similarly, there could be a supersegment (or segment) that does not have any lower-level items at all associated with it.

Figure 6:
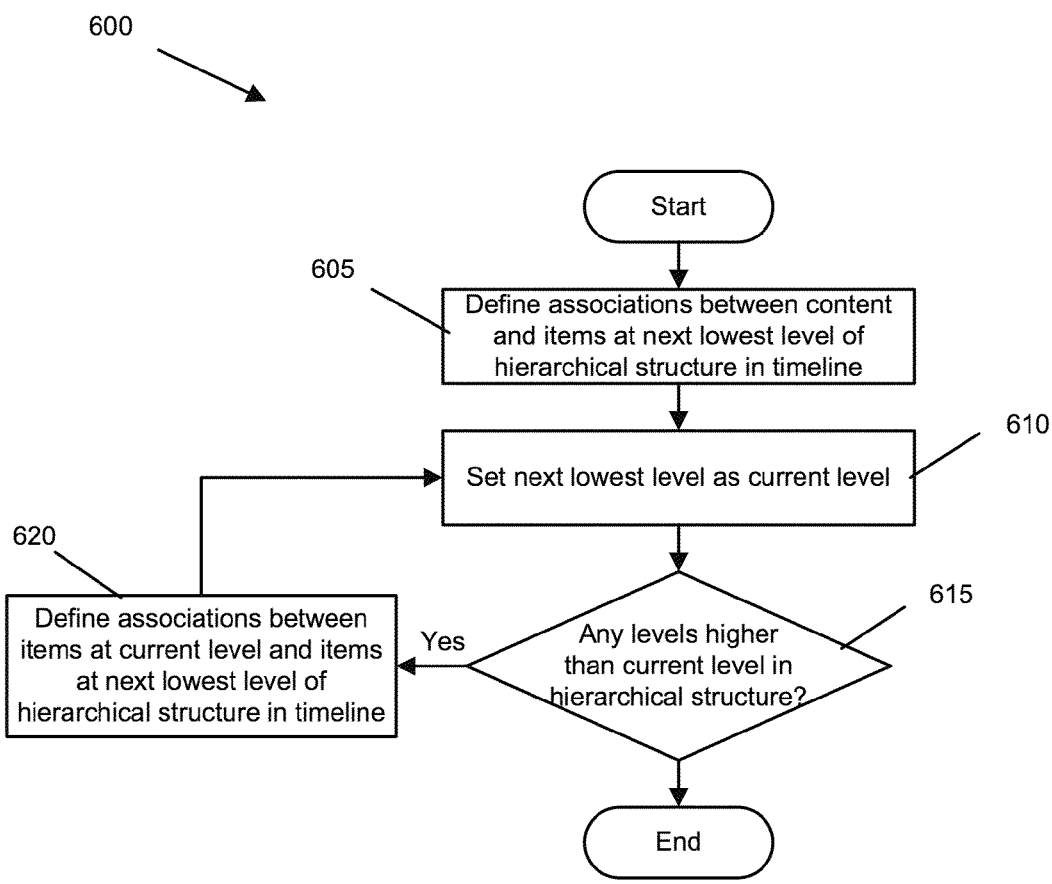
FIG. 6 conceptually illustrates a process for defining associations within a timeline.

FIG. 6 conceptually illustrates a process 600 for defining associations within a timeline such as those illustrated in FIG. 5. Process 600 starts by defining (at 605) associations between content and items at the next lowest level of hierarchical structure in the timeline. For instance, in the case of timeline 400, the twelve content pieces 401-412 are associated with the six segments 421-426. In some embodiments, each content piece or hierarchical structure is represented by a data structure and associations are defined between these data structures. Some embodiments instead define one data structure for the timeline that includes information about all of the associations. One of ordinary skill in the art will recognize that a wide variety of data structures may be used to store this information. When content is added to the timeline or the timeline is otherwise modified, the data structure(s) are modified to accommodate the changes in some embodiments.

Process 600 then sets (at 610) the next lowest level of the hierarchical structure as the current level. The first time operation 610 is performed, this level is that directly above the content (the level of structure for which associations with the content are defined at 605, such as segments 421-426). The process then determines (at 615) whether there are any levels of the hierarchical structure that are higher than the current level. When there are no more higher levels, all associations are defined and the process ends.

Otherwise, the process proceeds to 620 and defines associations between the items at the current level and items at the next lowest level (that is, one level higher than the current level) of hierarchical structure in the timeline. For example, the six segments 421-426 of timeline 400 are associated with the supersegments 431-433 as illustrated in FIG. 5. The process then proceeds to 610 to change the current level. Process 600 ends when all of the items at the various hierarchical levels are associated. Some embodiments include numerous hierarchical levels—more than just segments and supersegments—and associations are defined for all of the levels.

Figure 7:
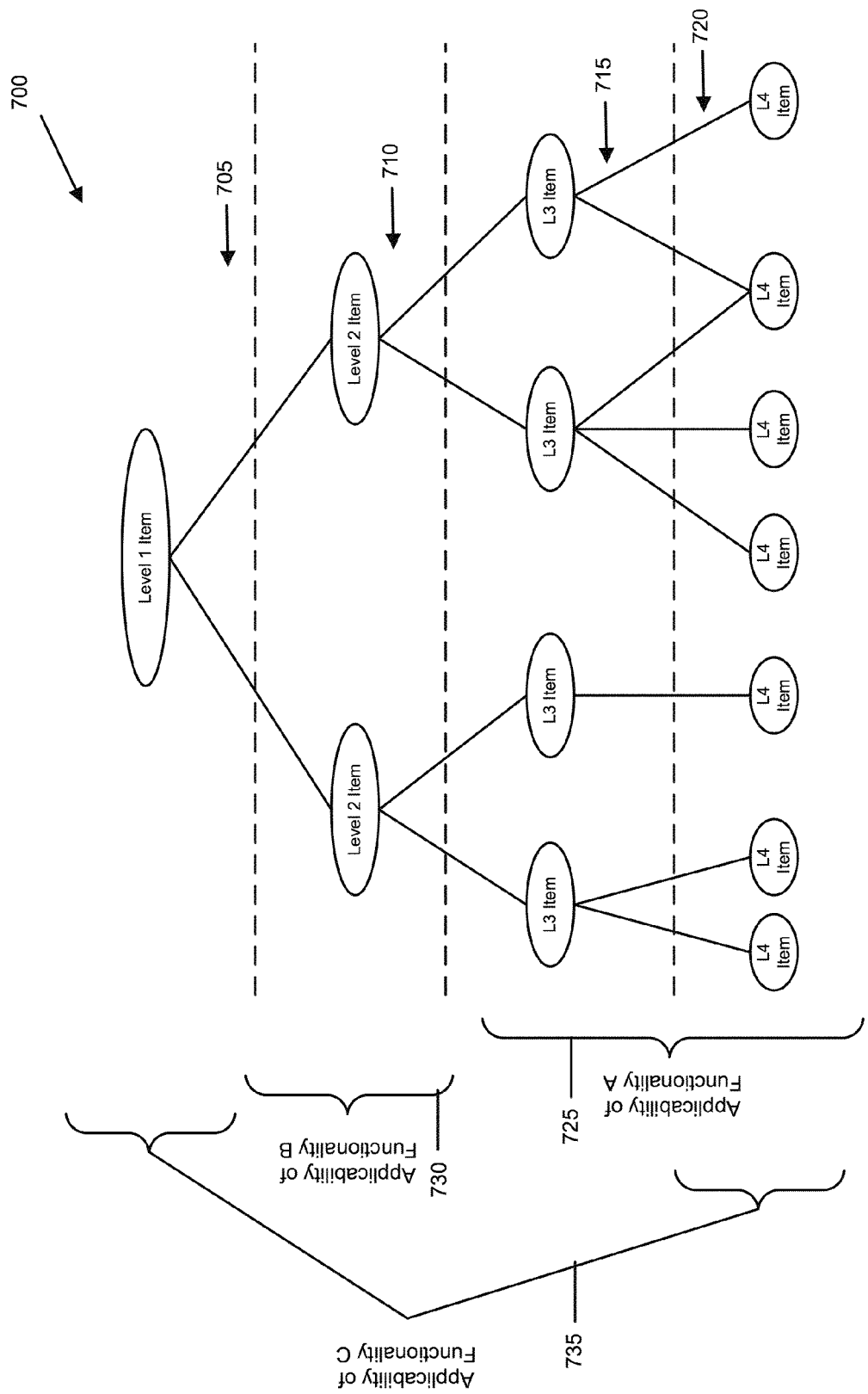
FIG. 7 conceptually illustrates a hierarchical set of items to which different functionalities are applied.

In some embodiments, various attributes and functionalities are applicable to items at only some of the levels of hierarchy. That is, different attributes and functionalities are applied differently to the different hierarchical levels. FIG. 7 conceptually illustrates a hierarchically associated set of items 700 to which different functionalities are applied. The set of items 700 includes items at four different levels of hierarchy (levels 705, 710, 715, and 720). As one example for a media-editing application of some embodiments, the lowest level items in the hierarchy are media clips, the next level of items are segments of the timeline (e.g., scenes), items at the level above that are supersegments (e.g., acts), and at the highest level is a composite media presentation.

As illustrated in FIG. 7, functionality A 725 is applied to items in the two lower levels 715 and 720. Functionality B 730 is applied only to items at the second level 710. Thus, various functionalities can apply to only items at one particular level or items at multiple levels. In fact, functionalities or attributes need not apply to items in consecutive levels of the hierarchy. For example, functionality C 735 is applied to items at the lowest level of the hierarchy 720 and items at the highest level 705, but neither of the levels in between.

As will be described in further detail in the sections below, in the case of the media-editing application, there are various attributes and functionalities that apply differently to items at different levels of hierarchy. For instance, some embodiments display segment (e.g., scene) headings in the composite display area but do not display supersegment (e.g., act) headings. Media clips are graphically represented in the composite display area, of course, and some embodiments display a title for the composite media presentation as well. However, in the story outline window clips are not displayed but the other items (segments, etc.) are listed in some embodiments.

The media-editing application of some embodiments enables some editing operations only for application to the media clips as opposed to any of the user-defined segments (e.g., defining a transition between clips). However, other editing operations are enabled for some levels of segments in addition to the media clips, but not all levels. For instance, some embodiments allow a user to adjust a duration of a media clip or a segment in the composite display area, but not any higher levels such as supersegments, which are edited implicitly or not at all. Some of these features will be described in greater detail below.

II. Media-Editing Application

As mentioned above, the hierarchical timeline of some embodiments is part of a media-editing application and represents a composite media presentation that a user creates using the media-editing application. The following sections describe the graphical user interface of some embodiments for such an application, as well as a way to associate media clips with segments in some embodiments.

A. Graphical User Interface

Figure 8:
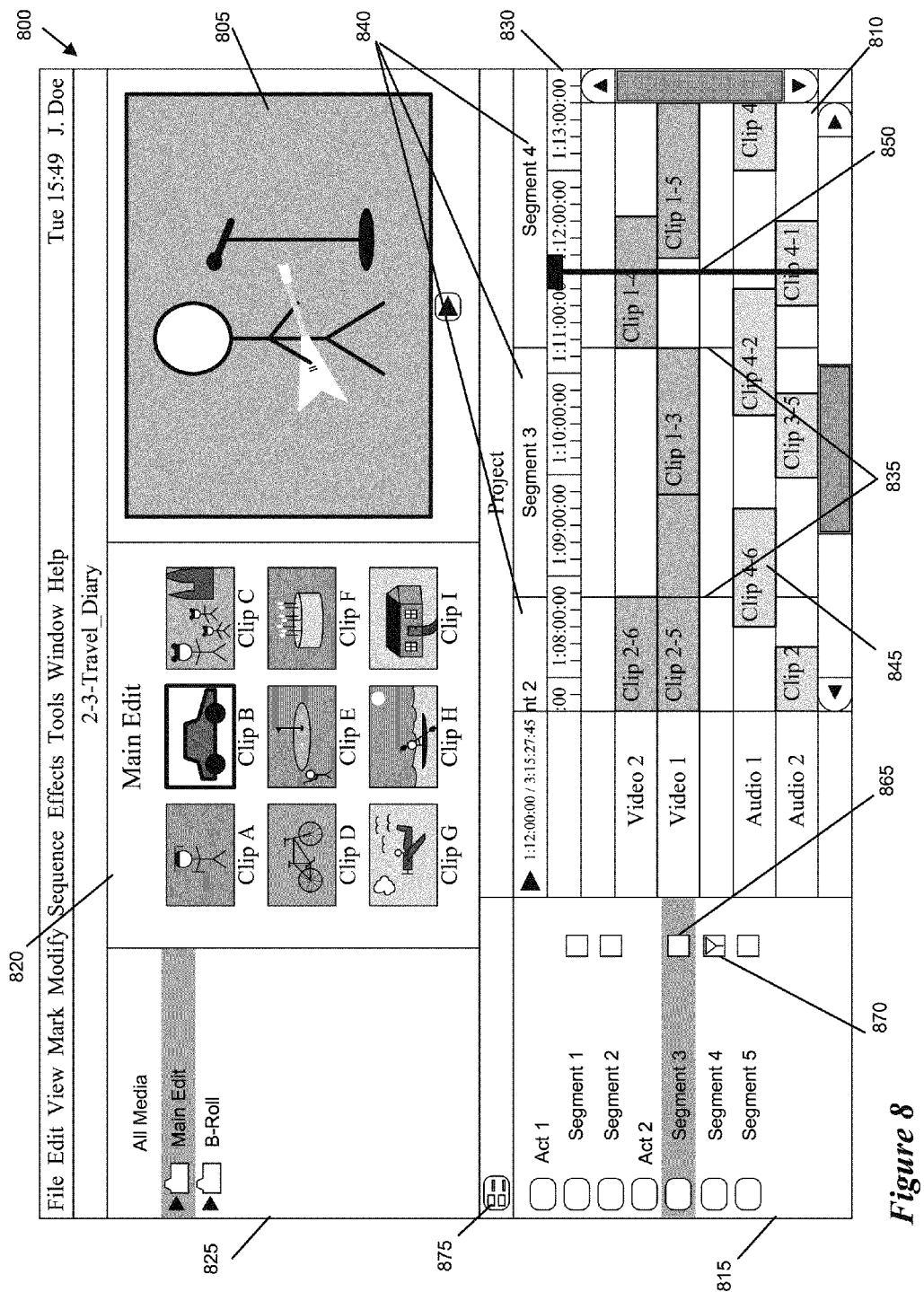
FIGS. 8-10 illustrate different variations of a graphical user interface of a media-editing application.

FIG. 8 illustrates a detailed graphical user interface (GUI) 800 of such a media-editing application. GUI 800 includes a preview display area 805, a composite display area 810, an outline window 815, a media browser 820, and a browser navigation pane 825.

The preview display area 805 (sometimes referred to as a canvas) displays a preview of the composite media presentation. In some embodiments, the preview display area includes various video controls such as a play button, fast forward and rewind buttons, etc. that a user can use to navigate the preview of the composite presentation.

The composite display area 810 provides a visual representation of the composite presentation being created by the user. Specifically, the composite display area 810 displays a portion of a timeline 830. Timeline 830 is spanned by multiple tracks, along which are displayed graphical representations of the media clips that make up the composite media presentation (also referred to as clip shapes). Timeline 830 is spanned by the four tracks displayed (Video 1, Video 2, Audio 1, and Audio 2) in GUI 800, though some embodiments include more tracks than can be shown at one time in the composite display area.

In some embodiments, a graphical representation of a media clip indicates a source media (e.g., a video file or audio file) and a start and end time in the composite presentation for the media clip. Though not the case in GUI 800, some embodiments display the graphical representation of a video clip by using an image (e.g., a particular frame) from the particular video clip. The start and end times in the composite media presentation are determined by looking at the timeline in the composite display area. For example, video clip 1-3 820 begins at approximately 1:09:47:00 and ends at approximately 1:11:15:00. A media clip in the composite presentation also has in and out points that indicate the portion of the source media that defines the clip. In some embodiments, this information is visible either all of the time or by placing a cursor in the GUI over the clip or its borders.

Some embodiments display segment borders (i.e., boundaries) and segment headers in the composite display area. Composite display area 810, for instance, is displaying segment borders 835 to visually indicate the dividing time between segments two, three, and four, as well as segment headers 840 for these segments. In some embodiments, the segment borders are only displayed between segment headers, though in GUI 800 the segment borders 835 are displayed on the tracks in composite display area 810 as well. The segment borders 835 are not displayed on top of clip shapes such as shape 845, though some embodiments display the segment borders over such clip shapes as well in order to indicate exactly where the segment border is within the clip.

The segment borders and headers correspond to the hierarchical structures described above in Section I. Segments are defined for the timeline by a user, and may be of varying duration and number. Furthermore, supersegments or higher-level structures may be defined as well. For instance, in some cases users will want to use the segments to tell a story. The segments and supersegments may correspond to acts, scenes, sub-scenes, etc. As a user (e.g., an editor) modifies the story, the user can move a segment around and take the clips in the segment as well (as will be discussed in greater detail below in Section IV). Some embodiments only display the lowest level of structures (i.e., the first level that is not the content of the timeline itself) in the composite display area. Thus, although supersegments (acts) are defined for timeline 830, they are not actually displayed in the timeline in some embodiments. Other embodiments display more or all levels of hierarchy in the timeline.

Composite display area 810 also includes a playhead 850. The playhead 850 is set to a particular time in the composite media presentation. In some embodiments, the image displayed in the preview display area 805 is that which corresponds to the time in the composite presentation at which the playhead 850 sits along the timeline 830. Playhead 850 also has uses in some embodiments as a reference point for the creation of new segments. Further discussion of such segment creation is found below in Section III.

The outline window 815 (also referred to as a story outline) displays a list or other representation of the hierarchy (segments, etc.) defined for the timeline. In this case, outline window 815 includes list entries for two supersegments (Act 1 and Act 2) and five segments. As shown, some embodiments use indentation (or other visual indicators) to indicate the different levels of hierarchical items in the outline window. Each entry in the outline window includes a thumbnail 855, a title 860, and in the case of the segments a playhead indicator 865. The thumbnail, in some embodiments, is a particular image (e.g., the first frame, a user-selected frame, etc.) from the particular segment. The playhead indicator is a box that displays a playhead icon when the playhead is located within the particular segment. As playhead 850 is within segment 4 in GUI 800, the playhead indicator 865 for Segment 4 in the outline window 815 displays a playhead icon 870. Each entry is a selectable item in some embodiments. As will be described in further detail below, the selectable items in outline window 815 are used in some embodiments to navigate the timeline as well as to edit and move segments within the timeline.

In some embodiments, the outline window includes a toggle button such as UI button 875. Button 875 enables the user to determine whether to display the story outline or not. When a user selects button 875 (e.g., by placing a cursor over the button and pressing a button on a cursor controller), the outline window is removed from the display and only the bar that includes toggle button 875 is displayed. Selecting the toggle button again will re-display the story outline. In some embodiments, the composite display area expands to fill the area previously occupied by the outline window when the outline window is removed from the display.

The media browser 820, or clip library, is a display area in GUI 800 that displays representations of media clips which a user may add to the composite presentation. To add a clip to the presentation, a user selects one of the clip representations from the media browser and drags the clip to a particular location in the composite display area so as to place the clip on a particular track at a particular time. The user may then edit the clip in the composite display area, such as by modifying in and out points, modifying the clip duration, moving the clip along the timeline, applying effects to the clip, etc.

The browser navigation pane 825 of some embodiments displays one or more folders that include media clips. When a user selects a particular folder in browser navigation pane 825, the clips in the particular folder are displayed in the media browser 825. Some embodiments include default folders in the navigation pane, such as "Main Edit" and "B-Roll" folders. Users of the media-editing application may also add folders to the navigation pane either through the navigation pane or the media browser, in some embodiments. A user might, for example, want to add folders to correspond to the different segments. In some embodiments, a composite media presentation may include multiple sequences, each of which is represented by a timeline. Each sequence is automatically given a folder in the browser navigation pane 825 in some embodiments.

In some embodiments, the clips in a folder include those that are already part of the composite media presentation. Users can also add media clips to a particular folder in some embodiments. This allows a user to more easily access clips when they want to add the clip to a presentation via the timeline, as well as a way to store clips that the user might want to add to the presentation at a later time.

Figure 9:
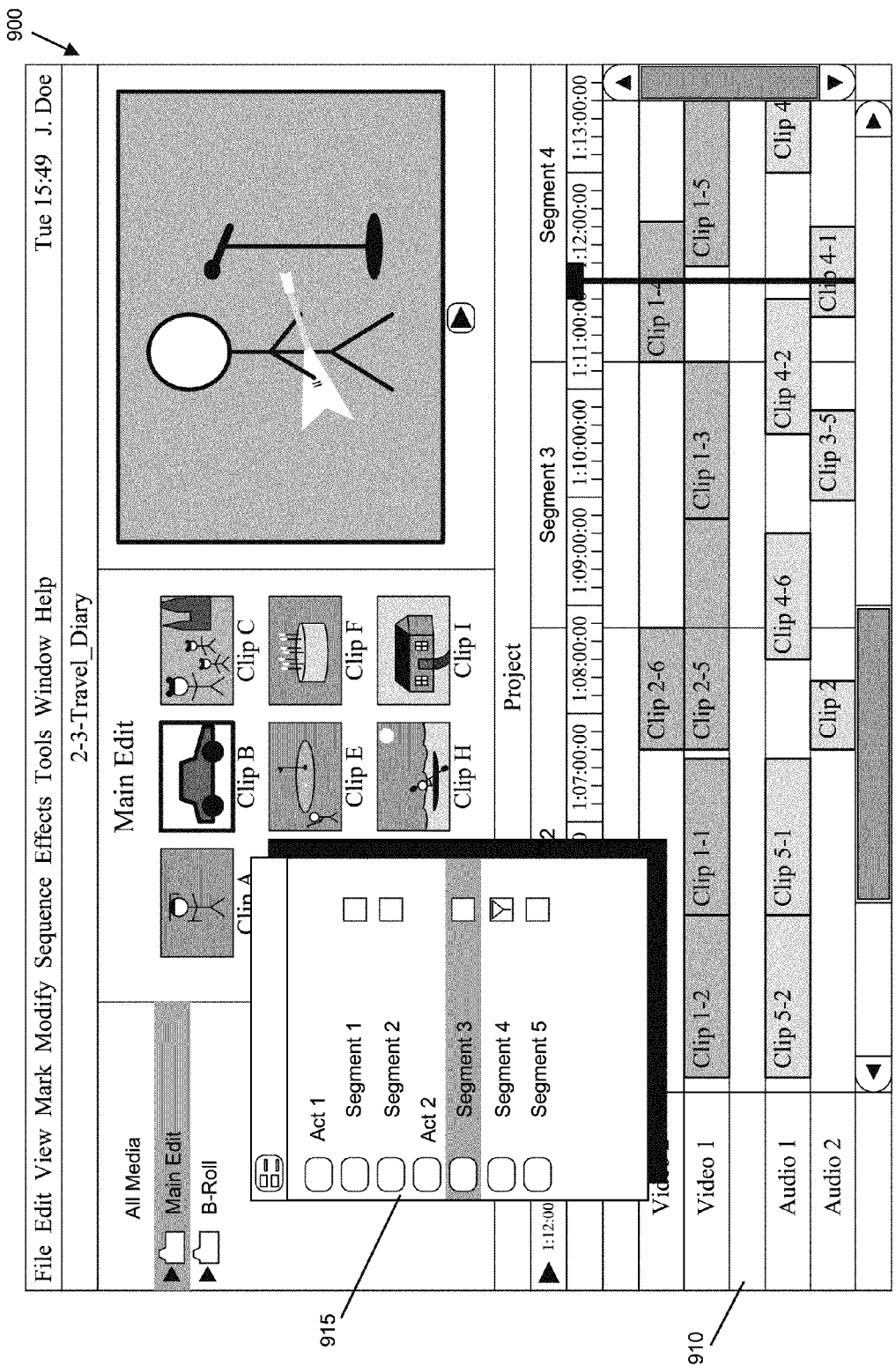

One of ordinary skill in the art will recognize that the GUI 800 illustrated in FIG. 8 is only one of many GUIs possible for a media-editing application that embodies the invention. FIG. 9 illustrates a GUI 900 for a media-editing application of some embodiments that includes an alternative outline window 915. Rather than being displayed in a particular location in the GUI, outline window 915 is a separate, freely moveable window that is displayed on top of the main GUI. The properties of outline window 915 are similar to those of outline window 815. In some embodiments, instead of having a toggle button, outline window 915 can be closed or minimized with a similar UI item. In some such embodiments, the GUI includes a UI item for restoring the outline window.

When the story outline is a separate window such as is the case in GUI 900, the composite display area can be larger. Thus, composite display area 910 occupies more screen space than does composite display area 810.

Figure 10:
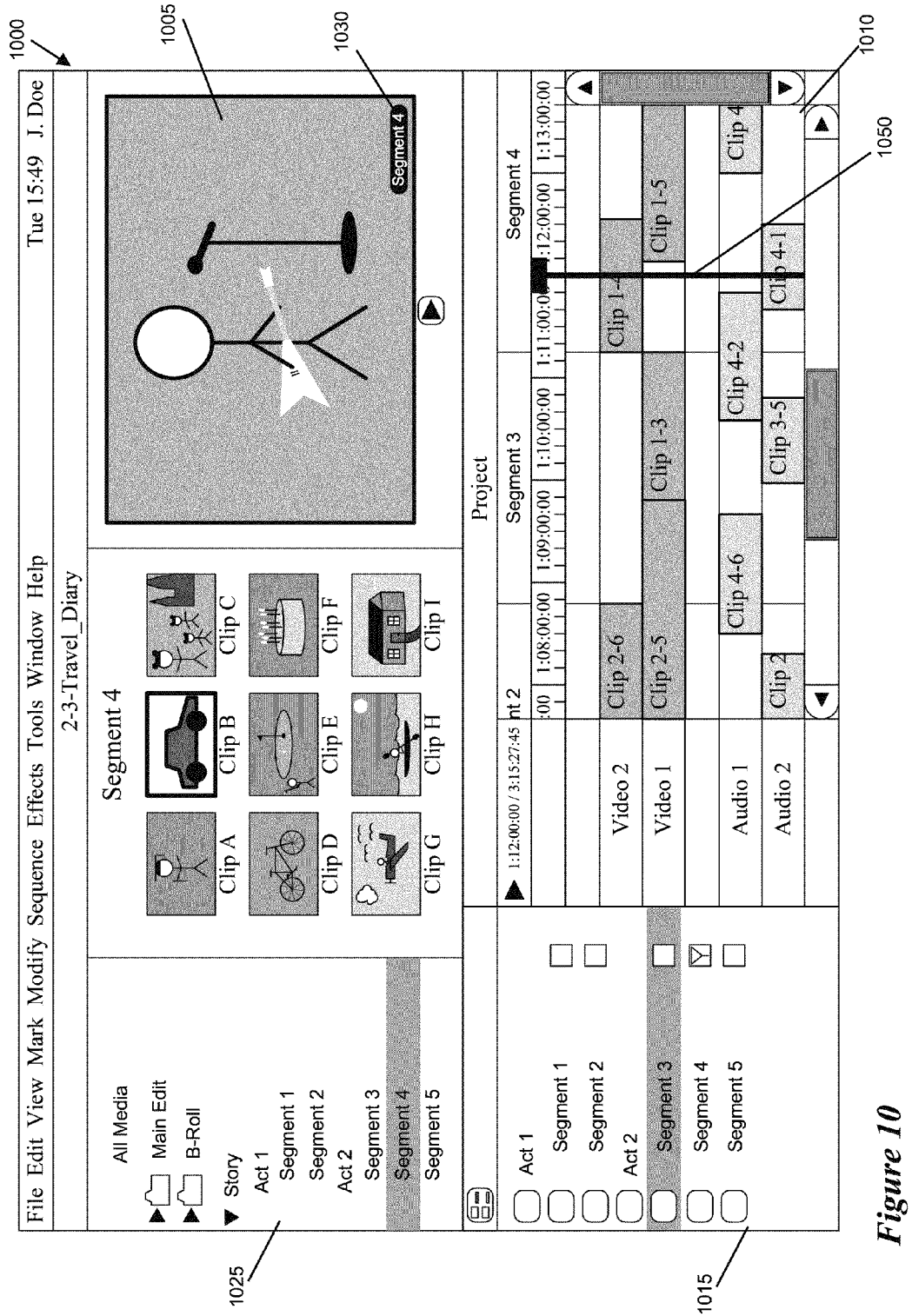

FIG. 10 illustrates another alternative GUI 1000 for a media-editing application of some embodiments. GUI 1000 includes numerous features similar to those of GUI 800. Browser navigation pane 1025 includes folders for the various segments and supersegments found in the story outline 1015. In some embodiments, folders are automatically created when a segment or supersegment is created. A user can then place clips in the folder that they may want to add to the segment of the composite presentation at a later time. Some embodiments also automatically include the clips that are a part of the segment in the composite presentation in the media browser for that segment as well.

As can be seen in GUI 1000, the segment selected in the outline window 1015 (Segment 3) need not be the same as the segment selected in the navigation pane 1025 (Segment 4). Thus, a user can use the outline window 1015 to focus the timeline on a first segment (as described in further detail below in Section V) but add a clip that is associated with a different segment to the timeline.

As described below, some embodiments allow a user to copy a segment from a first presentation and paste that segment into another presentation. In some embodiments, when a segment with a set of associated clips is pasted into a presentation, the segment retains the associated clips in the new presentation as well.

GUI 1000 also includes a segment indicator 1030 as part of preview display area 1005. The segment indicator 1005 provides an indication to the user as to which segment is currently playing in the preview display area 1005. This segment indicator will match up with the segment in which the playhead 1050 is located within composite display area 1010. In some embodiments, the segment indicator 1005 is a feature that a user can turn on and off by way of a selectable UI item (e.g., drop-down menu, UI button, right-clicking menu, etc.) or a hotkey.

The segments illustrated in GUIs 800, 900, and 1000 have a wide variety of uses for editors, many of which will be described in detail in the sections below. In order to be used for editing, however, the segments must first be created by the user. The creation of such segments will be described in the next section.

B. Associating Media Clips with Segments

As illustrated above in FIG. 10, some embodiments create a folder (i.e., bin) structure in the browser navigation pane 1025 that mimics the segment structure in the story outline 1015. As noted, this enables a user to associate source media with segments even when clips from that source media are not yet in the timeline. In some embodiments, media may be associated with a segment even without mimicking the story outline in the browser navigation pane. Instead, the story outline itself serves as a content navigation pane of its own.

As soon as segments are created (a process which will be described in Section III), a user might want to take all of her source media and associate that source media with the segments so that, when editing each segment, the potential media is readily available without having to sift through hundreds or thousands of potential source clips. In some embodiments, a user can drag a file or files (e.g., from a hard disk (or other storage) folder, etc.) to a segment in order to associate the source media with the segment. This associated source media (called candidate segment clips below) is essentially a candidate for being placed into the timeline. This candidate segment clip then stays with the segment even if the segment is moved within the timeline (as described in Section IV), hidden (as described in Section VI), or even temporarily removed (as described in Section VII).

The candidate segment clips for a particular segment can be accessed in some embodiments by selecting the folder in the browser navigation pane (e.g., pane 1025) that matches the segment. However, as mentioned, some embodiments do not create a separate folder in the navigation pane. Instead, the candidate segment clips are accessed through either the segment header in the composite display area or the segment items in the story outline. For example, right-clicking on the segment item in the story outline might bring up a menu that includes a command to display associated media for the segment. Some embodiments allow a user to toggle between candidate segment clips that are only associated with the segment and timeline clips that are associated with a segment and have been assigned a location in the composite media presentation.

Some embodiments include automatic association of source media with segments. For example, the user can have the media-editing application automatically associate source media having a file name that includes a scene number with the segment corresponding to that scene number. Thus, a whole batch of files called "xx . . . xxx—Scene 4" can be associated as candidate segment clips with the segment "Scene 4".

Figure 11:
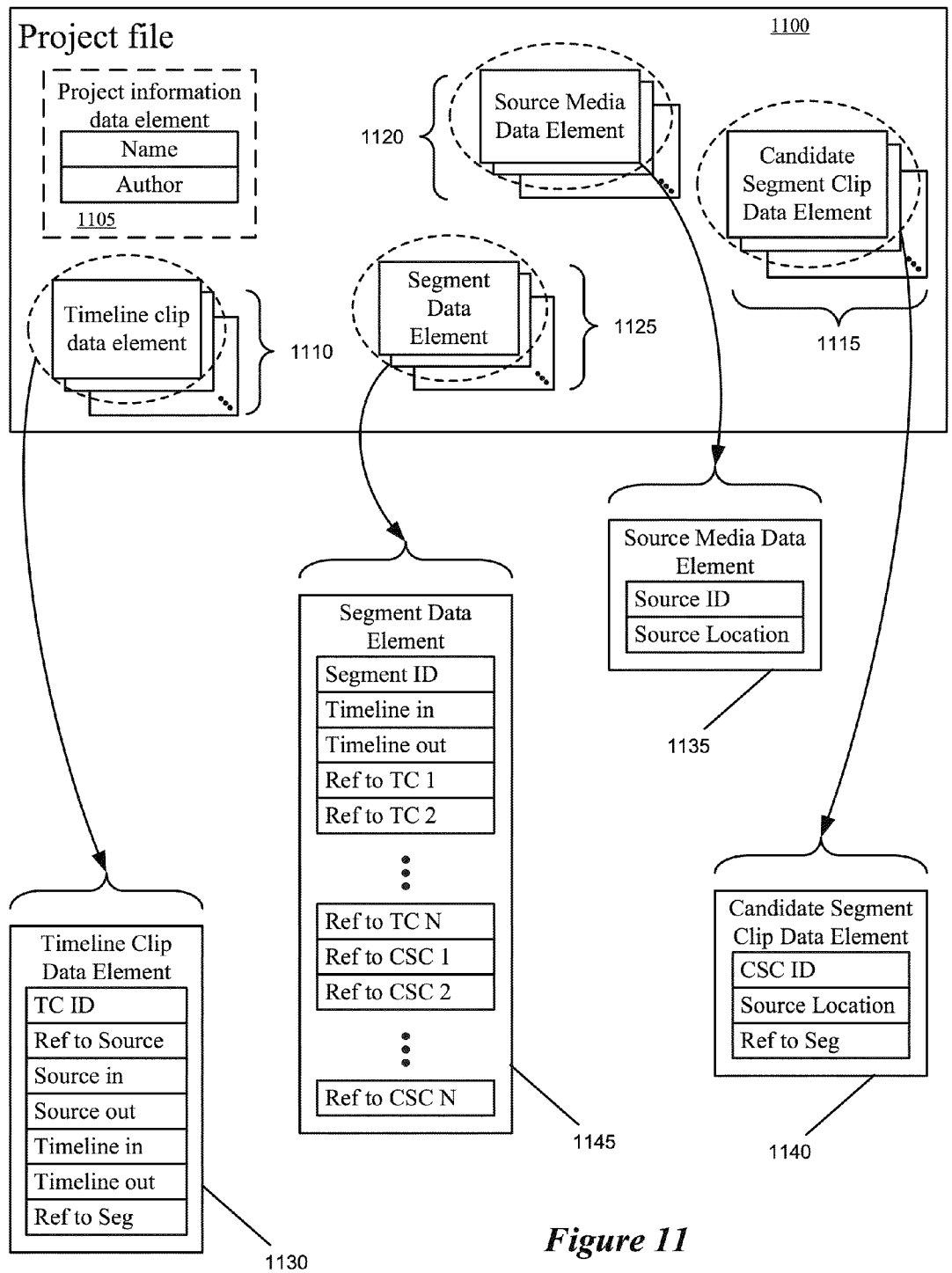
FIG. 11 illustrates a project data file of some embodiments.

Some embodiments store the association between a clip (e.g., a timeline clip, candidate segment clip, etc.) and the segment as metadata. FIG. 11 illustrates an example of a project file 1100 for a composite media presentation. The project file includes a project information data element 1105, a set of clip data elements 1110, a set of candidate segment clip data elements 1115, a set of source media data elements 1120, and a set of segment data elements 1125. The project information data element 1105 may include attributes such as the project name, author (i.e., editor), length, or other metadata about the project.

FIG. 11 also illustrates an example timeline clip data element 1130, example source media data element 1135, example candidate segment clip data element 1140, and example segment data element 1145. The timeline clip data element 1130 of some embodiments includes metadata defining the particular clip. The metadata includes a clip identifier, a reference to a source media, in and out points in the source media, and start and end times in the timeline. The clip data element 1130 also includes a reference (e.g., a pointer) to a segment data element from the set 1125 with which the clip is associated. In some embodiments, this is the association described above by reference to FIG. 5.

The source media data element 1135 of some embodiments includes metadata that defines a piece of unassociated source media. In some embodiments, the source media metadata includes a source identifier and a source media location (that is, a location on a hard disk or other storage where the source media is found). The source identifier is referenced in some embodiments by a particular timeline clip data element from the set 1110 to identify the source media as the source for the particular timeline clip. In some embodiments, the metadata for a source media data element also includes a bin identifier that identifies a folder in the browser navigation pane.

The candidate segment clip data element 1140 identifies a source media that has been associated with a segment (e.g., by a user dragging and dropping the source media into the segment). The candidate segment clip data element 1140 includes metadata such as a candidate segment clip identifier, a source location (that is, location on a hard disk or other storage where the source media is found), and a reference to a segment with which the candidate segment clip is associated. Rather than storing the source location, some embodiments define a segment clip by reference to a particular source media data element and a segment. As the candidate segment clip data element is not yet edited into the timeline, it does not include source in and out points or timeline start and end points.

The segment data element 1145 of some embodiments includes metadata defining the particular segment. The metadata includes a segment identifier, start and end times in the timeline for the segment, references to each of the timeline clips edited into the segment, and references to each of the candidate segment clips associated with the segment but not edited into the segment. Some embodiments also include references to any higher level segments with which the particular segment is associated. Furthermore, in some embodiments, the project data file includes supersegment (or any other level of segment) data elements. These data elements, in some embodiments, are defined just like the segment data elements. However, some embodiments define supersegment data elements only by reference to the segments they contain.

Figure 12:
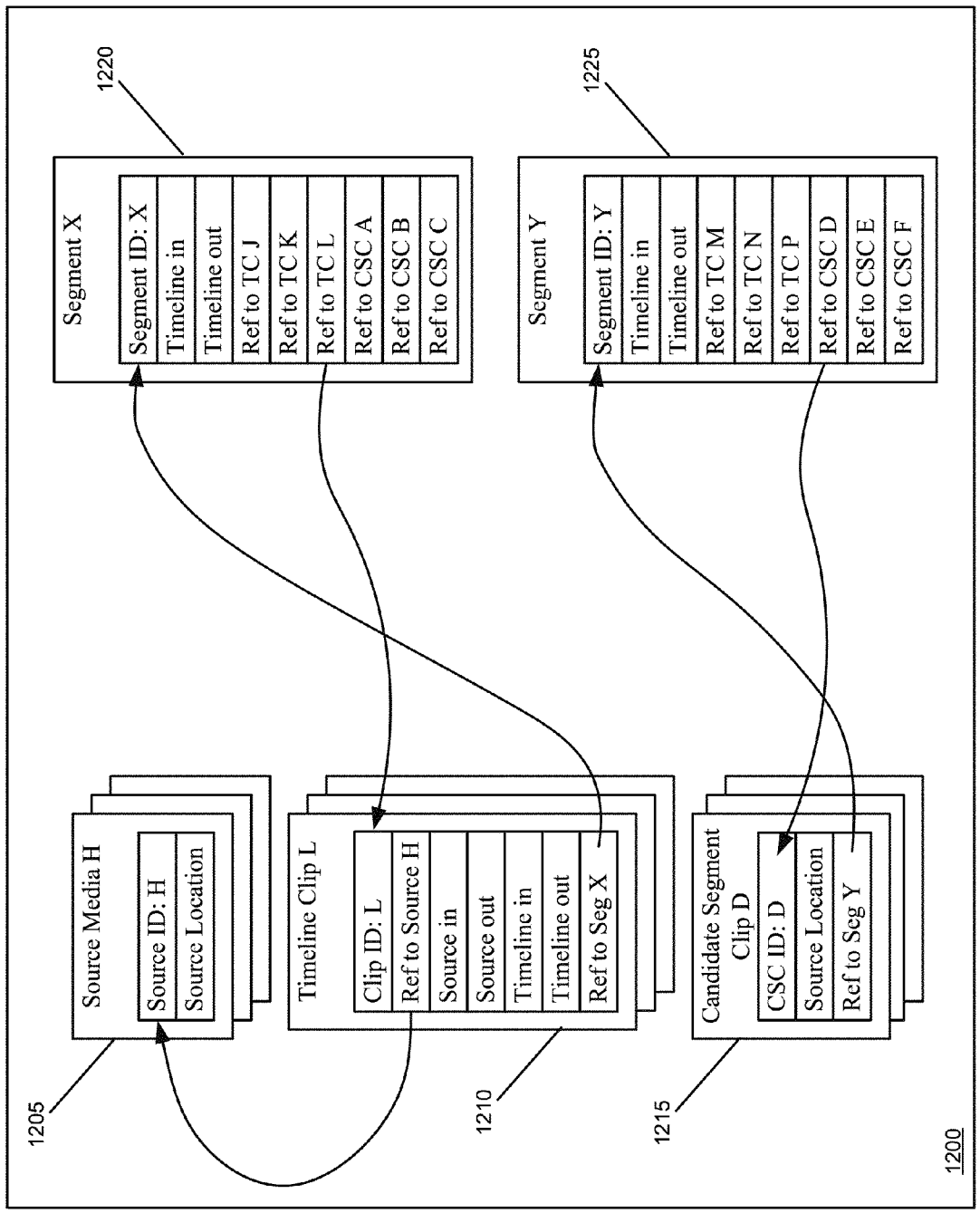
FIG. 12 illustrates example data elements of some embodiments.

FIG. 12 illustrates an example of a project file 1200 that includes source media data element 1205, a timeline clip data element 1210, a candidate segment clip 1215, two segment data elements 1220 and 1225, and the relationships between these elements. The source media data element 1205 is for Source Media H. Timeline clip data element 1210 is for Timeline Clip L. Timeline Clip L includes a reference to Source Media H as well as in and out points within Source Media H. Timeline Clip L also includes timeline start and end points and a reference to Segment X. As Timeline Clip L is only associated with one segment, the timeline start and end points must be within the timeline start and end points for Segment X. If Timeline Clip L were split between two segments, some embodiments would include references to each of the two segments. Candidate segment clip data element 1215 is for Candidate Segment Clip D. Candidate Segment Clip D includes a source media location, as well as a reference to Segment Y, the segment with which the source media is associated.

Segment clip data elements 1220 and 1225 are for Segments X and Y. Each of these segments includes three timeline clips and three candidate segment clips. Segment X includes a reference to Timeline Clip L that uses the TC ID for Timeline Clip L. Segment Y includes a reference to Candidate Segment Clip D that includes the CSC ID for Candidate Segment Clip D. In some embodiments, pointers are used for these references.

A timeline clip data element such as the element 1210 is created by the media-editing application of some embodiments when a user edits a clip into the timeline. Similarly, when a user associates a piece of source media with a segment without editing the source media into the timeline as a clip, a candidate segment clip data element such as the element 1215 is created. The above examples illustrate one particular method for defining associations of clips and source media to segments. One of ordinary skill in the art will recognize that many different methods for defining such associations exist.

This metadata (e.g., the associations) is used in some embodiments as a mechanism for creating and maintaining metadata about the structure of a story created by a user (e.g., editor, director, etc.). The metadata is retained as part of the composite media presentation, even after the presentation is rendered. Thus, the structure is retained with the presentation and is accessible to the user if they return to the presentation post-rendering to make further edits, copy the structure of the presentation into a new story, remove all of the media clips and make a new presentation with the same story structure, etc.

III. Creating New Segments

In some embodiments, when a presentation or sequence (i.e., a timeline) is initially defined, the media-editing application defines it as having one segment. From this point, a user can create more segments for the timeline in a variety of ways. As will be described in the following section, segments can be inserted into a timeline (adding more time to the overall media presentation) or carved out of an existing segment. UI operations to create a new segment may be performed in the composite display area, the story outline window, or elsewhere in the GUI of the media-editing application.

A. Creating Segments in the Composite Display Area

Figure 13:
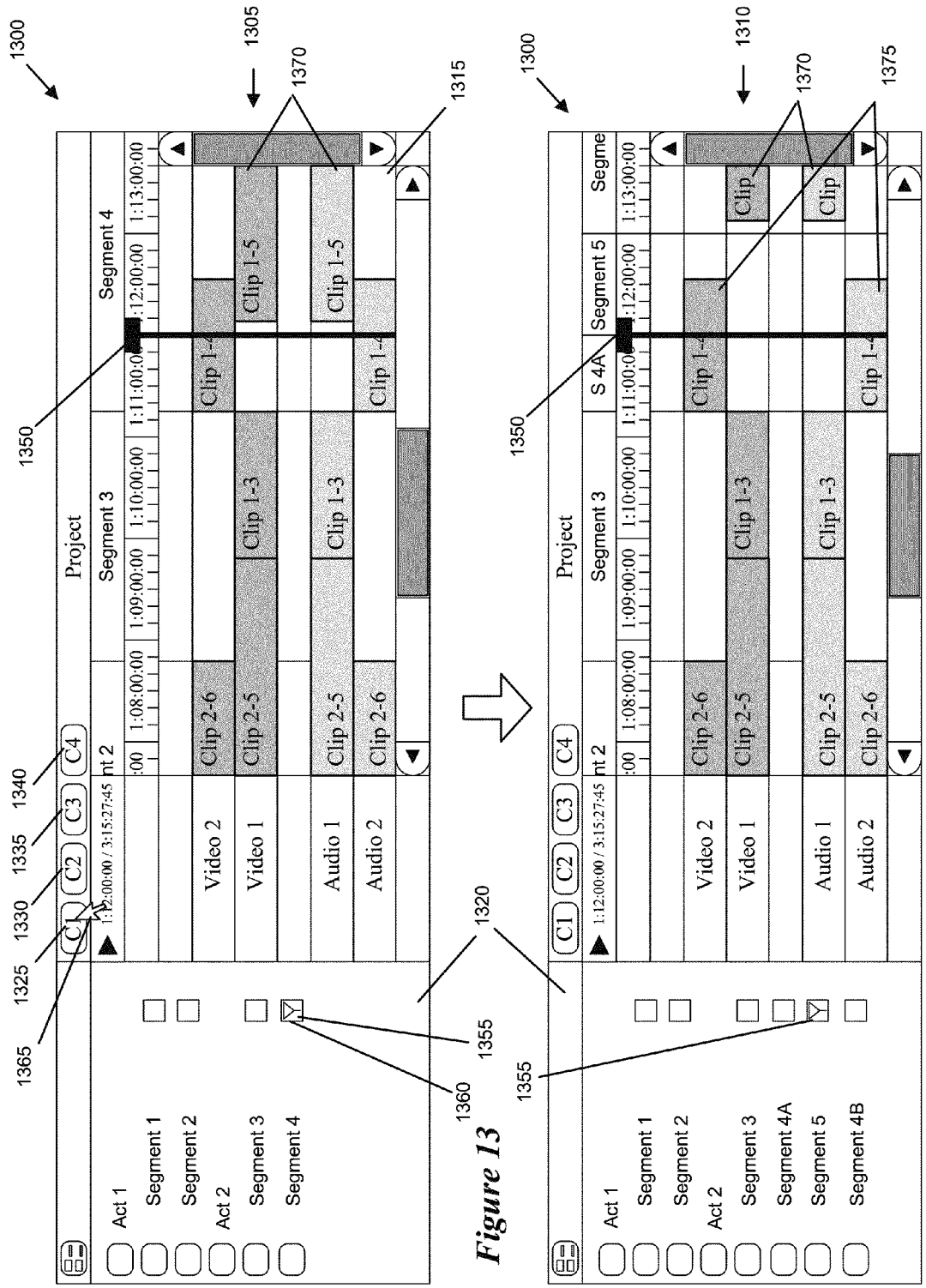
FIG. 13-16 illustrate four different operations for creating a new segment for a composite media presentation within the composite display area.

FIG. 13 illustrates a first operation to create new segments for a composite media presentation. Specifically, FIG. 13 illustrates a GUI 1300 in two stages, a first stage 1305 before the creation of new segments and a second stage 1310 after the creation of new segments. The GUI 1300 includes a composite display area 1315 and an outline window 1320.

The composite display area 1315 and outline window 1320 include many similar features to the display areas described above (e.g., those of GUI 800). Composite display area 1315 also includes four UI items 1325-1340. These UI items are conceptual illustrations of one or more UI items that can be used within the composite display area to create a new segment or segments for the composite media presentation that is represented in the composite display area. Different embodiments of the invention implement the UI items differently. Some embodiments implement them as UI buttons, others as a command that can be selected in a pull-down menu, drop-down menu, contextual menu that appears from a right-click, or other type of menu, and still others as a command invoked through one or more keystroke operations. Yet other embodiments allow the user to access the various segment creation mechanisms through multiple different UI items, including those not mentioned in the above paragraph.

FIG. 13 illustrates the use of the first of these UI items 1325, which causes the insertion of a new segment at the location in the timeline of the playhead 1350. The first stage 1305 illustrates that the playhead is located within Segment 4 at a time of approximately 1:12:00:00. This information is also reflected in story outline 1320, which has a playhead icon 1355 located in the playhead indicator 1360 for Segment 4. Story outline 1320 also indicates that there are four segments split among two acts in stage 1305.

A cursor 1365 is located on top of UI item 1325 in stage 1305, and stage 1310 illustrates the result of a user selecting UI item 1325. Segment 4 has been split into three segments: Segment 4A, Segment 5, and Segment 4B. Various different embodiments use different naming schemes when naming the segments. In the case where the segments are merely numbered (in some cases they will be "Scene 1, Scene 2, . . . "), some embodiments use A and B to differentiate the segments. Other embodiments would number the segments in order as Segments 4, 5, and 6. When the segments have user-defined names (e.g., "Coffee House"), some embodiments split the segment into "CoffeeHouse A", "Segment 1" (or the next available number), and "CoffeeHouse B". The user can then define names for the segments as they see fit.

Different embodiments determine the duration of the new segment differently. Some embodiments include an intermediate step asking the user to indicate a desired duration for the segment, whereas other embodiments just initially create the new segment with a default duration. In the illustrated case of FIG. 13, the default duration is one minute.

Different clip behaviors are possible when the segment is split in half and part of the segment is moved in the timeline. Some embodiments do not move the clips at all relative to the timeline. In other words, no clip representations would be moved relative to the timeline in the composite display area, and there would just be new segment boundaries. In the case of FIG. 13, however, clips that begin to the right of the point of insertion are all moved to the right by the duration of the inserted segment. Thus video and audio clips 1-5 1370 are moved one minute later in the timeline. As clips 1-4 1375 begin prior to the insertion point (playhead 1350), they are not moved from stage 1305 to stage 1310. Some embodiments, though, cut off (i.e., razor) clips 1-4 1375 at the playhead such that the inserted segment is completely devoid of content. In either case, after the segment insertion, if the user decides that they prefer the other option, they can perform a trim edit to modify the out point of clips 1-4.

In addition to affecting the timeline, the new segments are included in the outline window 1320 as well. As Segment 4 was included within Act 2, the new segments are all included in the Act 2 supersegment. In the case where the playhead is located on the border between two scenes, some embodiments do not split any of the previous segments and instead just insert the new segment between the two. When the playhead is also at the border between two supersegments, different embodiments assign the new segment to one or the other of the supersegments. In addition, within the story outline, the playhead indicator icon 1355 has been moved to the playhead indicator for the new segment. In some embodiments, when the playhead is at a border between two segments, the indicator icon is placed in the later of the two segments to indicate that playing the presentation in the preview display (i.e., preview display 805) will play the content of that segment.

Figure 14:
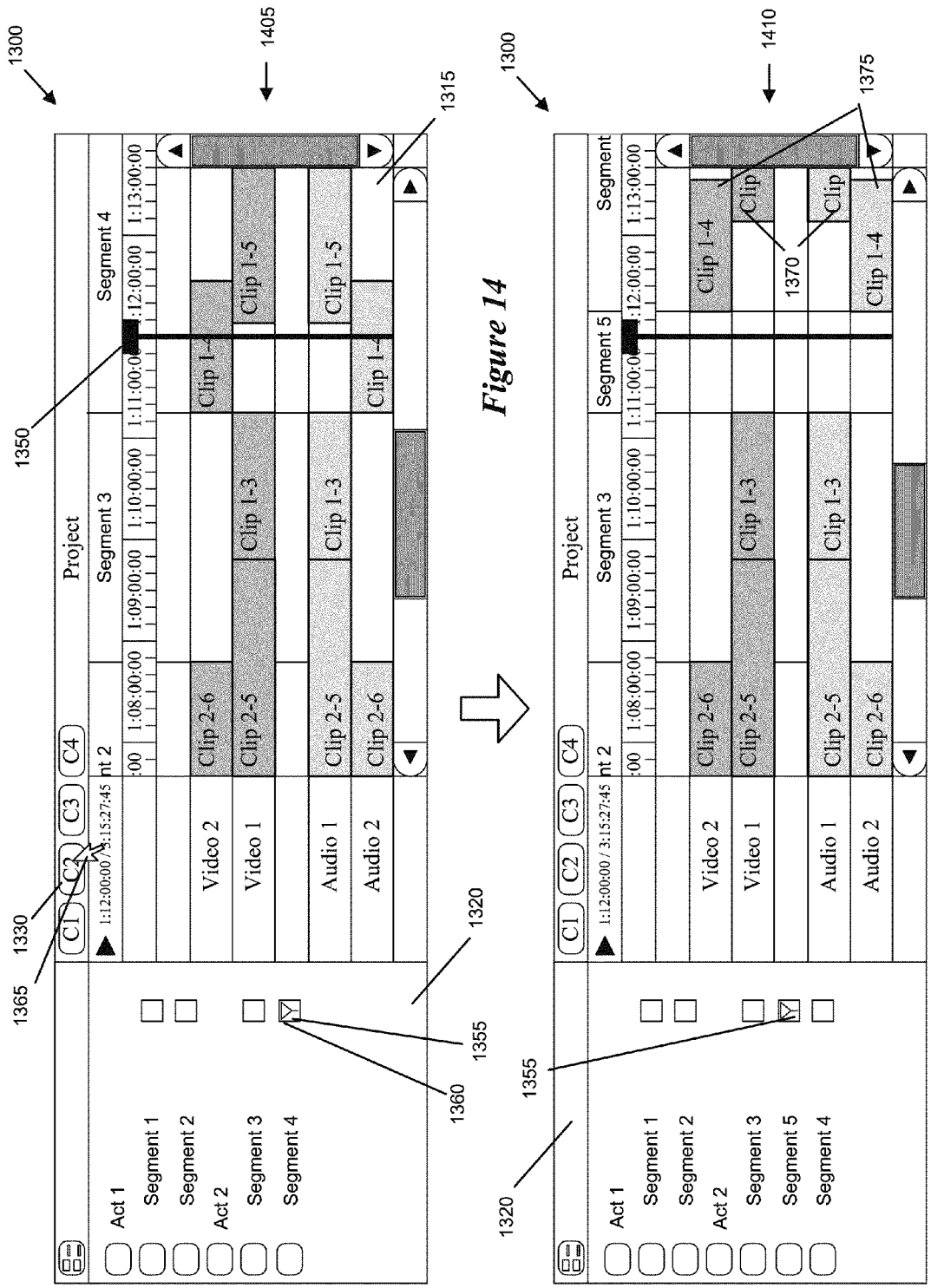

FIG. 14 illustrates a second operation to create a new segment for a composite media presentation. Specifically, FIG. 14 illustrates the GUI 1300 in two stages, a first stage 1405 before the creation of a new segment and a second stage 1410 after the creation of a new segment. As in FIG. 13, The GUI 1300 includes composite display area 1315 with selectable UI items 1325-1340 and outline window 1320.

FIG. 14 illustrates the use of the second of the selectable UI items 1330 for segment creation, which causes the insertion of a new segment before the segment in which the playhead 1350 is presently located. The first stage 1405 illustrates that the playhead is located within Segment 4 at a time of approximately 1:12:00:00. This information is also reflected in story outline 1320, in which the playhead icon 1355 located in the playhead indicator 1360 for Segment 4. Story outline 1320 also indicates that there are four segments split among two acts in stage 1405.

Cursor 1365 is located on top of UI item 1330 in stage 1405, and stage 1410 illustrates the result of a user selecting UI item 1330. A new segment, Segment 5, has been inserted in between Segment 3 and Segment 4. Various different embodiments use different naming schemes when naming the segments. In the case where the segments are merely numbered (in some cases they will be "Scene 1, Scene 2, . . . "), some embodiments use the next available number for the new segment (as is the case in stage 1410). Other embodiments renumber the segment names. When the segments have user-defined names (e.g., "Car Chase"), some embodiments use "Segment 1" for the new segment (or the next available number). The user can then define a new, descriptive name for the segment as they see fit.

Different embodiments determine the duration of the new segment differently. Some embodiments include an intermediate step asking the user to indicate a desired duration for the segment, whereas other embodiments just initially create the new segment with a default duration. In the illustrated case of FIG. 14, the default duration is one minute.

Different clip behaviors are possible when a segment is inserted between two previous segments. When there are no clips overlapping the segment boundary, as is the case in FIG. 14, some embodiments insert a blank segment and push to the right by the duration of the segment all of the clips that come after the segment boundary. Thus, clips 1-4 1375 and 1-5 1370 are all moved one minute later in the timeline (retaining their place in Segment 4). In the case where clips crossed over the segment boundary before the insertion, these clips remain unchanged in some embodiments (see FIG. 15 below). Other embodiments, however, razor the clips at the segment boundary so that the newly inserted segment is devoid of content. In either case, after the segment is inserted, if the user decides that they prefer the other option, they can move clips 1-4 1375 and 1-5 1370 manually.

In addition to affecting the timeline, the new segment is included in the outline window 1320 as well. As Segment 3 and Segment 4 are included within Act 2, the new segment is included in the Act 2 supersegment as well. In the case where the insertion point is the border between two supersegments (because the playhead is in the first segment of a supersegment), different embodiments assign the new segment to one or the other of the supersegments. Some embodiments assign the new segment to the later supersegment because the playhead is located there. In addition, within the story outline, the playhead indicator icon 1355 has been moved to the playhead indicator for the new segment. In some embodiments, when the playhead is at a border between two segments, the indicator icon is placed in the later of the two segments to indicate that playing the presentation in the preview display (i.e., preview display 805) will play the content of that segment.

Figure 15:
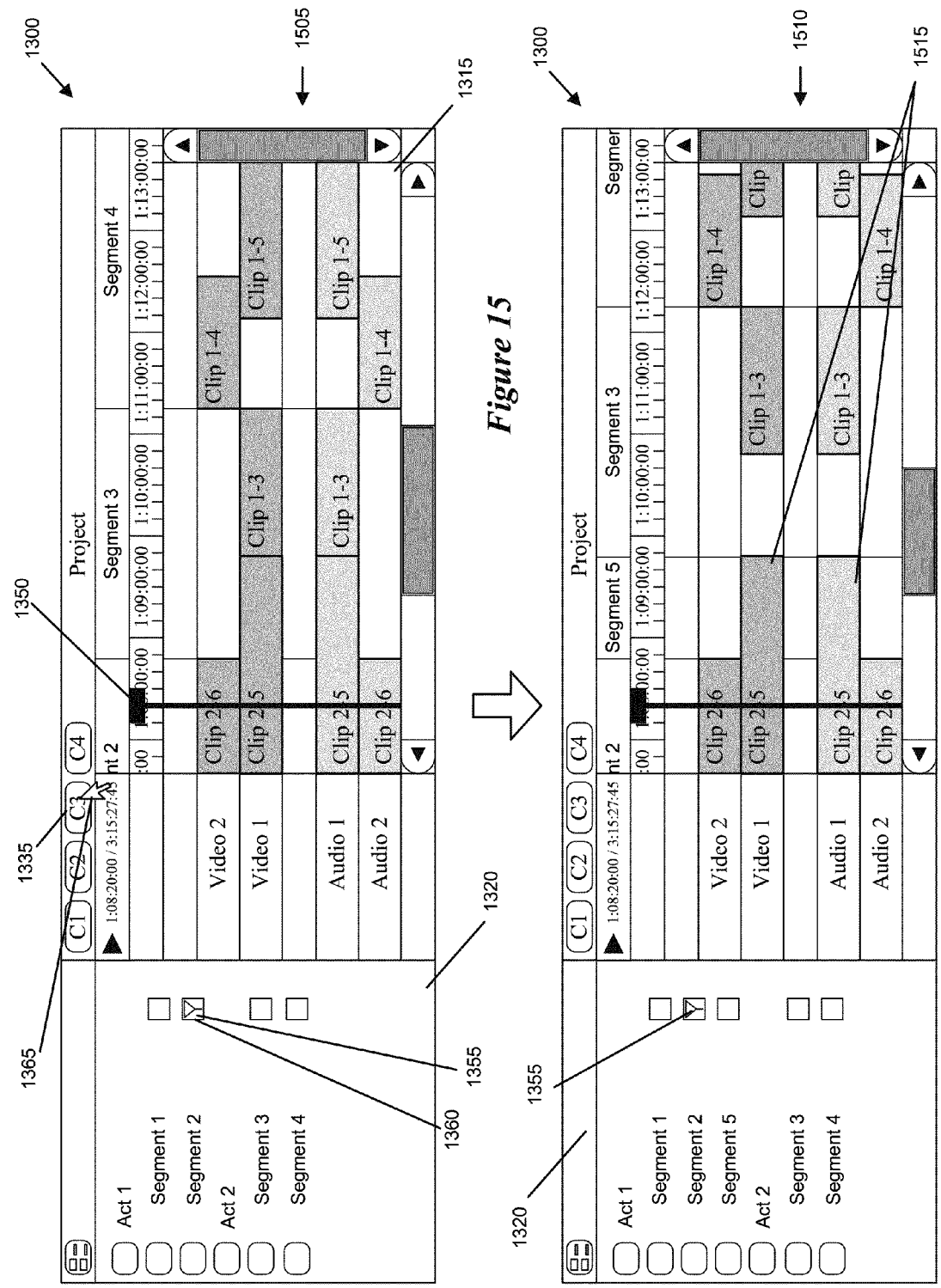

FIG. 15 illustrates a third operation to create a new segment for a composite media presentation. Specifically, FIG. 15 illustrates the GUI 1300 in two stages, a first stage 1505 before the creation of a new segment and a second stage 1510 after the creation of a new segment. As in FIG. 13, The GUI 1300 includes composite display area 1315 with selectable UI items 1325-1340 and outline window 1320.

FIG. 15 illustrates the use of the third of the selectable UI items 1335 for segment creation, which causes the insertion of a new segment after the segment in which the playhead 1350 is presently located. The first stage 1505 illustrates that the playhead is located within Segment 2 at a time of approximately 1:08:20:00. This information is also reflected in story outline 1320, in which the playhead icon 1355 located in the playhead indicator 1360 for Segment 2. Story outline 1320 also indicates that there are four segments split among two acts in stage 1505.

Cursor 1365 is located on top of UI item 1335 in stage 1505, and stage 1510 illustrates the result of a user selecting UI item 1335. A new segment, Segment 5, has been inserted in between Segment 2 and Segment 3. Various different embodiments use different naming schemes when naming the segments. In the case where the segments are merely numbered (in some cases they will be "Scene 1, Scene 2, . . . "), some embodiments use the next available number for the new segment (as is the case in stage 1510). Other embodiments renumber the segment names. When the segments have user-defined names (e.g., "Bar Fight"), some embodiments use "Segment 1" for the new segment (or the next available number). The user can then define a new, descriptive name for the segment as they see fit.

Different embodiments determine the duration of the new segment differently. Some embodiments include an intermediate step asking the user to indicate a desired duration for the segment, whereas other embodiments just initially create the new segment with a default duration. In the illustrated case of FIG. 15, the default duration is one minute.

Different clip behaviors are possible when a segment is inserted between two previous segments. When there are clips crossing over the segment boundary prior to the insertion, these clips remain unchanged in some embodiments, as is the case with clips 2-5 1515. Other embodiments, however, razor the clips at the segment boundary so that the newly inserted segment is devoid of content. In either case, after the segment is inserted, if the user decides that they prefer the other option, they can modify the out points of clips 2-5 1515 manually. Clips that begin to the right of the segment boundary are pushed later in the timeline by the duration of the newly inserted segment. In the case that no clips overlap the segment border, some embodiments insert a blank segment and push all of the clips that come after the segment boundary to the right by the duration of the segment.

In addition to affecting the timeline, the new segment is included in the outline window 1320 as well. As the border between Segment 2 and Segment 3 is also the border between supersegments Act 1 and Act 2, a decision must be made regarding to which supersegment the new segment should be assigned. Different embodiments assign the new segment to one or the other supersegment. For instance, some embodiments assign the new segment to the earlier supersegment in this case because the playhead is located within that supersegment. Some embodiments create a new supersegment that includes only the new segment. Within the story outline 1320, the playhead indicator icon 1355 has not moved, as the playhead remains within Segment 2.

Figure 16:
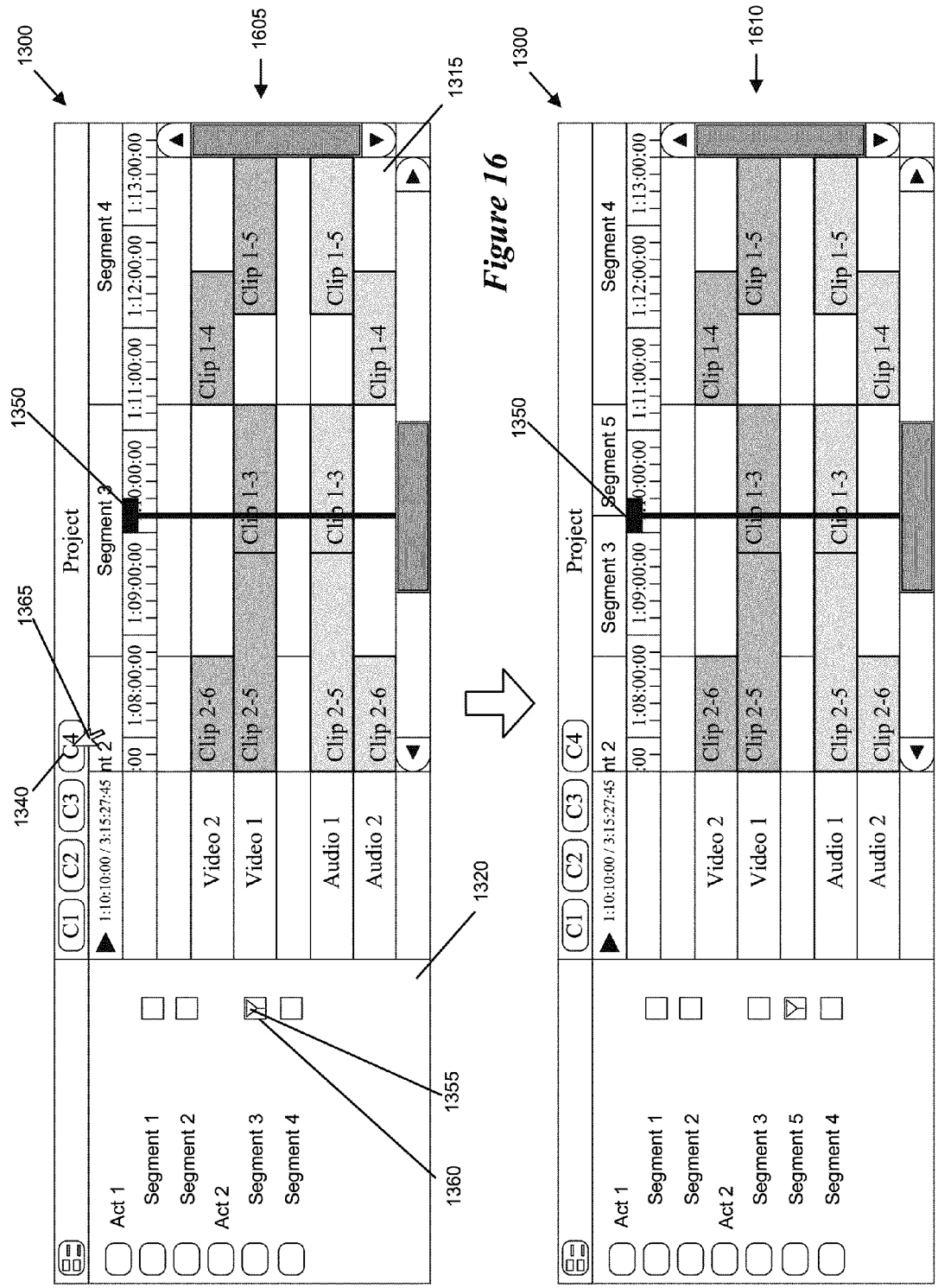

FIG. 16 illustrates a fourth operation to create a new segment for a composite media presentation. Specifically, FIG. 16 illustrates the GUI 1300 in two stages, a first stage 1605 before the creation of a new segment and a second stage 1610 after the creation of a new segment. As in FIG. 13, The GUI 1300 includes composite display area 1315 with selectable UI items 1325-1340 and outline window 1320.

FIG. 16 illustrates the use of the fourth of the selectable UI items 1340 for segment creation, which causes the segment in which the playhead 1350 is presently located to split into two segments at the location of the playhead 1350. The first stage 1605 illustrates that the playhead is located within Segment 3 at a time of approximately 1:10:10:00. This information is also reflected in story outline 1320, which has the playhead icon 1355 located in the playhead indicator 1360 for Segment 3. Story outline 1320 also indicates that there are four segments split among two acts in stage 1605.

Cursor 1365 is located on top of UI item 1340 in stage 1605, and stage 1610 illustrates the result of a user selecting UI item 1340. Segment 3 has been split into two segments at playhead 1350, Segment 3 and Segment 5. Various different embodiments use different naming schemes when naming the segments. In the case where the segments are merely numbered (in some cases they will be "Scene 1, Scene 2, . . . "), some embodiments use the next available number for the new segment (as is the case in stage 1610). Other embodiments renumber the segment names, or name the segments using A and B (e.g., "Segment 3A" and "Segment 3B". When the segments have user-defined names (e.g., "Rooftop Shootout"), some embodiments use "Segment 1" for the new segment (or the next available number). The user can then define a new, descriptive name for the segment as they see fit. When a segment is simply split in two, with no time inserted into the timeline (unlike the situation in FIGS. 13-15), no clips are moved in the timeline.

Figure 17:
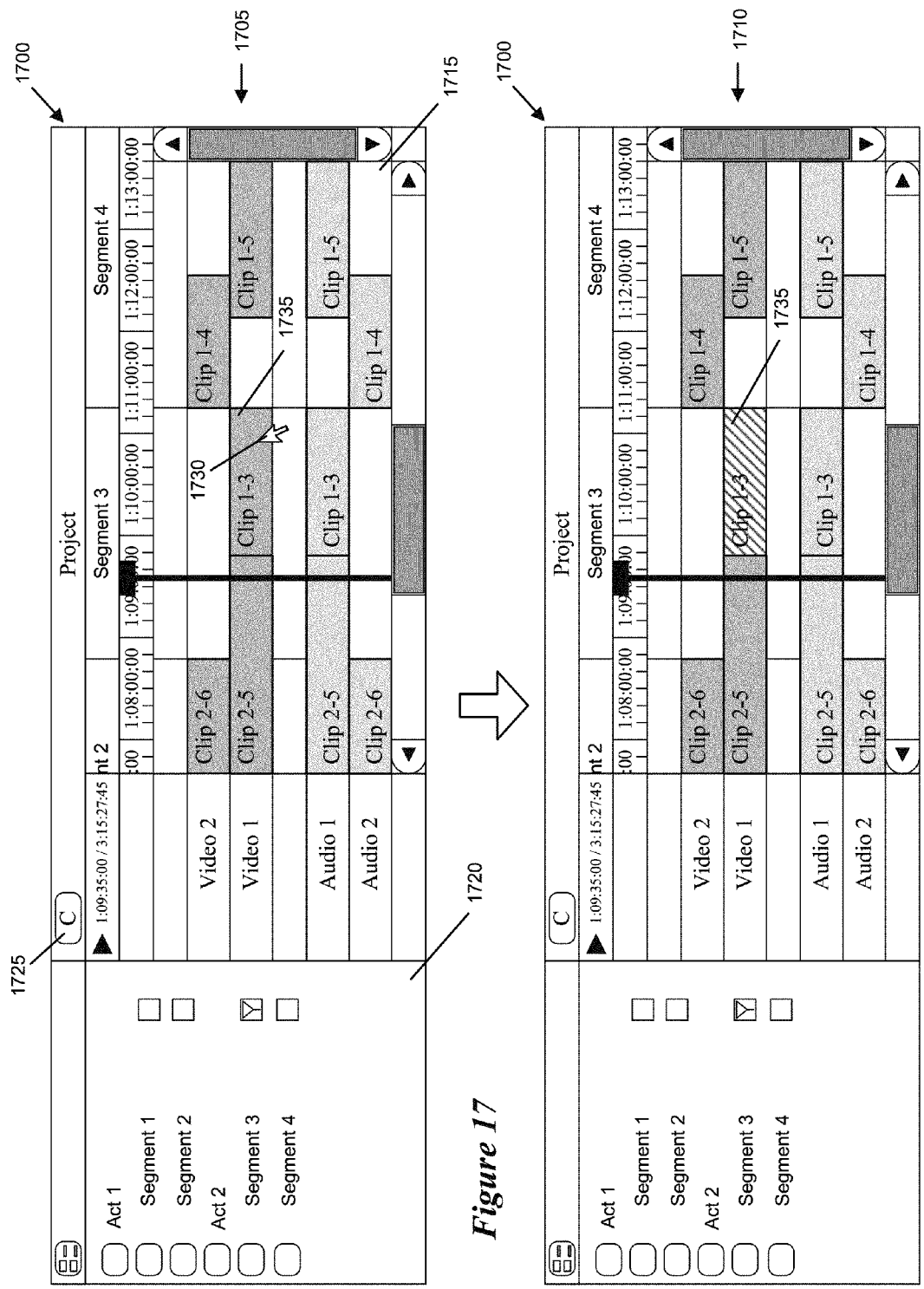
FIG. 17 illustrates the selection of clip shapes in a composite display area.

Segments can also be created based on selected clips in some embodiments. FIG. 17 illustrates the selection of a graphical representation of a media clip in a GUI 1700 according to some embodiments. Specifically, FIG. 17 illustrates GUI 1700 in two stages, a first stage 1705 before the selection of a clip shape and a second stage 1710 after the selection of a clip shape. GUI 1700 includes a composite display area 1715 and an outline window 1720.

The composite display area 1715 and outline window 1720 are mostly similar to the display areas described above for GUI 1300. Instead of UI items 1325-1340, however, composite display area 1715 includes UI item 1725 for creating a new segment based on selected segments. This UI item is a conceptual illustration of one or more UI items that can be used within the composite display area to create a new segment for the composite media presentation that is represented in the composite display area. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. Yet other embodiments allow the user to access the segment creation mechanism through multiple different UI items, including those not mentioned in the above paragraph.

A cursor 1730 is located on top of a clip shape 1735 in stage 1705, and stage 1710 illustrates the result of a user selecting the clip shape 1735. In stage 1710, the clip shape 1735 is highlighted to indicate its selection. Various embodiments use different indicators to visually indicate that a clip is selected (e.g., crosshatching or otherwise changing the interior display, changing color, changing the display of the border, etc.).

Figure 18:
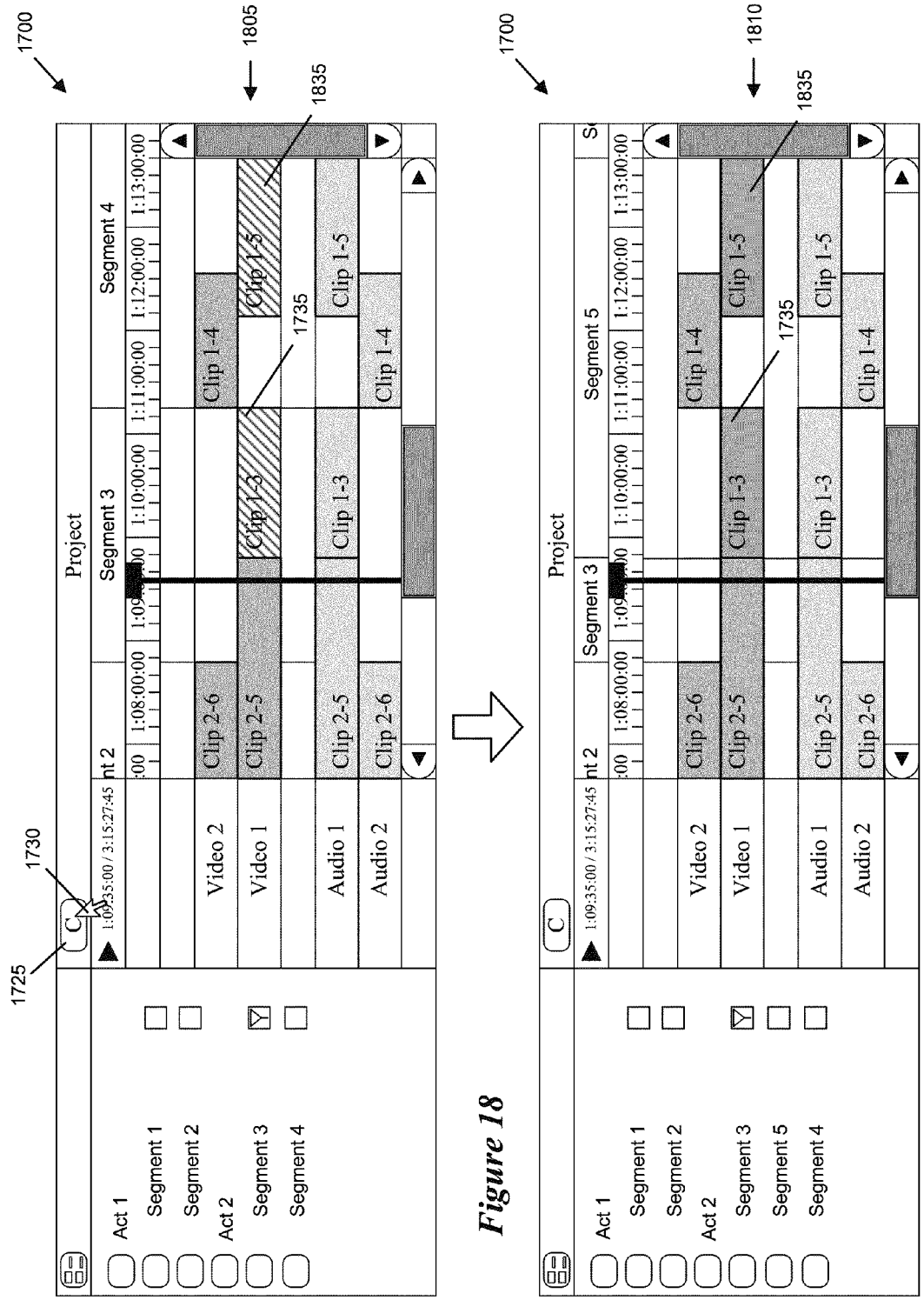
FIG. 18 illustrates the creation of a new segment for a composite media presentation based on selected clips.

FIG. 18 illustrates the use of UI item 1725 to create a new segment based on selected clips. Specifically, FIG. 18 illustrates the GUI 1700 in two stages, a first stage 1805 in which two clips are selected and a second stage 1810 in which a new segment has been created based on the selected clips.

In the first stage 1805, clip shape 1735 is selected, as is clip shape 1835. Clip shape 1735 begins at approximately 1:09:48:00 in the timeline and clip shape 1835 ends at approximately 1:13:40:00 in the timeline. Cursor 1730 is located on top of UI item 1725 in this stage, and stage 1810 illustrates the result of a user selecting UI item 1725. A new segment, Segment 5, now spans the duration from the start of clip shape 1735 at 1:09:48:00 to the end of clip shape 1835 at 1:13:40:00. Segment 3, where the first clip shape originally began and Segment 4, where the last clip shape originally ended, remain but are now smaller.

Various different embodiments use different naming schemes for the new segment. When the segment completely envelops the duration of one or more previous segments, some embodiments assign the new segment the name of one of the enveloped segments (e.g., the first such segment). In the case where no segments are completely removed and the segments are merely numbered (as is the case in GUI 1700), some embodiments use the next available number. As no time is added or removed with the use of UI item 1725, none of the clip shapes are affected with regard to their place in the timeline.

B. Creating Segments in the Outline Window

Figure 19:
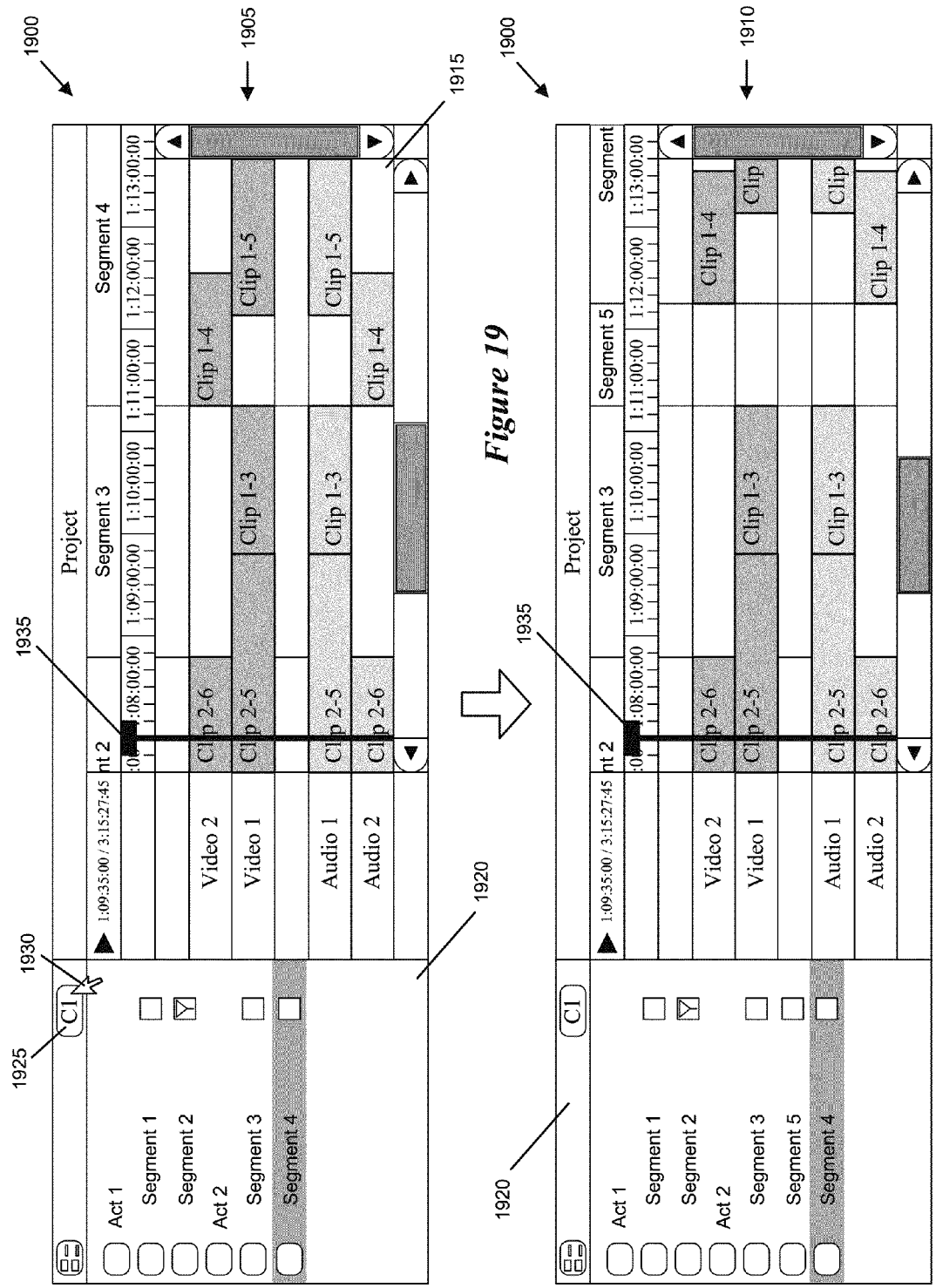
FIG. 19 illustrates an operation to create a new segment for a composite media presentation using the outline window.

The above four examples of FIGS. 13-16 illustrated a GUI 1300 that enables the creation of new segments within the composite display area 1315. Some embodiments, either alternatively or conjunctively, enable creation of new segments from within the story outline. FIG. 19 illustrates an operation to create a new segment for a composite media presentation. Specifically, FIG. 19 illustrates a GUI 1900 in two stages, a first stage 1905 before the creation of a new segment and a second stage 1910 after the creation of a new segment. The GUI 1900 includes a composite display area 1915 and an outline window 1920.

The composite display area 1915 and outline window 1920 are mostly similar to the display areas described above for GUI 1300. Outline window 1920 also includes a UI item 1925. This UI item is a conceptual illustration of one or more UI items that can be used within the story outline to create a new segment for the composite media presentation that is represented in the composite display area. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. Yet other embodiments allow the user to access the segment creation mechanism through multiple different UI items, including those not mentioned in the above paragraph.

FIG. 19 illustrates the use of item 1925, which causes the insertion of a new segment into the timeline prior to a segment selected in the story outline 1920. The first stage 1905 illustrates that Segment 4 is selected in story outline 1920, as indicated by a gray bar. Selection of a segment in the story outline is indicated in different manners in different embodiments. Some embodiments use a bar such as that shown in stage 1905, while others italicize the text of the segment name, modify the display of the thumbnail to the left of the segment name, or use another visual indicator.

Some embodiments differentiate between a primary selection of an item and a secondary selection of an item. That is, if a user selects a second item (i.e., by clicking on the item while holding down the "control" key) while a first item is already selected, the previously selected item is a primary selection and the newly selected item is a secondary selection. In some embodiments, different visual selection indicators are used for primary selections and secondary selections. Furthermore, some operations (e.g., inserting a new segment) are only applicable to one segment at a time, and these are applied to the primary selection. Other operations (e.g., deleting a segment) are applicable to all selected segments.

A cursor 1930 is located on top of UI item 1925 in stage 1905, and stage 1910 illustrates the result of a user selecting UI item 1925, which causes the insertion of a new segment before the segment that is selected in outline window 1920. Although the playhead 1935 is in Segment 2, because Segment 4 is selected in the outline window the new segment is inserted before Segment 4. When the new segment is inserted, the behavior of the clips, naming, outline modification, and supersegment assignment is the same as is described above for FIG. 14 in some embodiments.

One of ordinary skill in the art will recognize that other segment creation mechanisms are available through the story outline as well. For instance, some embodiments enable a user to insert a new segment after a selected segment, or to insert a segment after the last segment or before the first segment. Furthermore, through the story outline, a user can delete one or more segments or add or delete supersegments. Some embodiments include a drop-down menu (or other type of menu) in the story outline that includes these various segment creation operations as options, as well as other operations including those described below.

C. Merging Segments

Figure 20:
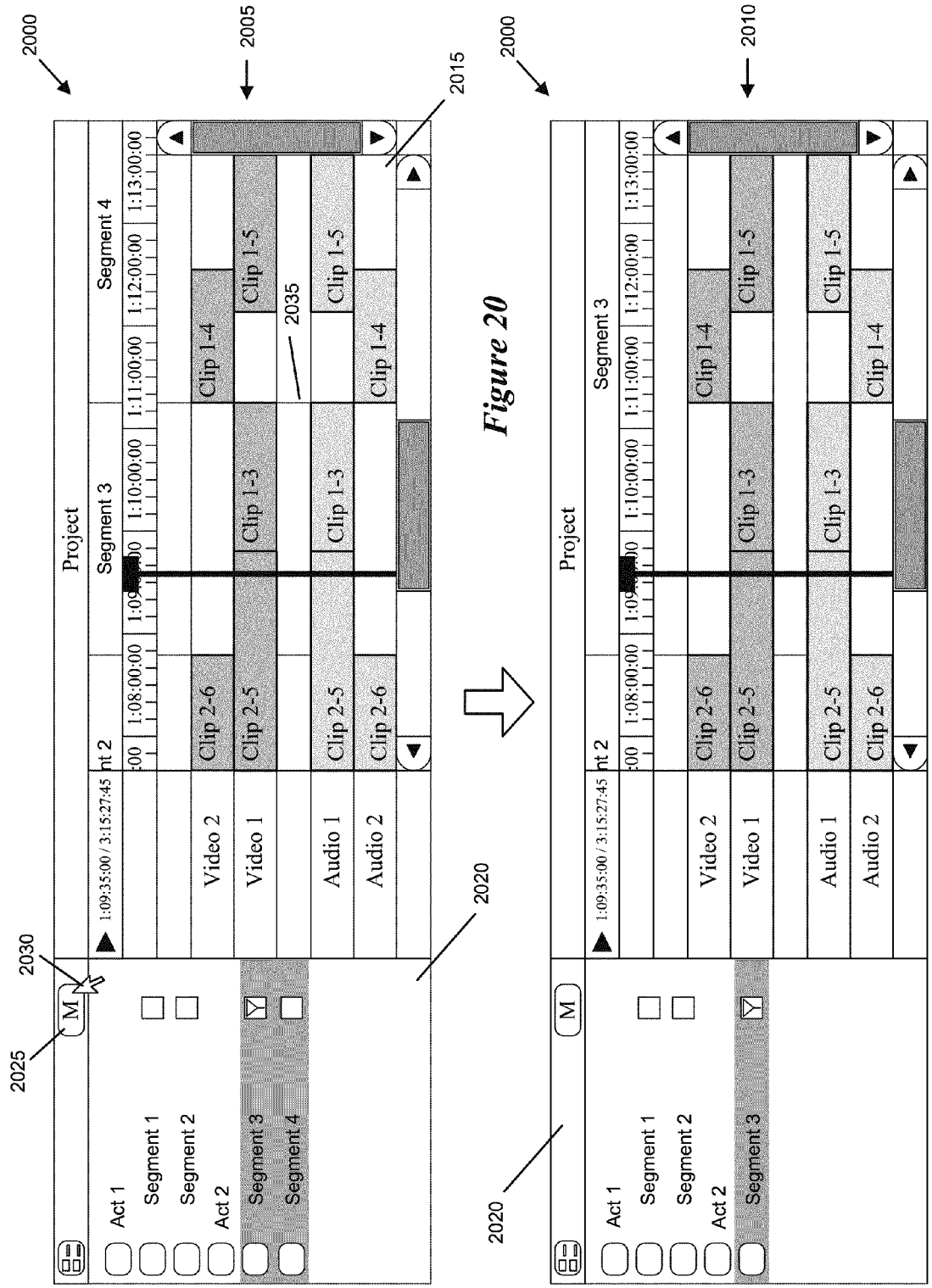
FIG. 20 illustrates an operation to merge two segments of a composite media presentation.

Some embodiments also enable a user to merge subsequent segments through either the story outline, the composite display area, or both. FIG. 20 illustrates an operation to merge two segments of a composite media presentation through the story outline. Specifically, FIG. 20 illustrates a GUI 2000 in two stages, a first stage 2005 before two segments are merged and a second stage 2010 after the segments are merged. The GUI 2000 includes a composite display area 2015 and an outline window 2020.

The composite display area 2015 and outline window 2020 are mostly similar to the display areas described above for GUI 1300. Outline window 2020 also includes a UI item 2025. This UI item is a conceptual illustration of one or more UI items that can be used within the story outline to create a new segment for the composite media presentation that is represented in the composite display area. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. For example, some embodiments implement the UI item for merging segments as an option in a menu that also includes options for creating new segments, as described above. Yet other embodiments allow the user to access the segment creation mechanism through multiple different UI items, including those not mentioned in the above paragraph.

FIG. 20 illustrates the use of item 2025, which causes two segments selected in the outline window 2020 to merge into one segment. The first stage 2005 illustrates that Segment 3 and Segment 4 are both selected in story outline 2020, as indicated by the gray bars. A cursor 2030 is located on top of UI item 2025 in stage 2005, and stage 2010 illustrates the result of a user selecting UI item 2025, which causes the two selected segments to be merged into one segment. For the name of the newly merged segment, some embodiments use the name of either the first or last of the merged items in timeline order, while other embodiments use the name of the first segment selected (i.e., a primary selection) in the outline window 2020.

When defining the new segment in the composite display area 2015, some embodiments just remove any segment boundaries (e.g., segment boundary 2035) and modify the segment header as appropriate. Media clips need not be moved as no time is inserted or removed from the timeline. As mentioned, in some embodiments a similar UI item is available in the composite display area. Selection of segments in the composite display area, which can be used to identify the segments to merge together, is described below in Section IV.

D. Process for Creating New Segments

Figure 21:
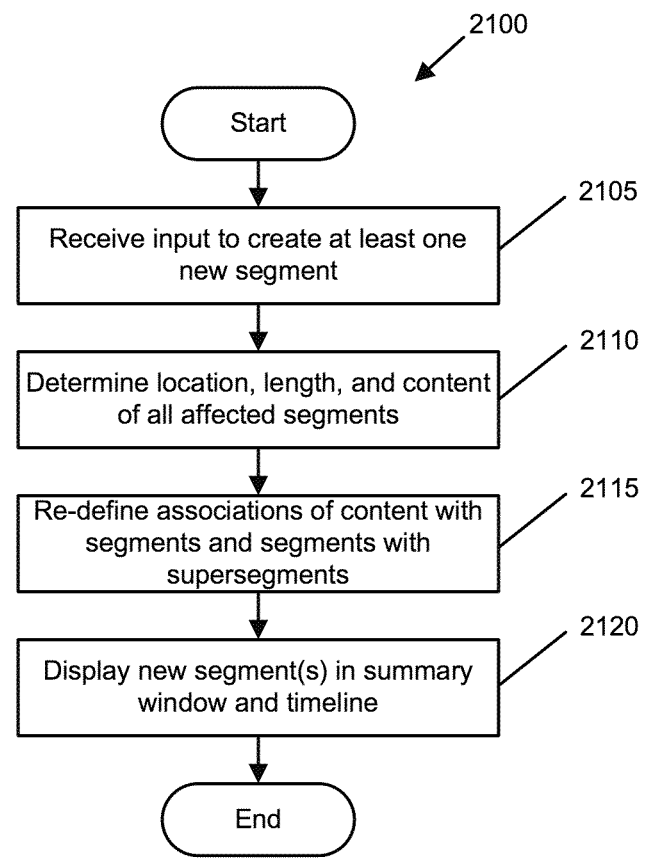
FIG. 21 conceptually illustrates a process of some embodiments for creating new segments.

When new segments are created (or segments are otherwise modified), some embodiments must re-associate the hierarchy of the timeline in addition to visually displaying the new segments. FIG. 21 conceptually illustrates a process 2100 of some embodiments for creating new segments that includes such re-association.

Process 2100 begins by receiving (at 2105) input to create at least one new segment. In some embodiments, this input is the selection of a UI item such as is shown in FIGS. 13-18 above. The selection input may be received from a cursor controller (e.g., a mouse, touchpad, trackpad, etc.), from a touchscreen (e.g., a user touching a UI item on a touchscreen), from keyboard input (e.g., a hotkey or key sequence), etc. The input may be input to create a new segment before or after a selected segment, to split a segment, etc.

Process 2100 next determines (at 2110) the location (in time), duration, and content of all affected segments. This includes any segments that are moved, shortened, enlarged, or created as a result of the received input. For instance, in the case illustrated in FIG. 15, Segments 3-5 are all affected, because Segment 5 is created, Segments 3-4 are moved later in the timeline, and certain content (clips 2-5 1515) is no longer associated with Segment 3.

The process then redefines (at 2115) the associations of content with segments, segments with supersegments, and any further levels of hierarchy that are affected. For instance, in the case illustrated in FIG. 15, Segment 5 is created and associated with Act 1, while the media clip represented by clip shapes 1515 is associated with Segment 5 and disassociated with Segment 3. Similarly, in the case illustrated in FIG. 16, Segment 5 is created and associated with Act 2 and the media clip represented by clip shapes 1635 is associated with Segment 5 while also remaining associated with Segment 3.

In some embodiments, the associations defined at 2115 are associations such as those represented in FIG. 5, that define the hierarchical structure of the timeline. These associations are also redefined anytime content is added or removed from the timeline, content is moved within the timeline, segments are merged (as in FIG. 20 above), segments are moved (as described below in Section IV), etc.

Finally, process 2100 displays (at 2120) any new segments in the summary window and the timeline. This operation accounts for the difference between the first and second stages illustrated in the various examples above.

E. Creating a Hierarchy from Structured Input

Figure 22:
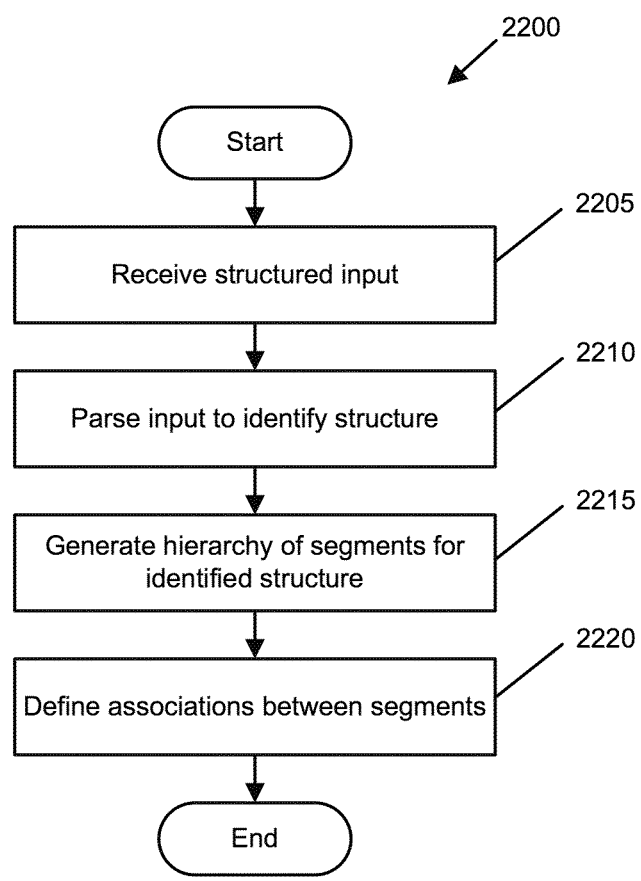
FIG. 22 illustrates a process of some embodiments for defining a hierarchy based on structured input.

In addition to creating segments individually based on user input, the media-editing application of some embodiments can read a structured input document and define a hierarchy based on the structured input. FIG. 22 illustrates a process 2200 of some embodiments for defining a hierarchy based on such an input document. FIG. 22 will be described by reference to FIG. 23, which illustrates the conversion of a structured input document (specifically, a screenplay document 2300) to a hierarchy for a timeline.

Process 2200 begins by receiving (at 2205) structured input. Screenplay document (i.e., a movie or television show script) 2300 is an example of such a structured input document. Screenplay document 2300 includes a title 2305, act names 2320, scene names 2325, dialogue 2330, etc. Other examples of documents that can be converted by some embodiments include slideshow files (e.g., Keynote® or PowerPoint® presentations), storyboards, outlines created in a word processor, or other such documents that define a story via a hierarchy.

Process 2200 next parses (at 2210) the input document to identify the structure. If the document is text, some embodiments read the text and look for indentation, act and scene names, or other clues as to the story hierarchy. If the document is a slideshow file such as a Keynote® or PowerPoint® file, these files often have hierarchical information stored in them and the process can read this information. The process parses information differently from each type of file in order to identify the structure.

After the input document is parsed, the process generates (at 2215) a hierarchy of segments for the identified structure. That is, the process defines all of the segments, supersegments, etc. for a timeline for the story conveyed by the document. For instance, referring to screenplay 2300, the process defines supersegments for the acts ("Act 1: The Creation", "Act 2: The Movement", etc.) and segments for the scenes ("The 1$^{st}$ Segment", "A Split in Half", etc.). Some embodiments also define a duration for each segment. For instance, some embodiments define each segment with a default duration, while other segments attempt to discern the relative length of each segment based on the amount of content (e.g., text in a screenplay, slides in a slideshow, etc.) in the document.

Figure 23:
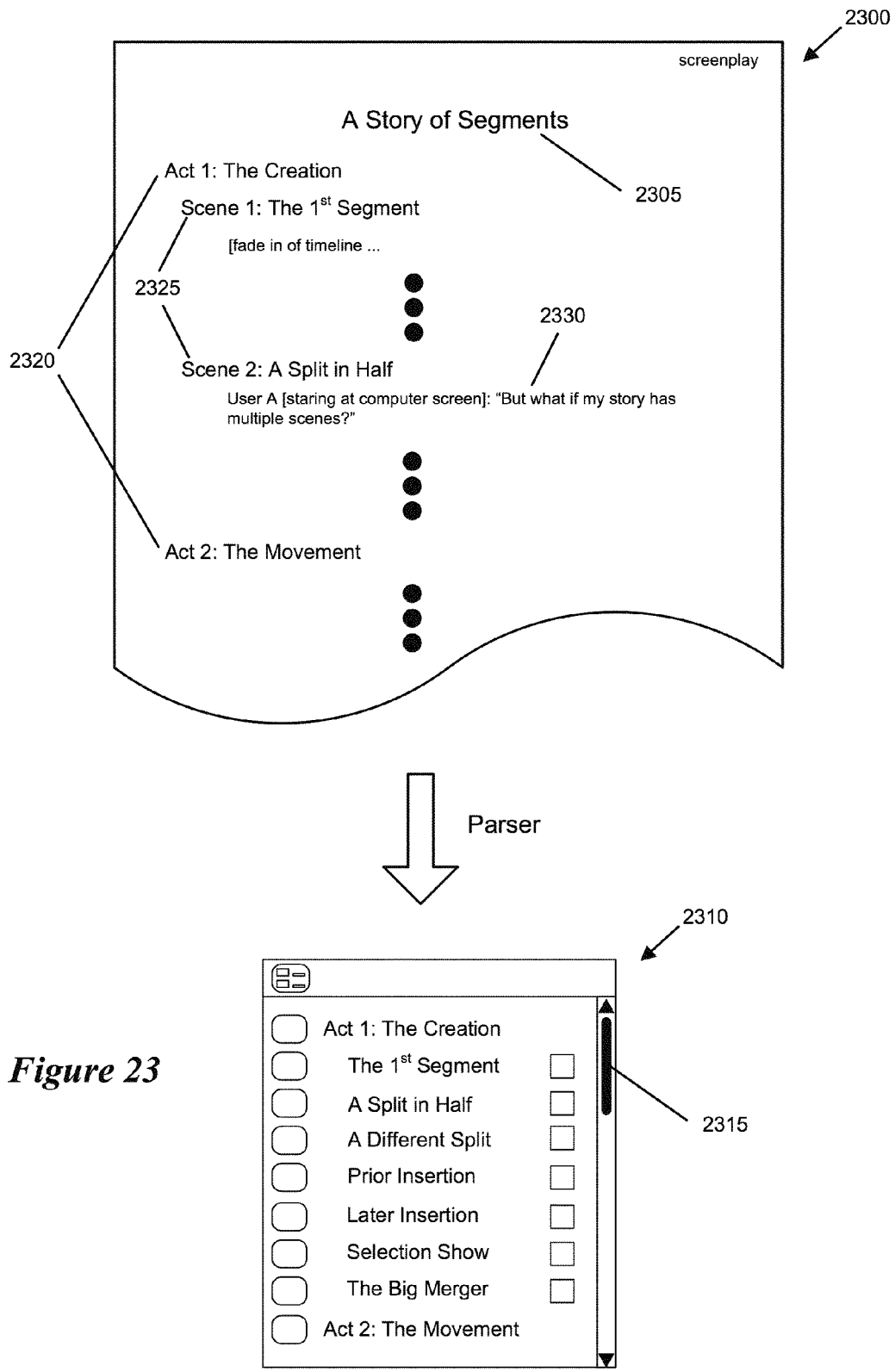
FIG. 23 illustrates the conversion of a structured input document according to some embodiments.

Finally, the process defines (at 2220) associations between the segments. For example, scene 1 ("The 1$^{st}$ Segment") of screenplay 2300 is associated with act 1 ("The Creation"). FIG. 23 illustrates a portion of the resulting story outline 2310 based on screenplay document 2300. Story outline 2310 includes the scenes and acts shown in the illustrated portion of screenplay 2300 as well as other scenes not shown in the document. As can be seen from the scrollbar 2315, there are numerous other segments as well.

IV. Moving Segments

Once segments are created for a timeline, some embodiments of the media-editing application allow a user to move the segments in a variety of ways. Editors will often want to use such a function while in the early and intermediate editing process as they modify their story—taking into account plot changes, switching scenes around, accommodating requests from producers or clients, etc. Moving segments involves moving the content in the segment, so in order for the application to move a segment, it must be determined which clips are actually associated with the segment.

A. Selection of Segments

Different embodiments provide different options for selecting media clips to move with a selected segment when the segment is moved. Some embodiments provide an inclusive option for selecting all clips that cross into the segment at all, an exclusive option for only selecting clips fully contained within the duration of the segment, and a razoring option for only selecting portions of clips that are contained within the segment. Other embodiments provide one or two of these selection options.

Figure 24:
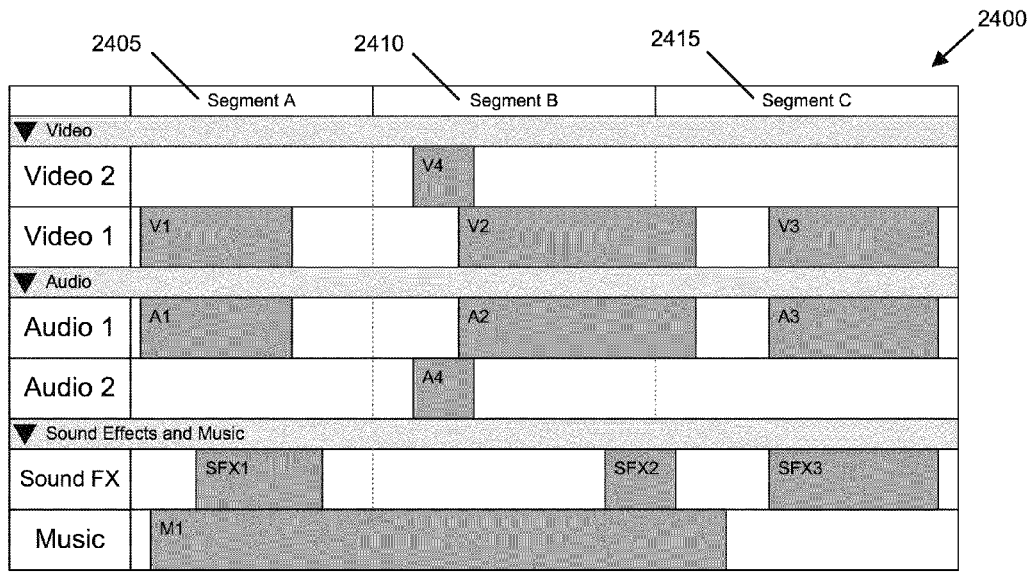
FIG. 24 illustrates a composite display area with three segments.

These different selection options will be described by reference to a composite display area 2400 illustrated in FIG. 24. Composite display area 2400 breaks the tracks spanning the timeline into three groups: video, audio, and sound effects and music. The timeline is itself divided into three segments: Segment A 2405, Segment B 2410, and Segment C 2415. Within the segments are numerous media clips.

Figure 25:
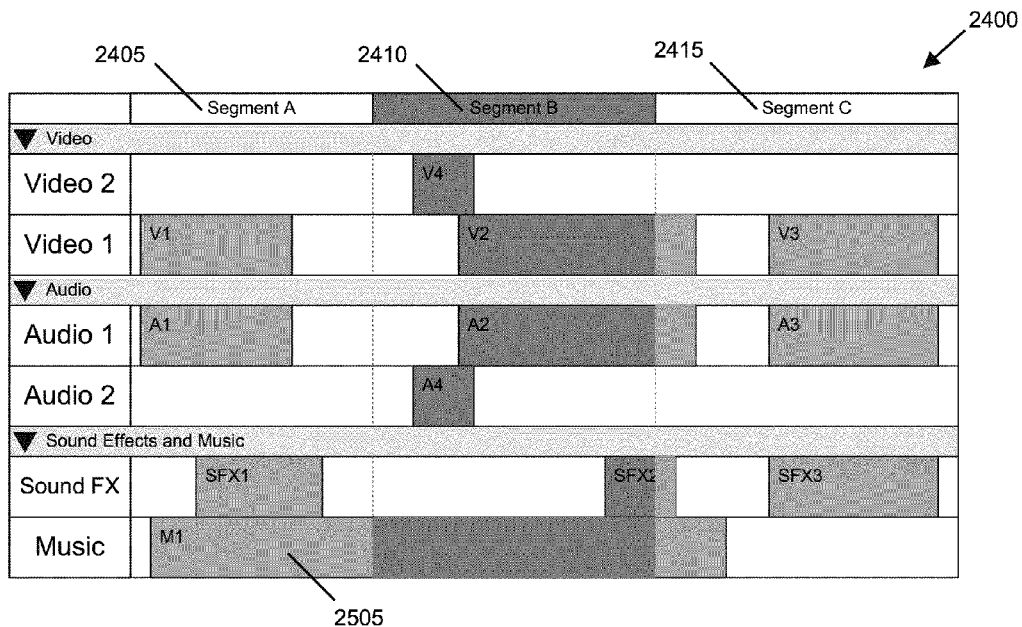
FIG. 25 illustrates a razor selection of one of the segments of the composite display area of FIG. 24.

FIG. 25 illustrates the result of selecting Segment B 2410 with a razoring option. That is, the media clips are cut off at the segment boundaries. If Segment B is moved, only the portions of the media clips that are darkened in FIG. 25 will be moved. For instance, music clip M1 2505 includes portions in all three segments, and only the middle portion in Segment B 2410 is selected and will be moved with this segment. In some embodiments, the remaining portions of the clips (i.e., the portions that are in Segment A 2405 or Segment C 2415) will be removed from the timeline, while in other embodiments these portions are left behind in their segments.

Figure 26:
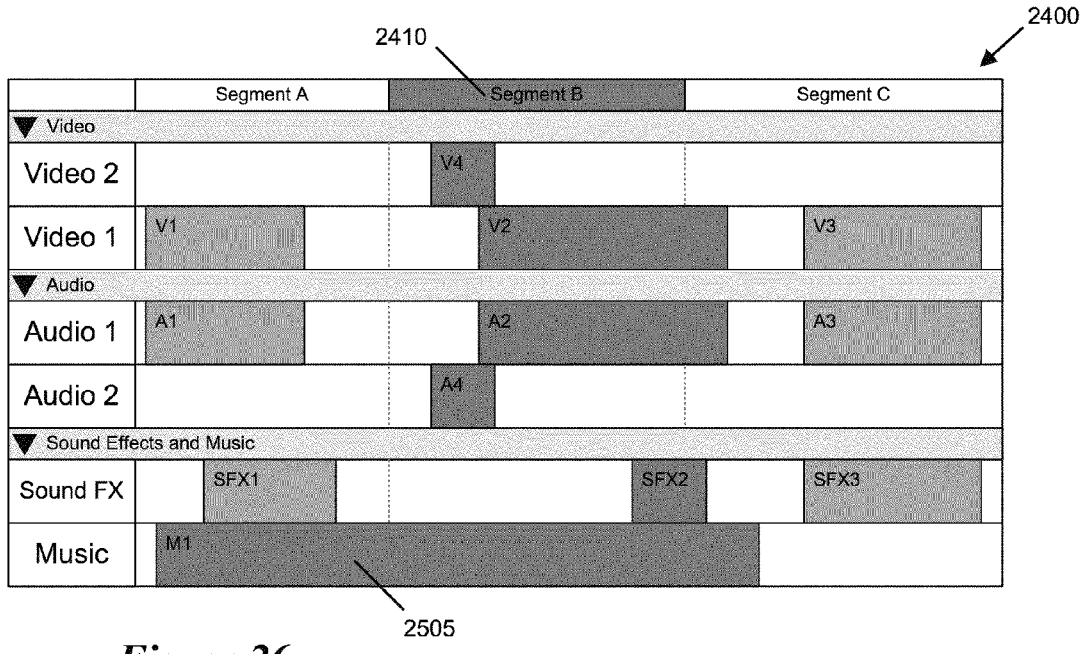
FIG. 26 illustrates an inclusive selection of one of the segments of the composite display area of FIG. 24.

FIG. 26 illustrates the result of selecting Segment B 2410 with the inclusive clip selection option. In this case, any media clips the duration of which extend at all into Segment B 2410 are selected. For instance, whereas only a portion of music clip M1 2505 is selected in FIG. 25, the entirety of the clip is selected in FIG. 26. The portions of media clips that extend into other segments are removed from those segments and brought with Segment B 2410. The consequences of such moves will be described below in subsection C.

Figure 27:
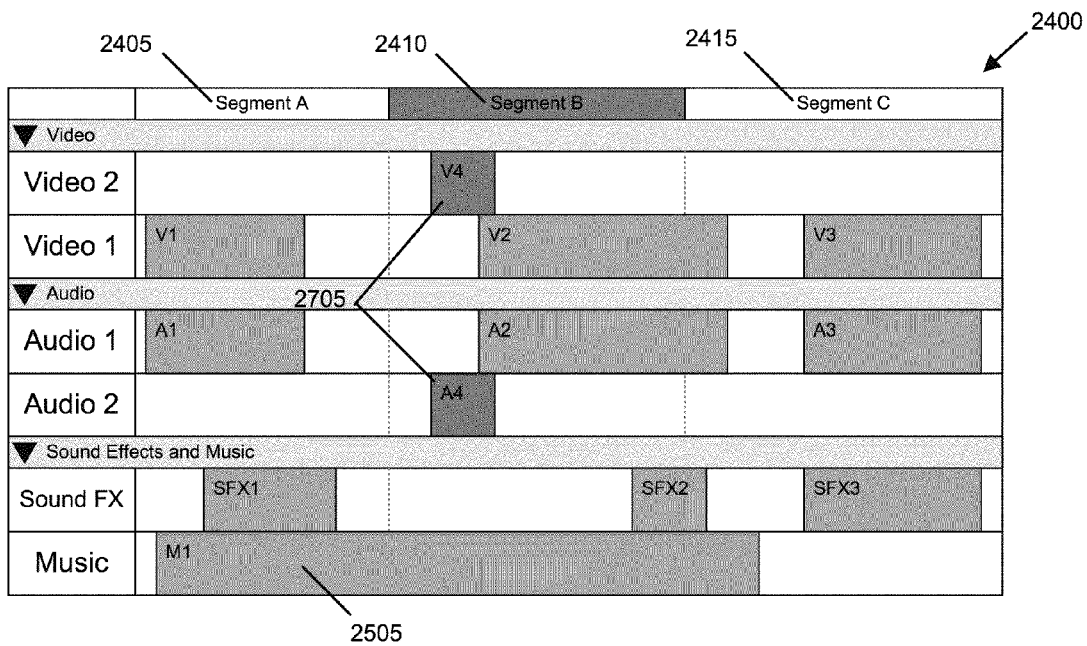
FIG. 27 illustrates an exclusive selection of one of the segments of the composite display area of FIG. 24.

FIG. 27 illustrates the result of selecting Segment B 2410 with the exclusive clip selection option. In this case, only media clips the duration of which is fully contained within Segment B 2410 are selected. Thus, as most of the clips in Segment B 2410 extend into Segment C 2415, only video and audio clips 2705 are selected. When Segment B 2410 is moved such that Segment A 2405 and Segment C 2415 come together, different embodiments treat the remaining clips such as music clip 2505 differently. Some embodiments simply remove the clips altogether, some embodiments leave only the portions of the clips that are in the unmoved segments, and other embodiments attempt to move the remaining clips across what becomes the boundary between Segment A 2405 and Segment C 2415.

In some embodiments, one of the three above-described options (razor, inclusive, and exclusive) is a default option when a segment is selected to be moved. However, some such embodiments allow a user to switch between the options as the segment is moved. For instance, different click operations on the segment header could produce different selection results, or while moving the segment a user could use keystrokes (either single keys or combinations of keys) to toggle between the different selection options.

Some embodiments provide different default options for different types of clips. For instance, some embodiments might razor video clips on the premise that an editor will not want video clips to spill into a new scene, but treat audio clips (or at least sound effects and music) as inclusive selections because an audio transition from a first scene to a second scene is more likely to be wanted from the first scene to a different scene when the first scene has moved.

Figure 28:
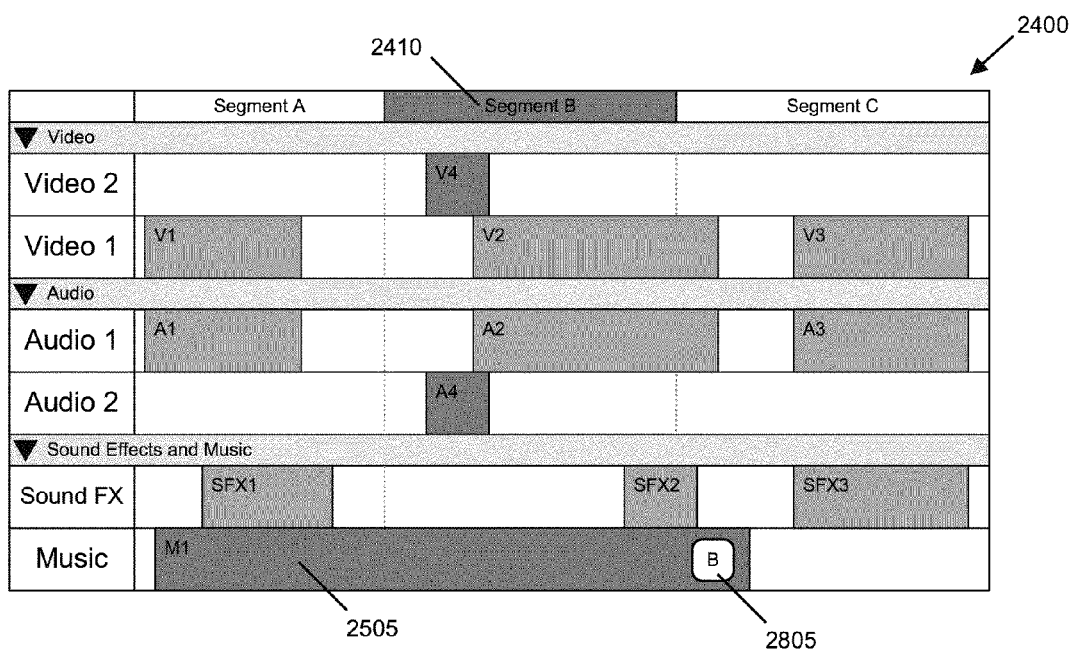
FIG. 28 illustrates an exclusive selection of one of the segments of the composite display area of FIG. 24 in which a clip that spans multiple segments is anchored to the selected segment.

In some embodiments, a user can anchor a particular clip to a particular segment. That is, the clip is defined as part of the segment such that no matter which type of selection is used (inclusive, exclusive, razoring), the clip will be a part of the segment. FIG. 28 illustrates such a case for composite display area 2400. In this example, music clip 2505 is anchored to Segment B 2410, which is selected with an exclusive selection. Music clip 2505 is displayed with indicator 2805 to indicate that it is anchored to Segment B 2410. Indicator 2805 may be any sort of graphical indicator that visually indicates to a user that a clip is anchored to a particular segment. In this case, it is a white square with the letter "B". Other embodiments display the indicator in the portion of the clip that is within the segment to which the clip is anchored. Still other embodiments indicate the anchored clip by drawing a line between the clip and the section header or the clip and some other segment indicator. In some embodiments, a user can toggle the anchor indicators on and off.

Furthermore, some embodiments enable a user to add or remove individual clips to a selection. For instance, if the selection option is inclusive, but a user wants to leave a transition between segments with the previous segment, then the user could select the clip for the transition to remove it from the selected segment. This is accomplished, in some embodiments, through the use of a combination of keystroke input and cursor controller input (e.g., a command-click or control-click).

B. Moving Segments in UI

Once a segment is selected, the user can move the segment to another location in the timeline. For instance, if a movie editor decides that a dialogue scene between one group of characters should actually come after, rather than before, an action scene with another group of characters, rather than moving all of the clips individually, the editor can simply move one of the segments in the timeline. Unless all of the clips are fully contained within the moved segment, cleanup may be necessary at the affected segment borders, but this is still better and easier than the alternative.

Figure 29A:
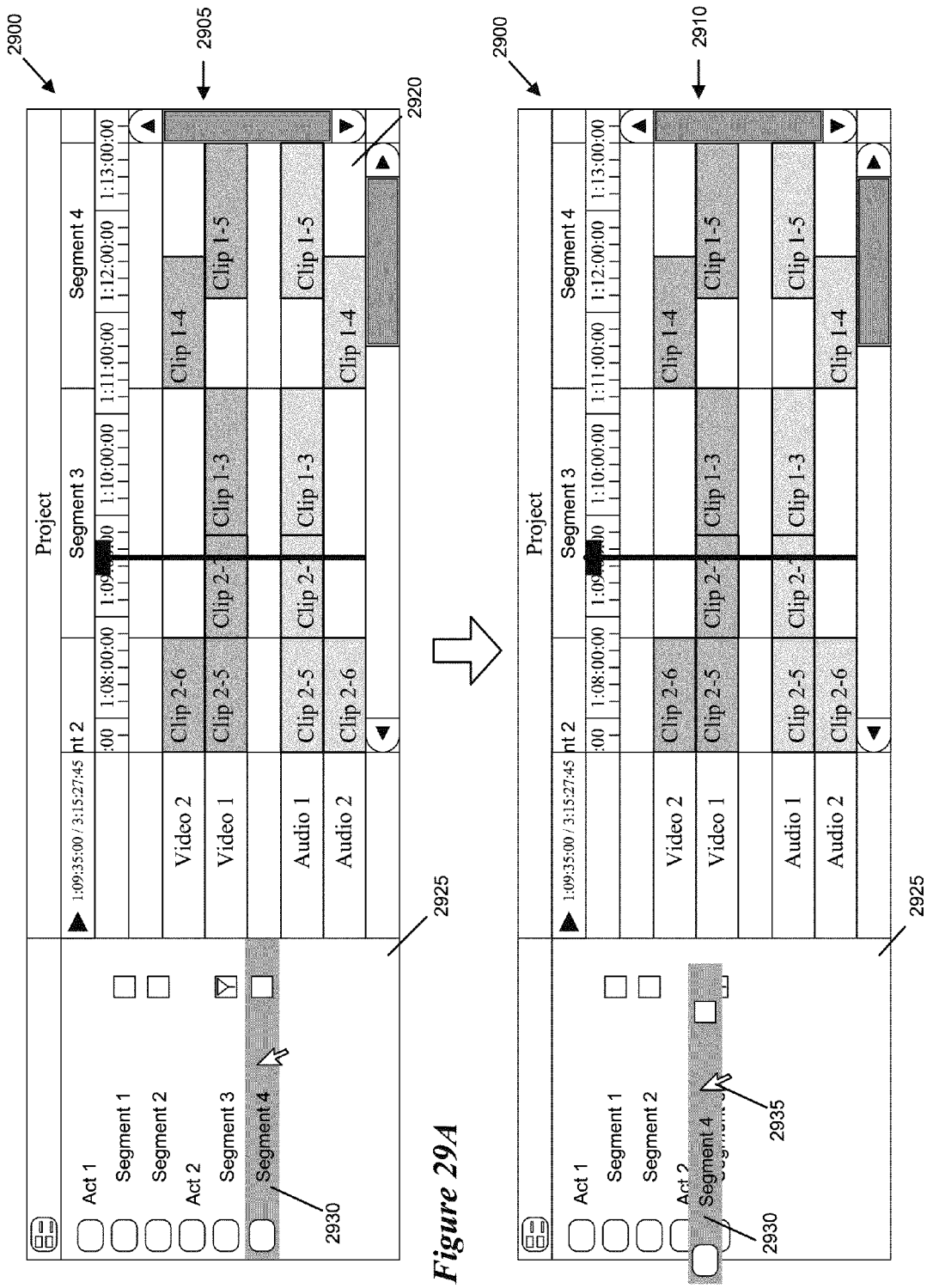
FIGS. 29A-29B illustrate the movement of a segment using the outline window of a media-editing application GUI.
Figure 29B:
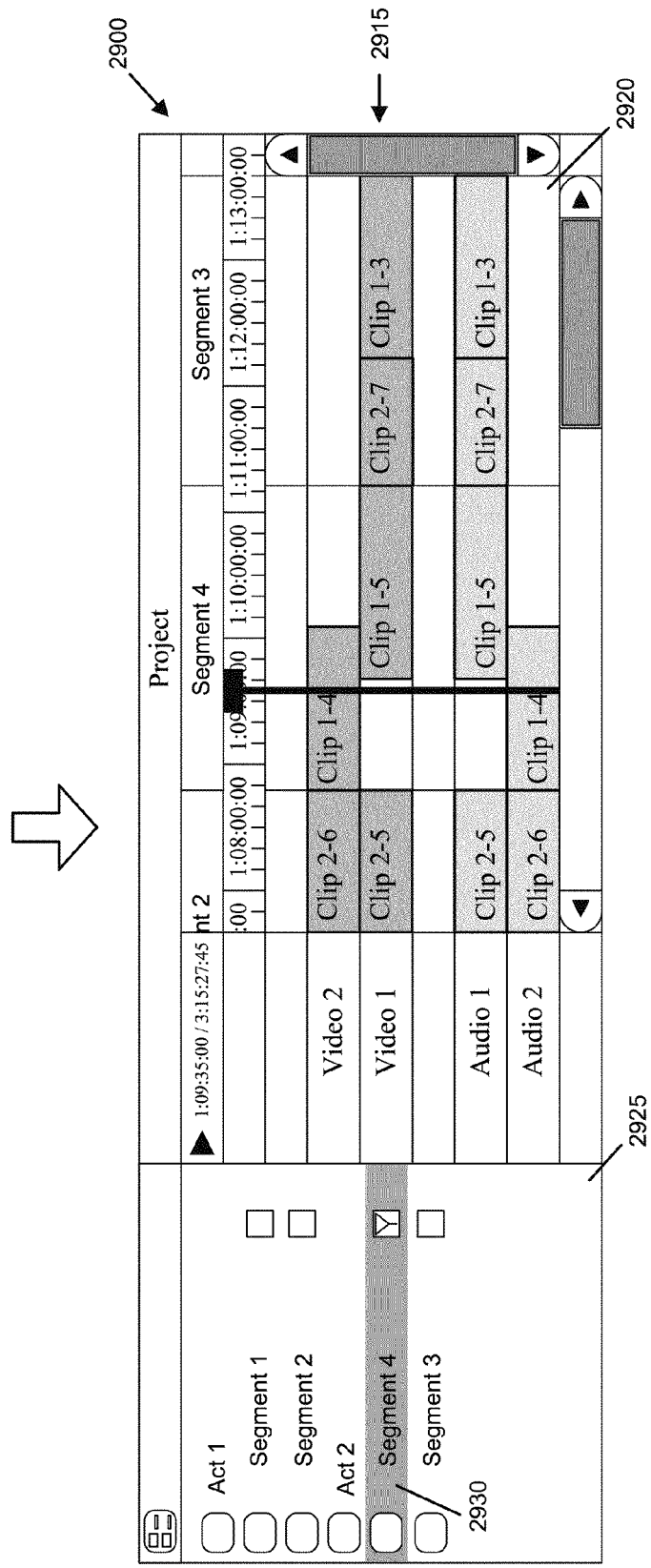

FIGS. 29A-29B illustrate the movement of a segment using the outline window of the media-editing application GUI. Specifically, FIGS. 29A-29B illustrate a GUI 2900 in three stages: a first stage 2905 after a user has selected a segment item 2930 in outline window 2925, a second stage 2910 as the user moves the segment item, and a third stage 2915 after the segment has been moved.

GUI 2900 includes composite display area 2920 and outline window 2925, which include many similar features to the display areas of GUI 1300. As can be seen from the outline window 2925, the timeline includes four segments split among two acts. In stage 2905, a user has selected the selectable item 2930 for Segment 4 in the outline window 2925. The selection is indicated by the gray bar around the selectable item 2930. As described above, various embodiments use different selection indications. Some embodiments also indicate the selection of the segment in composite display area 2920 by highlighting the segment header, the clips in the segment, or both (see FIGS. 30A-30B below, for example).

Stage 2910 illustrates a user beginning to move the selectable item 2930. This movement could be accomplished, for example, by a user placing cursor 2935 over segment item 2930, pressing a mouse button (or equivalent cursor controller selection function), and holding the button down as they move the cursor. As shown in stage 2910, the segment item 2930 in some embodiments is displayed over the rest of the outline window 2925 as moving with the cursor 2935.

Stage 2915 illustrates the result of the user moving the cursor 2935 (and with it the segment item 2930) to the area of the outline window 2925 in between the item for Act 2 and the item for Segment 3. The result of this is that Segment 4 is moved to earlier in the timeline, in front of Segment 3. This is illustrated in composite display area 2920, as Segment 4 (and the media clips that are in Segment 4) are now between Segment 2 and Segment 3 in the timeline. As none of the media clips in composite display area 2920 cross over segment boundaries, moving these segments does not create problems of overlapping clips. Such cases are described below in subsection C.

Figure 30A:
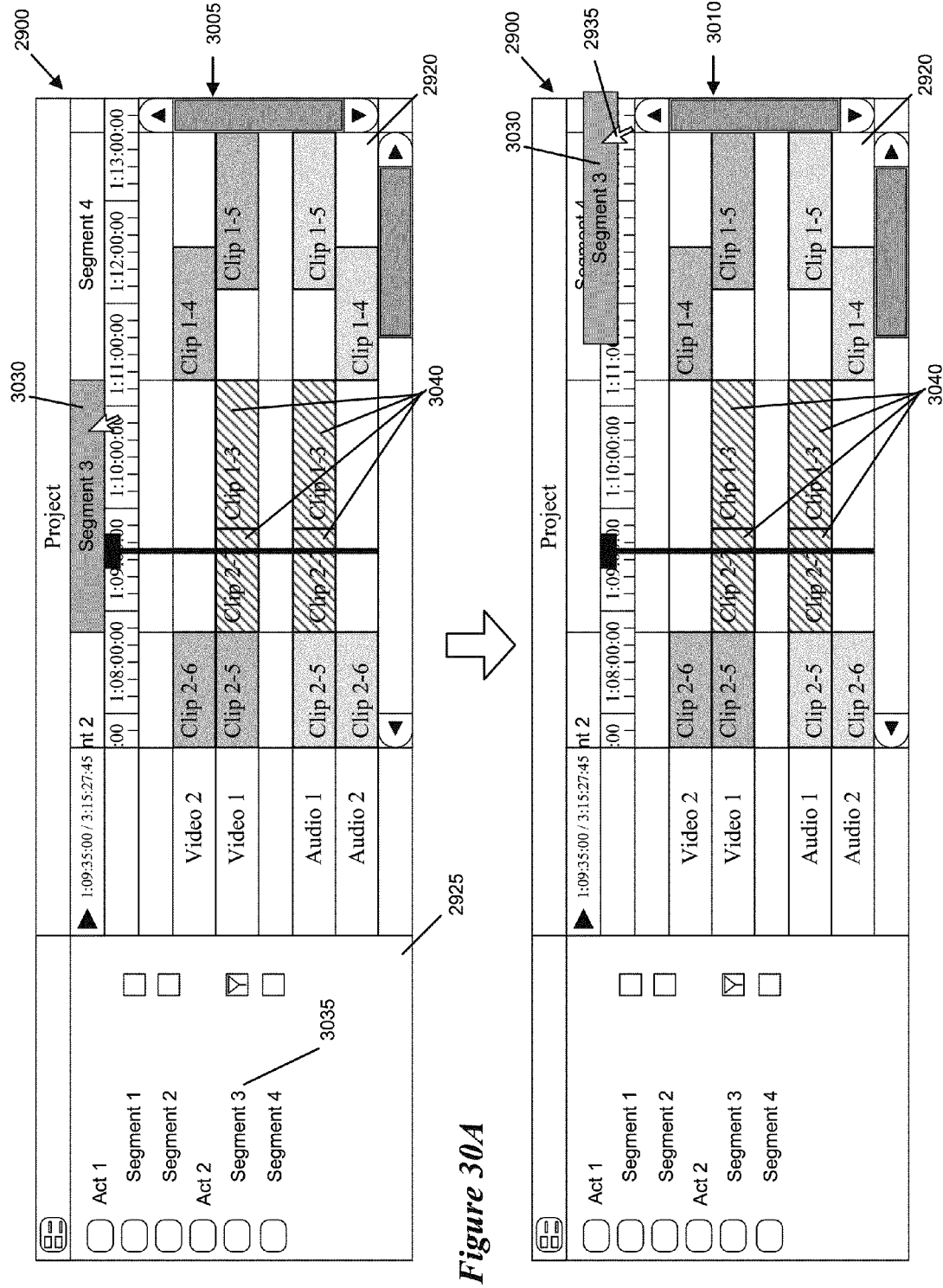
FIGS. 30A-30B illustrate the movement of a segment using the composite display area of the media-editing application GUI.
Figure 30B:
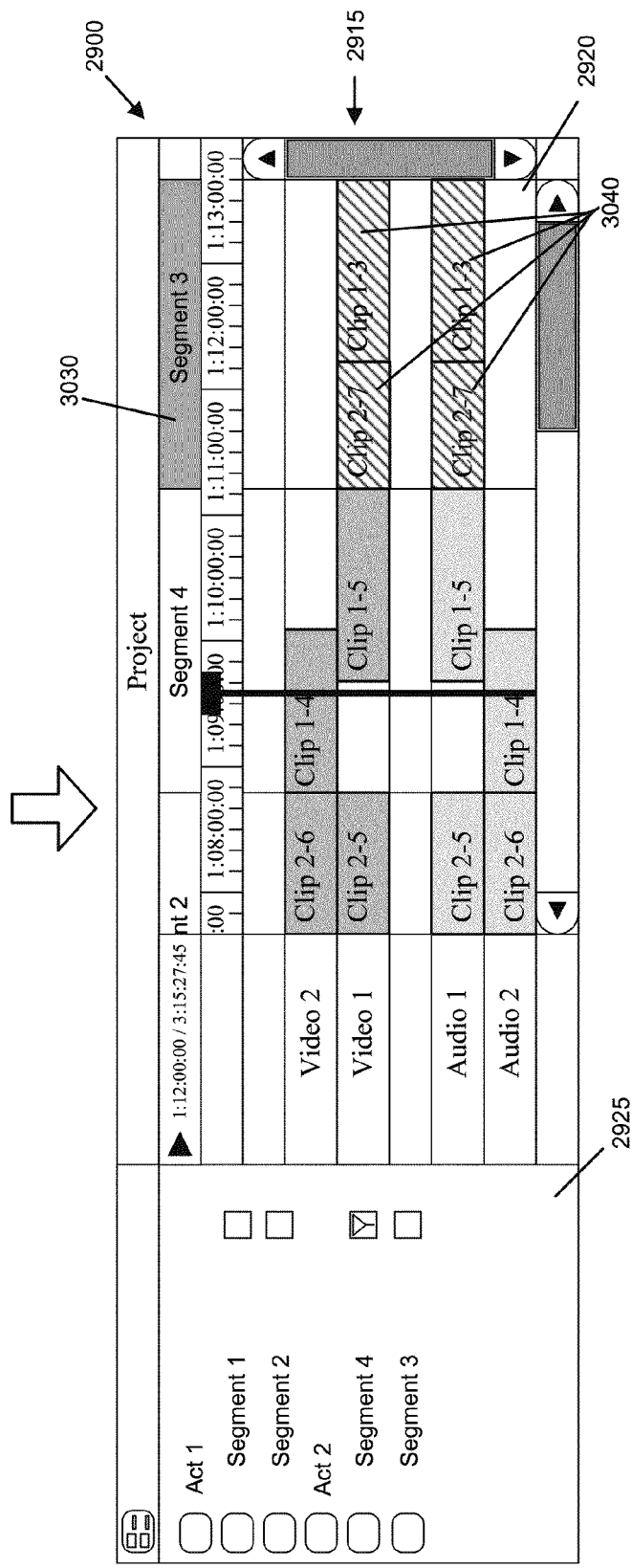

FIGS. 30A-30B illustrate the movement of a segment using the composite display area of the media-editing application GUI. Specifically, FIGS. 30A-30B illustrate the GUI 2900 in three stages: a first stage 3005 after a user has selected a segment in composite display area 2920, a second stage 3010 as the user moves the segment, and a third stage 3015 after the segment has been moved.

In stage 3005, a user has selected Segment 3 via segment header 3030 in composite display area 2920. Segment header 3030 is now colored gray, though any of the selection indications described above for segment items in the outline window could be applicable to the segment header as well. Clip shapes 3040 (the clip shapes contained within the duration of Segment 3) are also highlighted in stage 3005. As described above, a variety of selection indicators are also possible for the clip shapes. In FIG. 30A, the corresponding segment item 3035 is not highlighted in the outline window 2925 to indicate the selection of Segment 3, though some embodiments do highlight the corresponding segment item in the outline window.

Stage 3010 illustrates the GUI 2900 as the user has begun to move the segment header 3030. This movement could be accomplished, for example, by a user placing cursor 2935 over segment header 3030, pressing a mouse button (or equivalent cursor controller selection function), and holding the button down as they move the cursor. As shown in stage 3010, the segment header 3030 in some embodiments is displayed over the rest of the composite display area 2920 as moving with the cursor 2935. Some embodiments also display the clips in the segment (e.g., clips 3040) as moving with the segment header.

Some embodiments not only display the segment header as moving, but also close up the gap in the timeline. That is, in the case illustrated in FIG. 30A, Segment 4 would shift left next to Segment 2 in the composite display area 2920, to indicate to the user what the composite display area will look like in that region once Segment 3 has moved. This can be useful when there are overlapping media clips that are left behind in the nearby segments (e.g., if Segment 3 is selected using the exclusive selection option) as it allows for the user to see some of the consequences of the move.

Stage 3015 illustrates the result of the user moving the cursor 2935 (and with it the segment header 3030) to the area of the composite display area near the right side of the segment header for Segment 4. In some embodiments, if the cursor selection button is released over the right half of header for Segment 4, then Segment 3 will be moved to the right of Segment 4. In addition to displaying Segment 3 (including clips 3040) to the right (after in the timeline) of Segment 4, Segment 3 has moved after Segment 4 in the outline window 2925.

In some embodiments, users can also move entire supersegments, or other higher level items, using the selectable items in the outline window. The process for moving a supersegment is similar to that of moving a segment in some embodiments, and overlapping clips need only be accounted for on the supersegment boundaries. Clips overlapping segments within the supersegment do not pose a problem, as the order of the segments remains the same within the supersegment.

Some embodiments also include a feature that allows a user to zoom out in the composite display area such that only segments are shown, rather than individual clips or tracks. Users can then move the segments around in order to modify the composite presentation, and worry about the border behavior of the clips once all the segments are moved. In some embodiments, this feature is not available directly through the composite display area, but instead a "segment view" is brought up as a separate display. Some embodiments enable a similar feature for supersegments or any other levels of hierarchy defined for the timeline.

C. Managing Overlapping Clips

As mentioned in the sections above, when clips overlap a boundary of a segment, moving the segment creates various problems at the boundary. These problems are especially highlighted when the segment move involves an inclusive selection that takes all clips that cross into the selected segment. FIGS. 31-38 illustrate a number of ways of handling such segment boundary problems.

Figure 31:
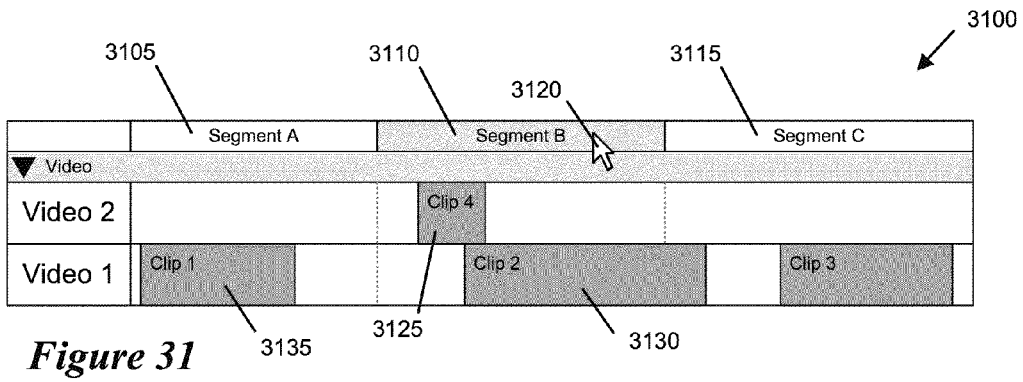
FIG. 31 illustrates a timeline with three segments.

FIG. 31 illustrates a timeline 3100 with three segments 3105-3115. In FIG. 31, segment 3110 has been selected using cursor 3120. This selection is indicated by the segment header for segment 3110 changing color, though the display of the selected clips 3125 and 3130 is not modified. FIGS. 32-38 illustrate different options for handling the result of moving segment 3110 in front of segment 3105.

When there is no overlap between clip 3130 and any clips in segment 3105, the problems of overlapping clips disappear because clip 3130 can extend into segment 3105 without creating any problems. However, that is not the case in the example, as clip 3130 extends into segment 3105 past the point where clip 3135 begins.

Figure 32:
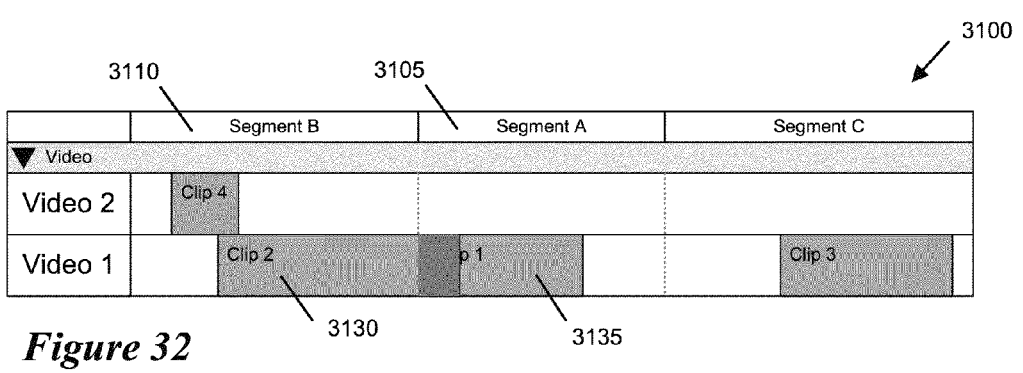
FIGS. 32-38 illustrate different options for handling the movement of a segment with an overlapping clip.

FIG. 32 illustrates a first solution, which is to just have the clips overlap in the track. If the composite media presentation is then rendered, some embodiments will use the media from clip 3130 in the overlapping portion while other embodiments will use the media from clip 3135. Some embodiments will prompt the user when the presentation is rendered, to allow the user to determine which clip should be rendered for the overlapping duration.

Figure 33:
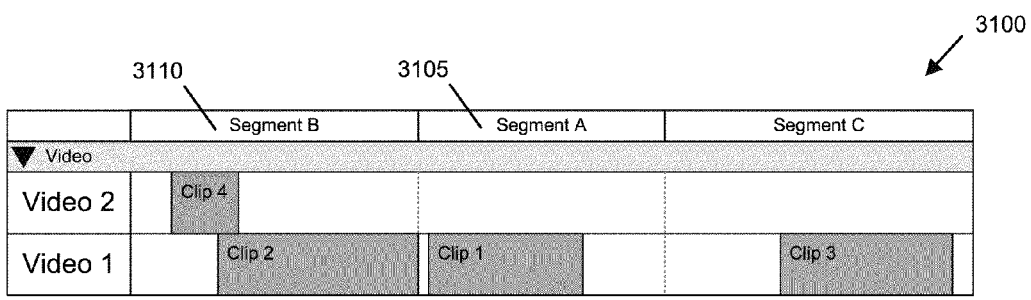

FIG. 33 illustrates the solution of razoring (truncating) the clip at the segment boundary. This is the same result that is achieved via a razor selection of segment 3110 instead of an inclusive selection. In this case, however, clip 3130 is only razored at the segment boundary because it cannot extend fully into segment 3105 without interfering with clip 3135.

Figure 34:
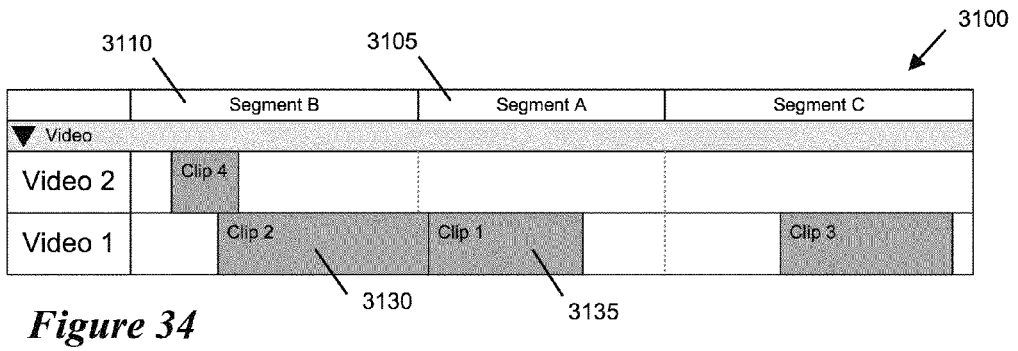

FIG. 34 illustrates a different razoring solution, in which clip 3130 is extended to the boundary with clip 3135 and truncated at that point rather than at the segment boundary. Some embodiments utilize a similar solution in which clip 3130 is extended the distance that it would be if clip 3135 was not present, and the beginning of clip 3135 is razored at this point.

Figure 35:
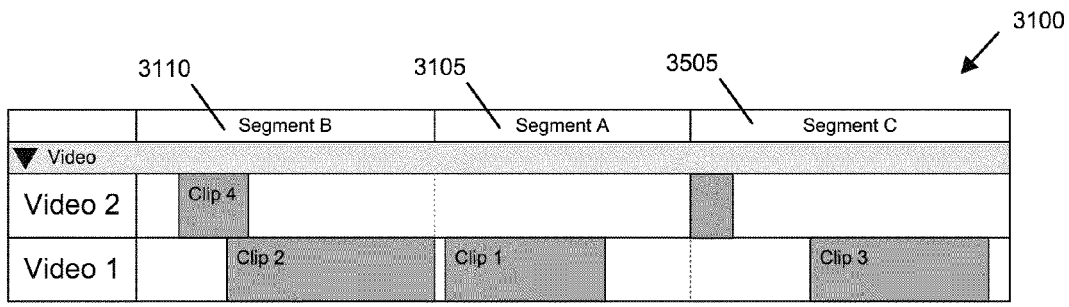

FIG. 35 illustrates a razoring solution similar to that of FIG. 33, in which clip 3130 is truncated at the segment boundary. In this case, however, the truncated portion of clip 3130 is left in segment 3505. In some embodiments, when a clip is selected with a razoring selection, this portion is also left behind. Similarly, in some cases the solution of FIG. 34 involves leaving the truncated portion behind in its segment as well.

Figure 36:
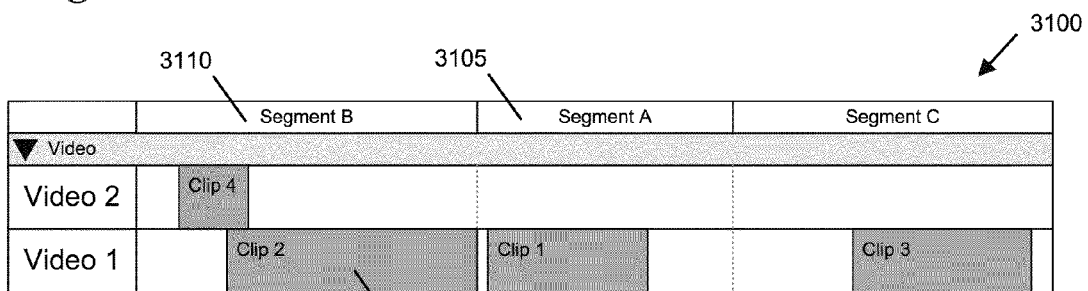

FIG. 36 illustrates a solution in which the length of segment 3110 is extended such that clip 3130 fits entirely within segment 3110 rather than extending into segment 3105. Some embodiments, in fact, use this solution when a segment is moved even when there would be no clips overlapping. However, the solution does extend the length of the composite media presentation, which could have other adverse effects.

Figure 37:
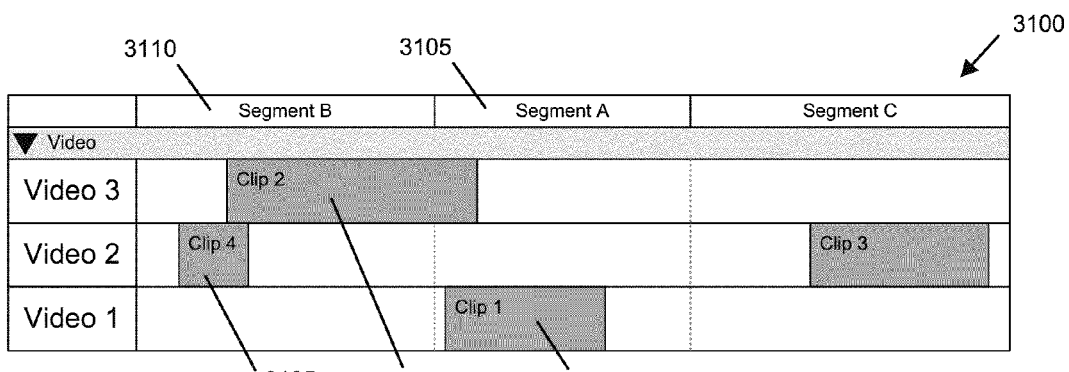
Figure 38:
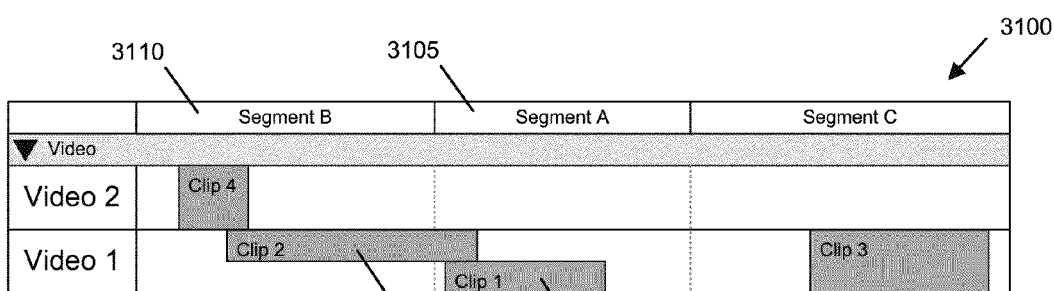

FIG. 37 illustrates moving clip 3130 to a new track so that it no longer intersects with clip 3135. In this case, because of the presence of clip 3125, a new track must be created to hold clip 3130. In some embodiments, if clip 3125 was not present overlapping in time with clip 3130, then clip 3130 would be moved to the Video 2 track rather than a newly created track. FIG. 38 illustrates a similar solution, in which the track holding clips 3130 and 3135 is split (i.e., into two microtracks) for the duration of those two clips.

Some embodiments set one of the above-described solutions as a default setting when a segment selected with the inclusive option is moved, and allow a user to switch between the other options (e.g., with hotkeys for each different option, or a particular key that toggles through the various options. Regardless of which option is selected, in many cases the user will have to perform some amount of cleanup, especially when the clips in the segment are placed along many tracks.

While the above-described cases deal with the situation where a first segment with a clip that extends out of the first segment is moved to a location between two other segments, similar situations can arise when two other segments are forced together (i.e., in the way that segment 3105 and segment 3115 are moved together) when the first segment between them is removed, if the selection of the first segment is an exclusive selection that leaves overlapping clips behind. Similarly, at the point where the moved segment is inserted, there may be clips overlapping the boundary between the two segments that are moved apart, and different embodiments will have different rules as to which of the two segments these clips should stay with as well as rules regarding overlaps with clips in the inserted segment. For instance, some embodiments allow a user to lock an overlapping clip to one of the two or more segments that it is associated with. Some embodiments always keep the clip with the segment in which it starts, or split the clip between the two segments.

Figure 39:
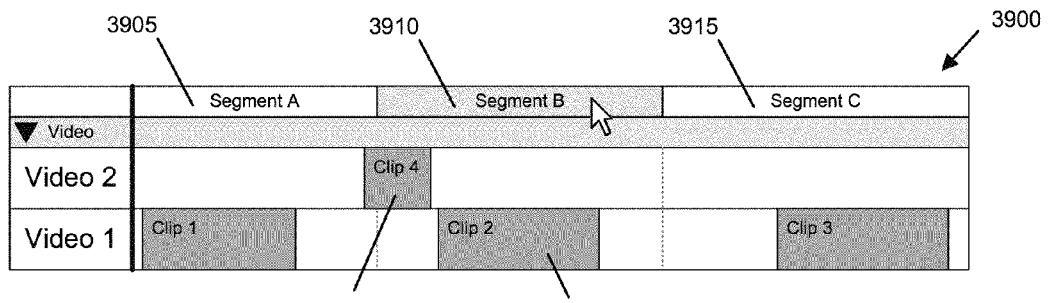
FIG. 39 illustrates a timeline with three segments.

Another problem that can result from moving segments is, when a segment is moved to the front of a composite media presentation, clips may extend into negative time of the presentation. FIG. 39 illustrates such a situation. FIG. 39 illustrates a timeline 3900 including three segments 3905, 3910, and 3915. A user has selected segment 3910 using cursor 3920. This selection is indicated by the segment header for segment 3910 changing color, though the display of the selected clips 3925 and 3930 is not modified.

When segment 3910 is moved to the start of the timeline 3900 (before segment 3905) using an inclusive selection, clip 3925 extends into negative time. If segment 3910 was moved to a location at which it was not the first segment in the timeline 3900, clip 3925 would begin in a different segment and solutions similar to those shown in FIGS. 32-38 above could be applied. However, in this case there is no previous segment in which clip 3925 can begin.

Figure 40:
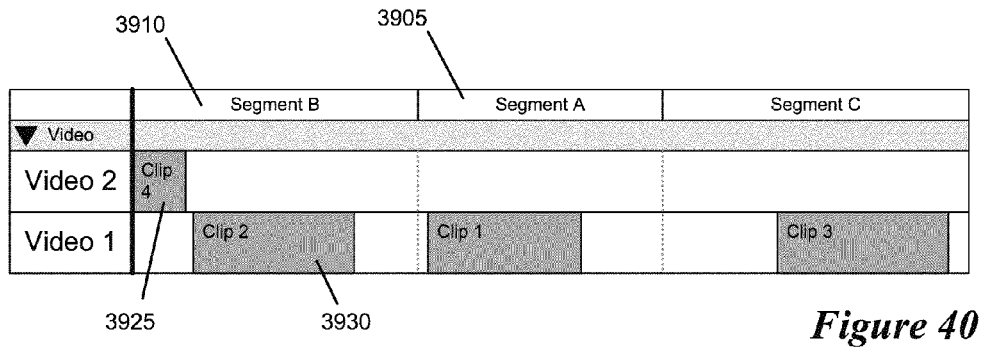
FIGS. 40 and 41 illustrate different options for handling the movement of a segment with a clip that extends into negative time.

FIG. 40 illustrates the solution of razoring clip 3925 at the start of the timeline. In some embodiments, the previous in point for the clip (that is, the time in the source media file for the clip at which the clip begins) is preserved, so that if a user then moves the clip to the right, its original length will be restored. Some embodiments, though, do not preserve this data.

Figure 41:
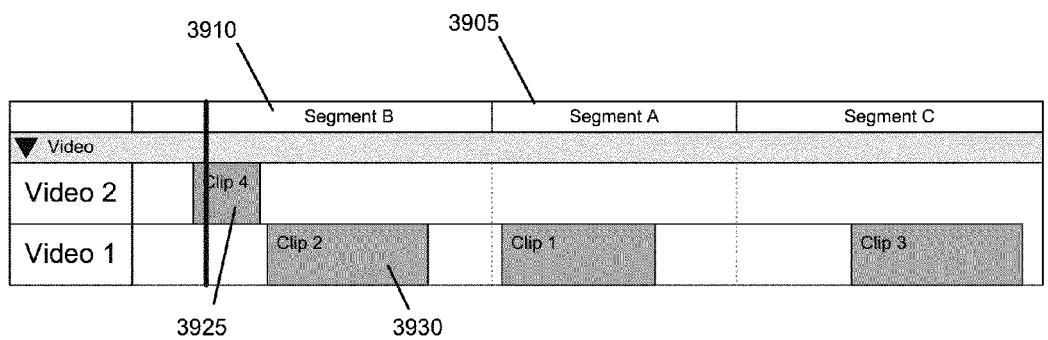

FIG. 41 illustrates the solution of extending the timeline 3900 and the clip 3925 into negative time. In some embodiments, this negative time is playable, in the same way that a track on a music CD often begins at −2 or −3 seconds. In other embodiments, however, the negative time is a non-playable curb that is provided more for visual indication.

D. Process for Moving Segments

Figure 42:
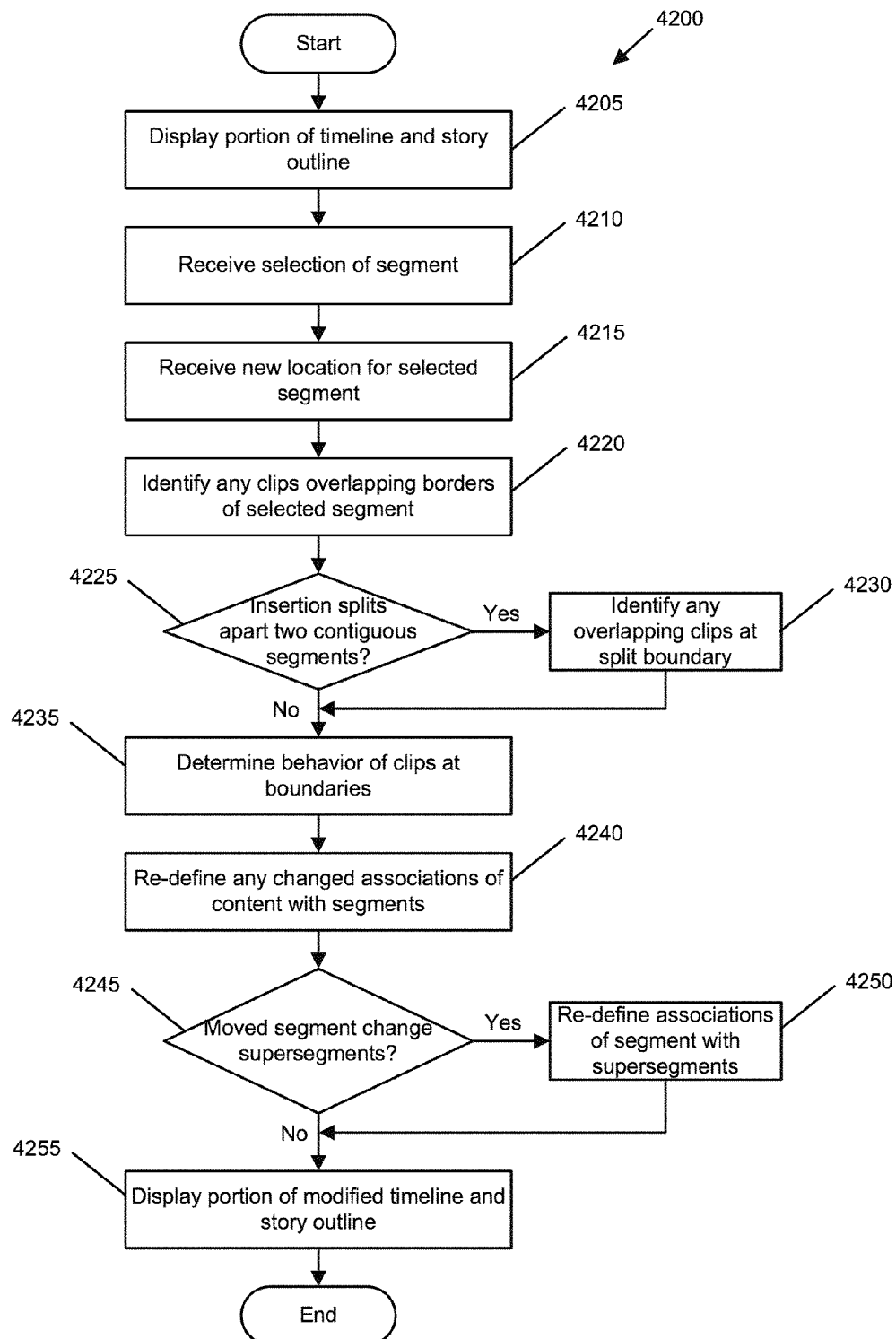
FIG. 42 conceptually illustrates a process of some embodiments for moving segments.

As with the creation of new segments, when a segment is moved some embodiments must re-associate the timeline hierarchy (associations of content to segments, segments to supersegments, etc.) in addition to visually displaying the modifications. FIG. 42 conceptually illustrates a process 4200 of some embodiments for moving segments that includes such re-association.

Process 4200 begins by displaying (at 4205) a story outline and a portion of a timeline corresponding to the story outline. The timeline, in some embodiments, is displayed in a composite display area. For example, GUI 2900 of FIGS. 29A-29B is an example of such a story outline and composite display area.

The process then receives (at 4210) a selection of a segment. The selection may be received through the selection of a UI item in the summary window (e.g., segment item 2930) or in the composite display area (e.g., segment header 3030). The selection input may be received from a cursor controller (e.g., a mouse, touchpad, trackpad, etc.), from a touchscreen (e.g., a user touching a UI item on a touchscreen), from keyboard input (e.g., a hotkey or key sequence), etc.

Next, process 4200 receives (at 4215) a new location for the selected segment. For instance, if a user selected a segment by pressing and holding a cursor controller button, in some embodiments a new location is selected based on where in the GUI the cursor is located when the cursor controller button is released by the user. If a user places the cursor (often accompanied in the GUI by a segment item or segment header) between two segments and releases the cursor controller button, then the new location for the selected segment will be between those two segments.

The process then identifies (at 4220) any clips overlapping the borders of the selected segment. In some embodiments, this identification is performed regardless of whether the selection is an exclusive, inclusive, razoring, or customized (that is, some overlapping clips included while others are excluded) selection, as all of these possibilities create different problems at the boundaries. Next, the process determines (at 4225) whether the insertion of the selected segment splits apart two contiguous segments. This will be the case unless the selected segment is moved to the beginning or end of the timeline. When the insertion does split apart two segments, the process identifies (at 4230) any clips that overlap the split boundary, as these clips must be accounted for as well.

Process 4200 then determines (at 4235) the behavior of the identified clips at the various boundaries. This includes any clips that were brought with the selected segment, any clips that were left behind at the segment boundaries of the selected segment that must account for the segments before and after the moved segment now being next to each other, and any clips that overlapped the border split apart when the selected segment was inserted. The process of some embodiments may employ one or more of the solutions described above in subsection C to handle these overlapping clips, such as razoring clips, extending segments, adding tracks, etc.

Once all of the clips are managed, the process redefines (at 4240) any changed associations of content with segments. If all media clips are each fully contained within one segment, then there may not need to be any re-association. However, if there are any clips that overlapped boundaries, then these clips may have changed their associations. In some embodiments, the associations redefined at 4240 are associations such as those represented in FIG. 5, that define the hierarchical structure of the timeline. These associations are also redefined anytime that content is added or removed from the timeline, content is moved within the timeline, segments are created or merged, etc.

Process 4200 next determines (at 4245) whether any segments have changed supersegments. That is, the process determines whether the segment selected and moved was moved from one supersegment to another supersegment. If this is the case, the process defines (at 4250) the associations of the segment that was moved with the new supersegment and breaks the association of this segment with the old supersegment. Like the associations described immediately above, in some embodiments these associations are like those represented in FIG. 5 for defining the hierarchical structure of the timeline. Finally, the process displays (at 4255) a portion of the modified timeline and story outline with the segment moved from one location to another in both the timeline and the outline.

When a supersegment is moved, a process similar to 4200 is performed. There may still be segment boundary problems with overlapping clips, and associations (of clips to segments and of supersegments to any higher-level items) may change as well, although segment-supersegment associations will not be modified in cases where segments are not split between supersegments.

V. Adjusting the Duration of a Segment

In addition to moving segments and creating new segments, in some embodiments a user can adjust the duration of a segment, either as a way of editing the presentation or as a redefinition of the story structure of the presentation (e.g., determining that a particular clip should really be part of a first scene rather than a second scene). The duration of a segment can be adjusted both explicitly (by directly modifying the length of the segment) or implicitly (by modifying a clip that forces the adjustment of the segment) in some embodiments.

A. Explicit Adjustment of Segment Duration

Figure 43:
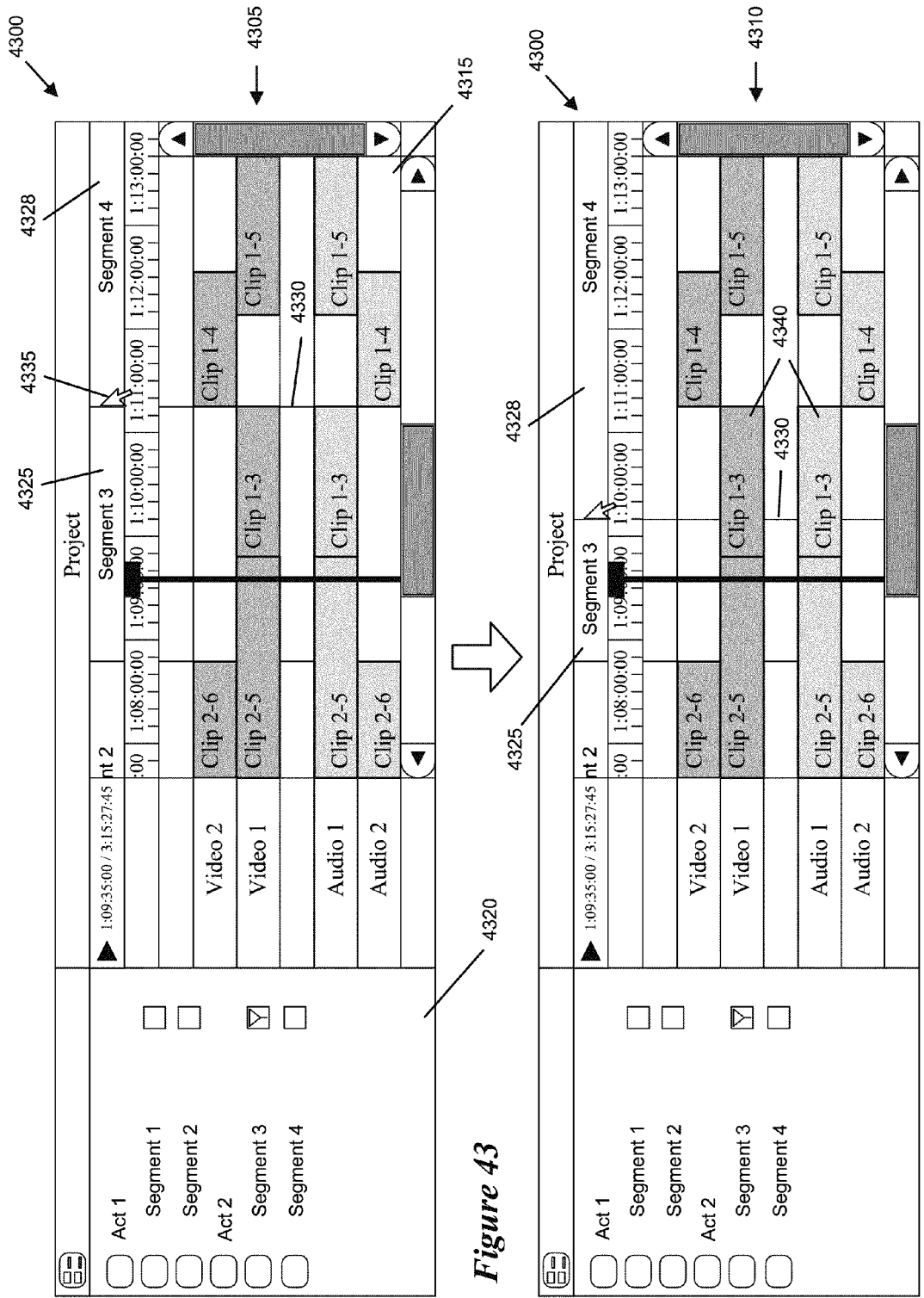
FIG. 43 illustrates explicit adjustment of a segment's duration.

Some embodiments enable a user to explicitly adjust the duration of a segment in the composite display area. FIG. 43 illustrates one example of such a duration adjustment. Specifically, FIG. 43 illustrates a GUI 4300 in two stages, a first stage 4305 before a user has modified the duration of two segments 4325 and 4328 by moving a segment boundary 4330 and a second stage 4310 after the user has moved the segment boundary. The GUI 4300 includes a composite display area 4315 and an outline window 4320. The composite display area 4315 and outline window 4320 include many similar features to the display areas of GUI 1300.

At stage 4305, segment 4325 begins at a time of approximately 1:08:48:00 and ends at a time of approximately 1:11:15:00, at which time segment 4328 begins. At this stage, cursor 4335 is located over segment boundary 4330 in between segment headers. In some embodiments, a user can also place a cursor over a segment boundary within a track in order to modify the duration of the nearby segments. In order to move the segment boundary and thereby modify the segment duration, in some embodiments a user presses and holds a cursor controller button, moves the cursor via the cursor controller, and releases the cursor controller button when the segment boundary is in the desired location along the timeline.

Stage 4310 illustrates that the user has moved the segment boundary 4330 from approximately 1:11:15:00 to 1:10:10:00. This has caused a reduction in the duration of segment 4325 and an increase in the duration of segment 4328. As a result, the timeline has stayed the same length and the clips have not moved in relation to the timeline, but the association of clips 4340 has been modified such that they are now associated with both segment 4325 and segment 4328 as opposed to only segment 4325.

In some embodiments, a user can also bring up a segment properties window (e.g., by double-clicking on a segment header) that allows the user to manually set the start time, end time, and/or duration for a segment. For instance, the same result could be achieved by a user manually entering 1:10:10:00 for the end time or 0:01:22:00 for the duration of segment 4325.

Figure 44:
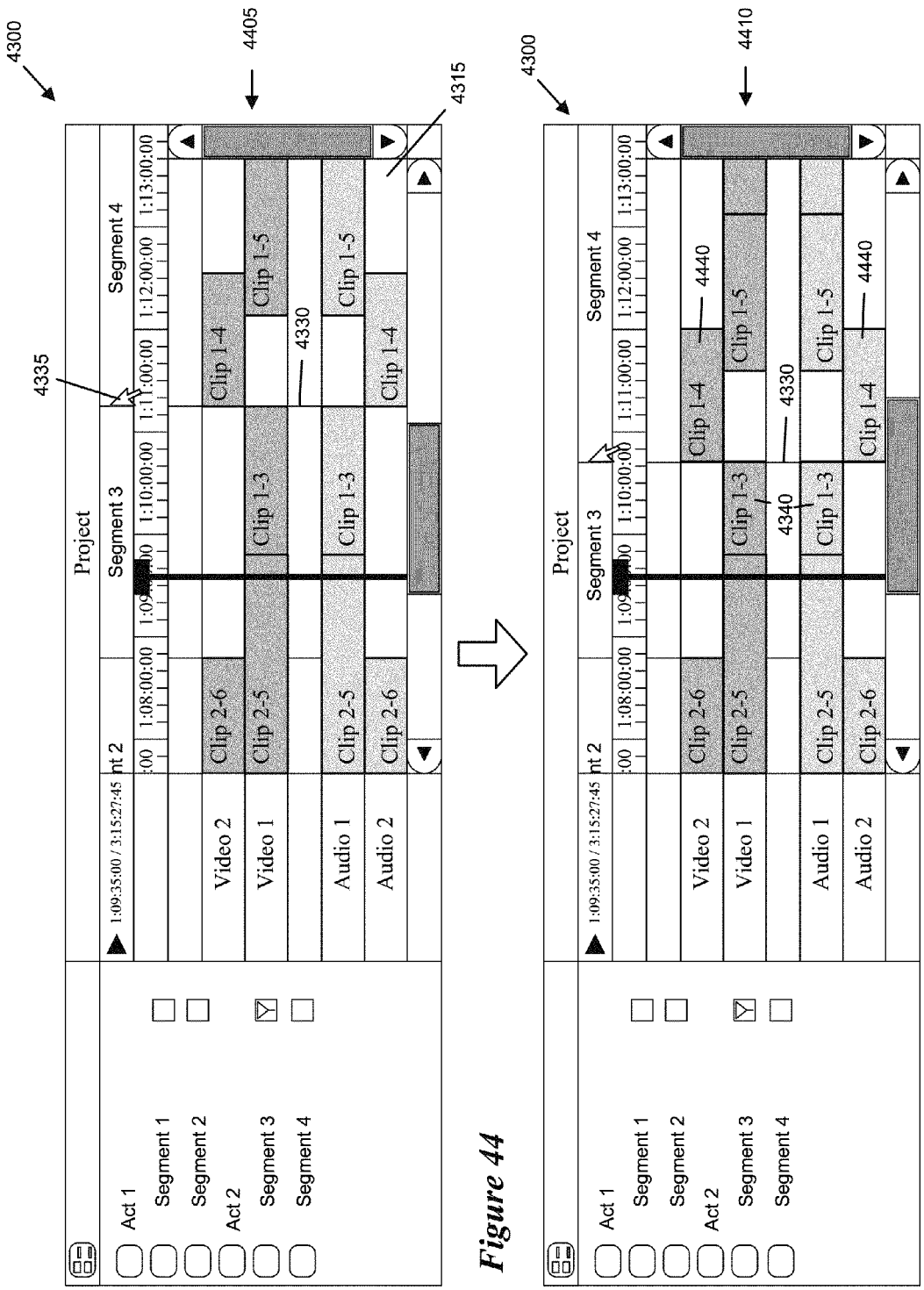
FIG. 44 illustrates explicit adjustment of a segment's duration that also affects the duration of a clip at the segment border.

FIG. 44 illustrates another example of adjusting a segment duration explicitly. In the example of FIG. 44, the association of clips with particular segments does not change, but instead the duration of the clips (and the timeline) changes. FIG. 44 illustrates GUI 4300 in two stages, a first stage 4405 before a user has modified the duration of segment 4325 and a second stage 4410 after the duration has been reduced.

At stage 4405, just as above, segment boundary 4330 is at a time of approximately 1:11:15:00 in the timeline, and cursor 4335 is located over the segment boundary. In some embodiments, a user can also place a cursor over a segment boundary within a track in order to modify the duration of the nearby segments. In order to move the segment boundary and thereby modify the segment duration, in some embodiments a user presses and holds a cursor controller button, moves the cursor via the cursor controller, and releases the cursor controller button when the segment boundary is in the desired location along the timeline.

Stage 4410 illustrates that the user has moved the segment boundary 4330 to a new time of approximately 1:10:42:00. This has caused a reduction in the duration of segment 4325 but has not modified the duration of segment 4328. Instead, the timeline (i.e., the length of the composite media presentation represented in composite display area 4315) has been reduced as well. The duration of clips 4340, which abut segment boundary 4330, is also reduced such that no associations between content (media clips) and segments has changed.

If the user moves segment boundary 4330 to the right, in some embodiments one of two options occurs. If the out point for clips 4340 is not the end of the source media file for the clips, then some embodiments will expand the length of the clip while either pushing all of the clips to the right (and increasing the length of the timeline) or reducing the length of clips 4440 without modifying the length of the timeline (thereby essentially performing a roll edit between the two clips at the boundary). Some embodiments, however, will leave a gap between the end of clips 4340 and the segment boundary while, once again, either pushing all of the clips to the right (and increasing the length of the timeline) or reducing the length of clips 4440 without modifying the length of the timeline. In some embodiments, once the out point of clips 4340 is reached, the application prevents the user from further moving the segment boundary unless some sort of override command is invoked.

B. Implicit Adjustment of Segment Duration

In addition to a segment being modified through a user explicitly adjusting the duration, some embodiments enable modification of segment duration implicitly through the modification of clip length. In some embodiments, segment boundaries are locked or anchored to clip boundaries such that when an edit (e.g., a ripple edit) is performed on a clip, the segment boundary moves with the clips. Similar processes to those described below are also performed when a clip is inserted into or deleted from the timeline.

Figure 45:
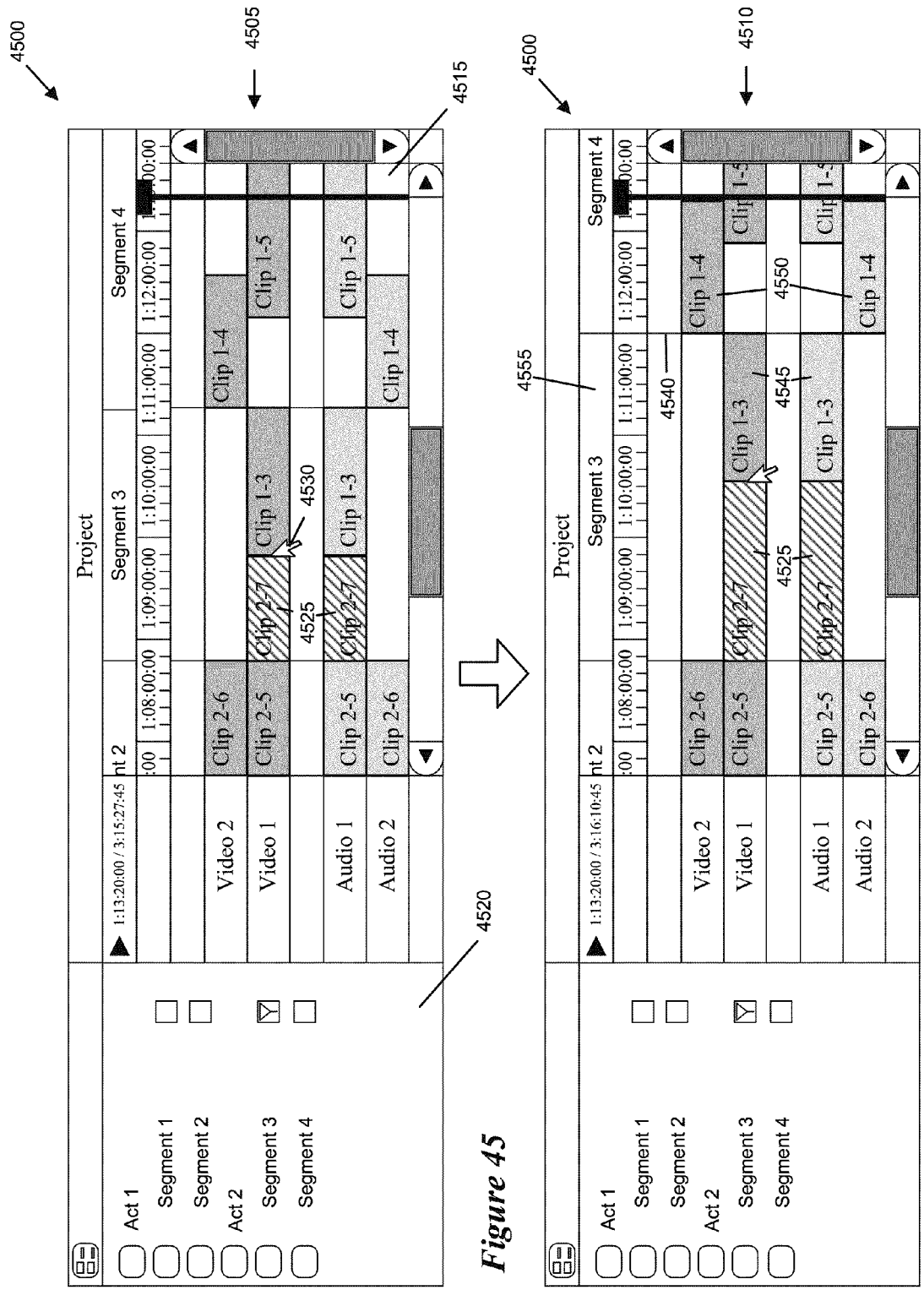
FIG. 45 illustrates implicit adjustment of a segment's duration by adjusting the duration of a clip with a ripple edit.

FIG. 45 illustrates such an implicit adjustment of a segment boundary. Specifically, FIG. 45 illustrates a GUI 4500 in two stages, a first stage 4505 before a ripple edit is applied to clips 4525 and a second stage 4505 after the ripple edit is applied. The GUI 4500 includes a composite display area 4515 and an outline window 4520 that include many similar features to the display areas of GUI 1300.

A ripple edit, in some embodiments, is a type of trim edit that modifies an out point of a clip while leaving the in point the same, thereby changing the duration of the clip. In standard editing applications, this often causes all clips after the modified clip to shift in the timeline by the amount of change to the duration of the modified clip.

Stage 4505 illustrates that a user has selected clips 4525 for editing by using cursor 4530. In order to move the out point and thereby modify the clip duration, in some embodiments a user presses and holds a cursor controller button, moves the cursor via the cursor controller, and releases the cursor controller button when the out point of the clip is in the desired location along the timeline.

Stage 4510 illustrates that the user has moved the out point of clips 4525 to the right, thereby increasing the duration of the clips. This also causes all clips after clips 4525 in the timeline to move to the right as well. In this case, the segment boundary 4540 is locked (or anchored) to the boundary between clips 4545 and 4550. Accordingly, as these clips move later in the timeline, segment boundary 4540 does as well. This increases the duration of segment 4555 by an amount equal to the increase in duration to clips 4525.

Figure 46:
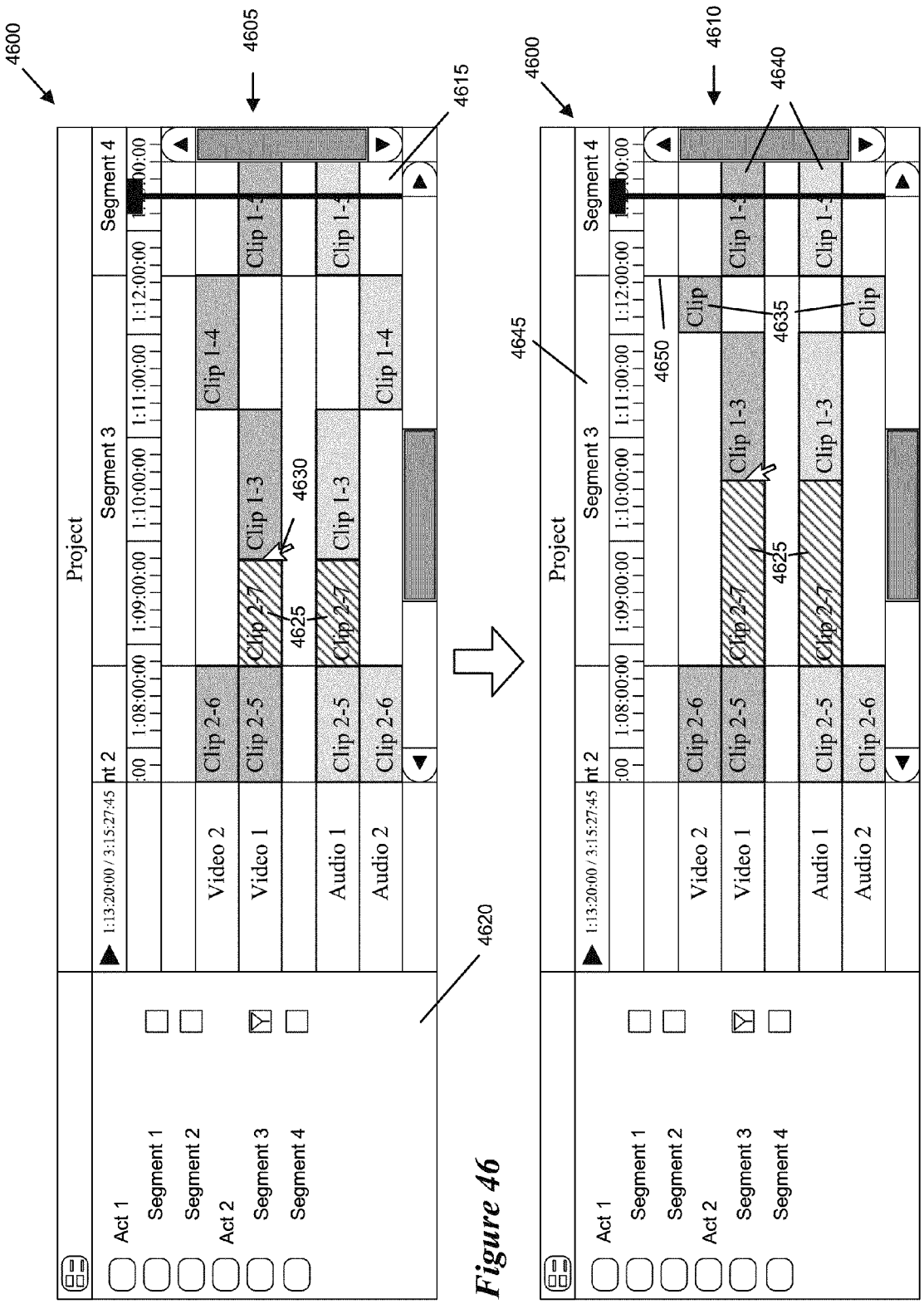
FIG. 46 illustrates a first example of a ripple edit to a clip in a segment with a locked duration.

In some cases, however, a user will want to anchor a segment boundary to a clip boundary but also lock the boundary to a particular time as well. For instance, if a user is creating an episode of a sitcom for a half-hour television slot, the user may need three seven minute segments to fit between the allotted commercial breaks. When a ripple edit is performed in the segment to the left of such a locked-down boundary, some embodiments modify the clip at the boundary as well. FIG. 46 illustrates one example of such a ripple edit. Specifically, FIG. 46 illustrates a GUI 4600 in two stages, a first stage 4605 before a ripple edit is applied to clips 4625 and a second stage 4610 after the ripple edit is applied. The GUI 4600 includes a composite display area 4615 and an outline window 4620 that include many similar features to the display areas of GUI 1300.

Stage 4605 illustrates that a user has selected clips 4625 for editing by using cursor 4630. In order to move the out point and thereby modify the clip duration, in some embodiments a user presses and holds a cursor controller button, moves the cursor via the cursor controller, and releases the cursor controller button when the out point of the clip is in the desired location along the timeline.

Stage 4610 illustrates that a user has moved the out points of clips 4625 to the right, thereby increasing the duration of the clips. This also causes clips after 4625 to move to the right as well, specifically clips within segment 4645. Because segment boundary 4650 is locked down to a time of approximately 1:12:33:00, it cannot move to the right. However, because the segment is also anchored to the boundary between clips 4635 and 4640, clips 4635 cannot move across the boundary as they would in the case of a normal ripple edit. Instead, the solution is that the duration of clips 4635 is reduced in order to offset the increase in the duration of clips 4625. In some embodiments, this reduction comes from modifying the out point of clips 4635.

Figure 47:
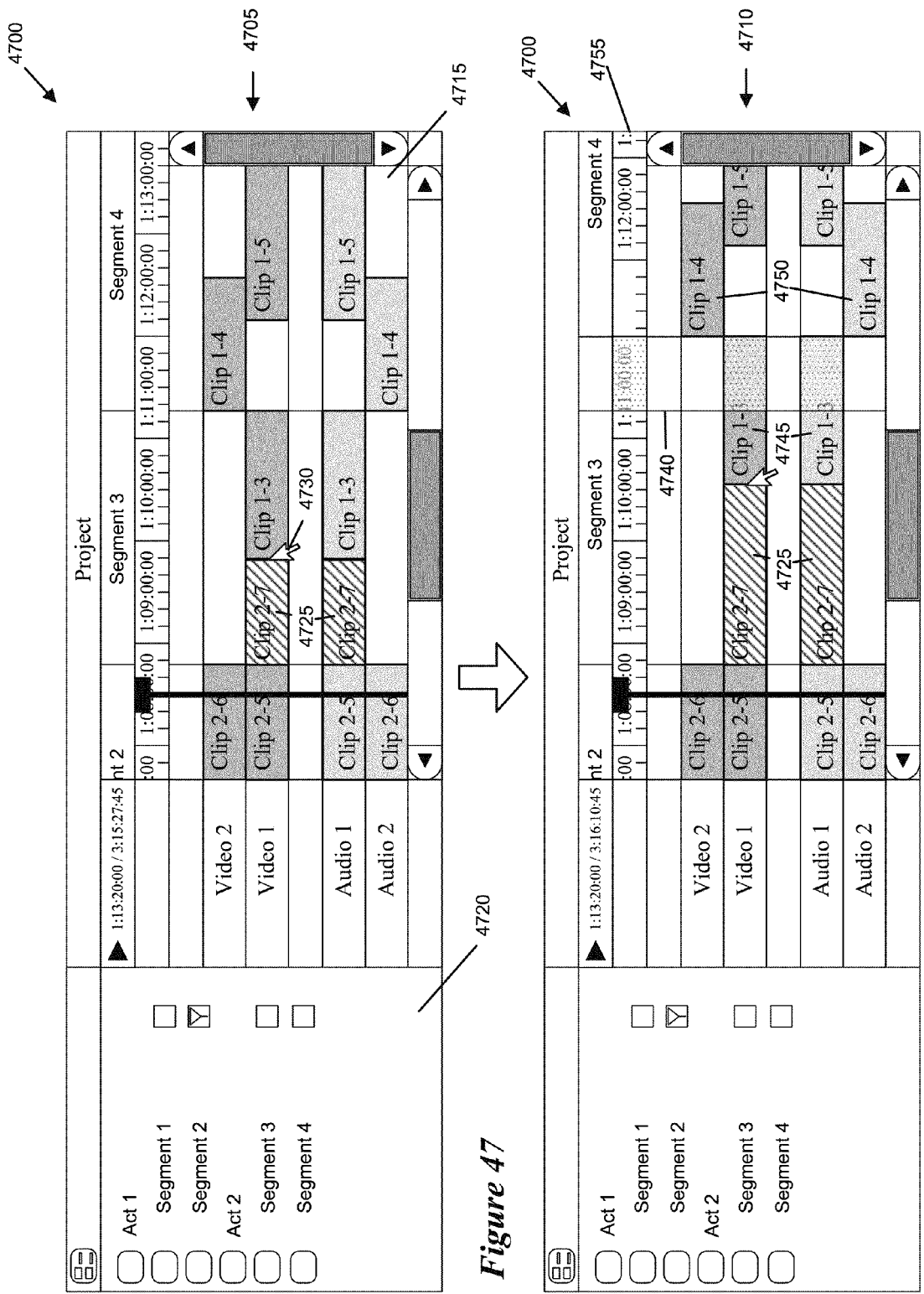
FIG. 47 illustrates a second example of a ripple edit to a clip in a segment with a locked duration.

FIG. 47 illustrates a similar solution to the case in which the segment boundary is locked to a particular time in the media presentation but is also anchored to a boundary between clips. Specifically, FIG. 47 illustrates a GUI 4700 in two stages, a first stage 4705 before a ripple edit is applied to clips 4725 and a second stage 4710 after the ripple edit is applied. The GUI 4700 includes a composite display area 4715 and an outline window 4720 that include many similar features to the display areas of GUI 1300.

Stage 4705 illustrates that a user has selected clips 4725 for editing by using cursor 4730. In order to move the out point and thereby modify the clip duration, in some embodiments a user presses and holds a cursor controller button, moves the cursor via the cursor controller, and releases the cursor controller button when the out point of the clip is in the desired location along the timeline.

Stage 4710 illustrates that a user has moved the out points of clips 4725 to the right, thereby increasing the duration of the clips. This also causes clips after clips 4725 to move to the right as well. For instance, clips 4745 have moved to the right by the duration of the edit to clips 4725. However, much as was the case in FIG. 46, the clips cannot move across the segment boundary. In this case, though, the portion of the clips that is removed from the segment is still displayed in composite display area 4715.

Essentially, the segment boundary 4740 is widened, and the portions of clips 4745 within the segment boundary are displayed differently than the other clips. Various display modifications are used for these clip portions in different embodiments: ghosting the portions, tinting them a color (e.g., red), etc. The timeline ruler 4755 is also split at this point, as the extended segment boundary does not occupy any time in the composite presentation. This allows a user to see these portions and have the out point retained for use in later editing.

In the case where the out point of the edited clip (e.g., clips 4625) is moved to the left rather than the right, some embodiments increase the out point of the boundary clip (e.g., clips 4635) up to the end of the source file for those clips. When the out point is the end of the source file, some embodiments create a gap by moving the boundary clips away from the segment boundary, while other embodiments instead begin to move the segment boundary to the left. Other embodiments do neither of these, and instead prevent the ripple edit from modifying the edited clip any further. Yet another option employed by some embodiments is to start adjusting the in point of the boundary clip, moving the in point earlier in the source file in order to continue extending the length of the boundary clip.

As illustrated above by FIG. 28, some embodiments display an indicator for a clip when the clip is anchored to a segment. Some embodiments display (or provide the user with the option to display) a similar indicator when a clip is anchored to a segment boundary. For instance, a connector between the segment boundary and the clip might be displayed. When clips on both sides of a segment boundary are anchored to the boundary, a single indicator that graphically displays this connection is shown in some embodiments.

C. Cross-Segment vs. In-Segment Editing

As illustrated in FIGS. 45 and 46, edits (specifically, in this case, ripple edits, though insertions and deletions of clips are examples of other edits with a similar effect) are sometimes contained within the segment holding the out point of the affected clip (e.g., as in FIG. 46) and other times flow across the segment boundary and affect other clips (e.g., as in FIG. 45).

Figure 48:
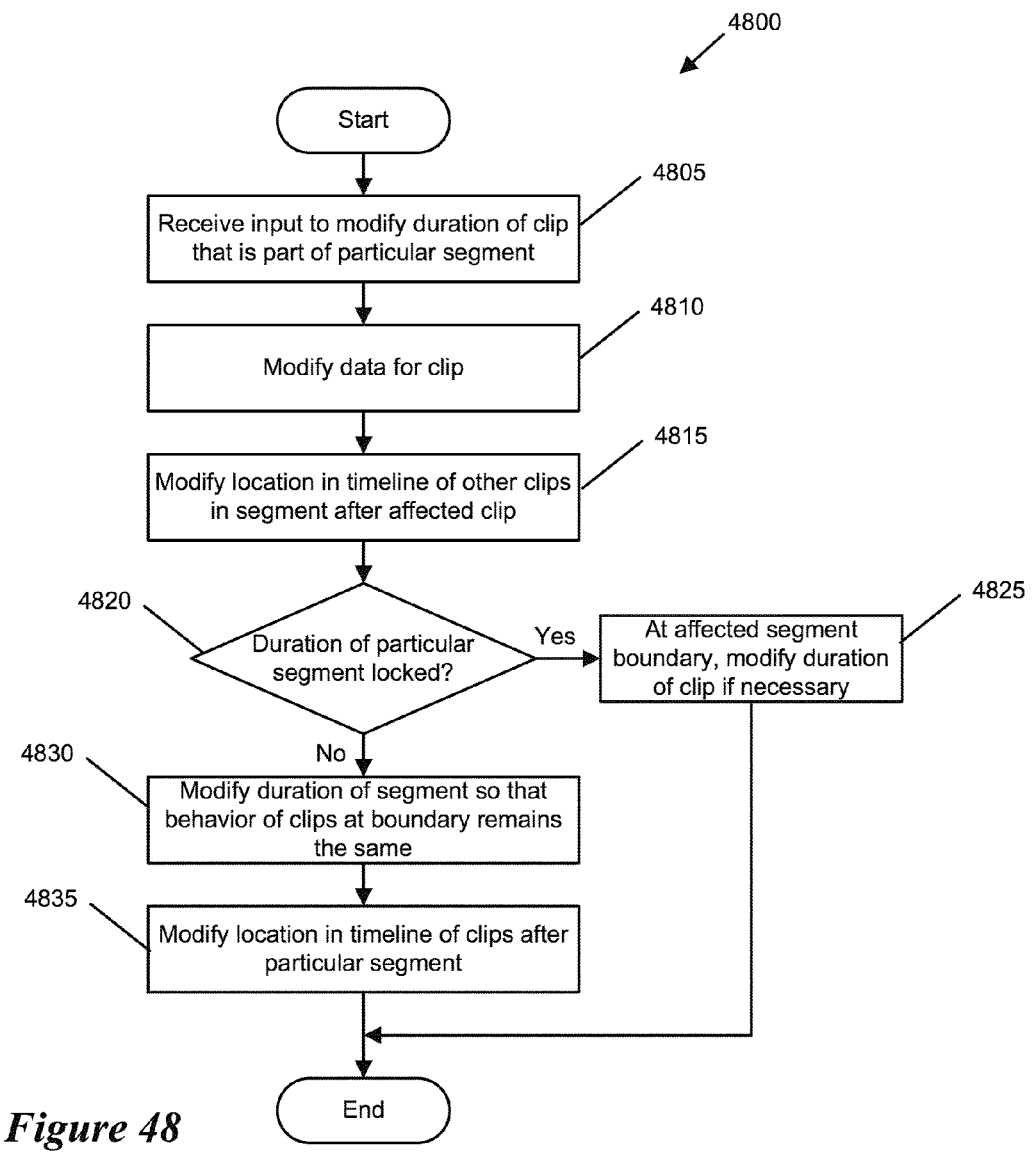
FIG. 48 conceptually illustrates a process for processing an edit (such as a ripple edit) to a clip within a particular segment where the effects of the edit are contained within the particular segment.

FIG. 48 conceptually illustrates a process 4800 for processing an edit (such as a ripple edit) to a clip within a particular segment where the effects of the edit are contained within the particular segment. Process 4800 begins by receiving (at 4805) input to modify the duration of a clip that is part of the particular segment. As noted, in some embodiments a ripple edit is one such edit. A ripple edit affects the out point of a clip, and without segmenting of a timeline, also affects the location in the timeline of all other clips. Next, process 4800 modifies (at 4810) data for the clip. That is, when the edit is a ripple edit, the process modifies the out point and duration of the edited clip.

The process then modifies (at 4815) the location in the timeline (that is, the start and end time in the composite media presentation) of other clips in the particular segment that are after the edited clip. Clips before the affected clip are not affected in some embodiments. As shown in FIG. 46, the edit applied to clips 4625 also affects clips 4635 as they come after the edited clips in segment 4645.

Next, process 4800 determines (at 4820) whether the duration of the affected segment is locked. In some embodiments, this is a user option for each segment. That is, a user can open a segment properties window or other such interface and set a flag (e.g., with a checkbox or similar UI item) for the segment to determine whether it has a set duration. The user can also use a hotkey or set of keystrokes while performing the edit to the clip to determine whether the segment duration is affected in some embodiments.

When the duration of the segment is locked, the process modifies (at 4825) the duration of the clip within the segment at the segment boundary if necessary. This is the case with clips 4635 in FIG. 46 which are shortened so that the ripple edit can be applied to clips 4625 without affecting the segment boundary. The process then ends as the edit is fully contained within the particular segment.

Otherwise, the edit is not truly contained within the segment. Process 4800 modifies (at 4830) the duration of the segment so that the behavior of the clips at the boundary remains the same. The process also modifies (at 4835) the location in the timeline of the clips after the particular segment. This is the case in FIG. 45, in which the duration of segment 4555 is implicitly modified via a ripple edit to clips 4525. Process 4800 then ends. Because clips never move across the segment boundaries in this process, no redefinition of the timeline hierarchy is required.

Figure 49:
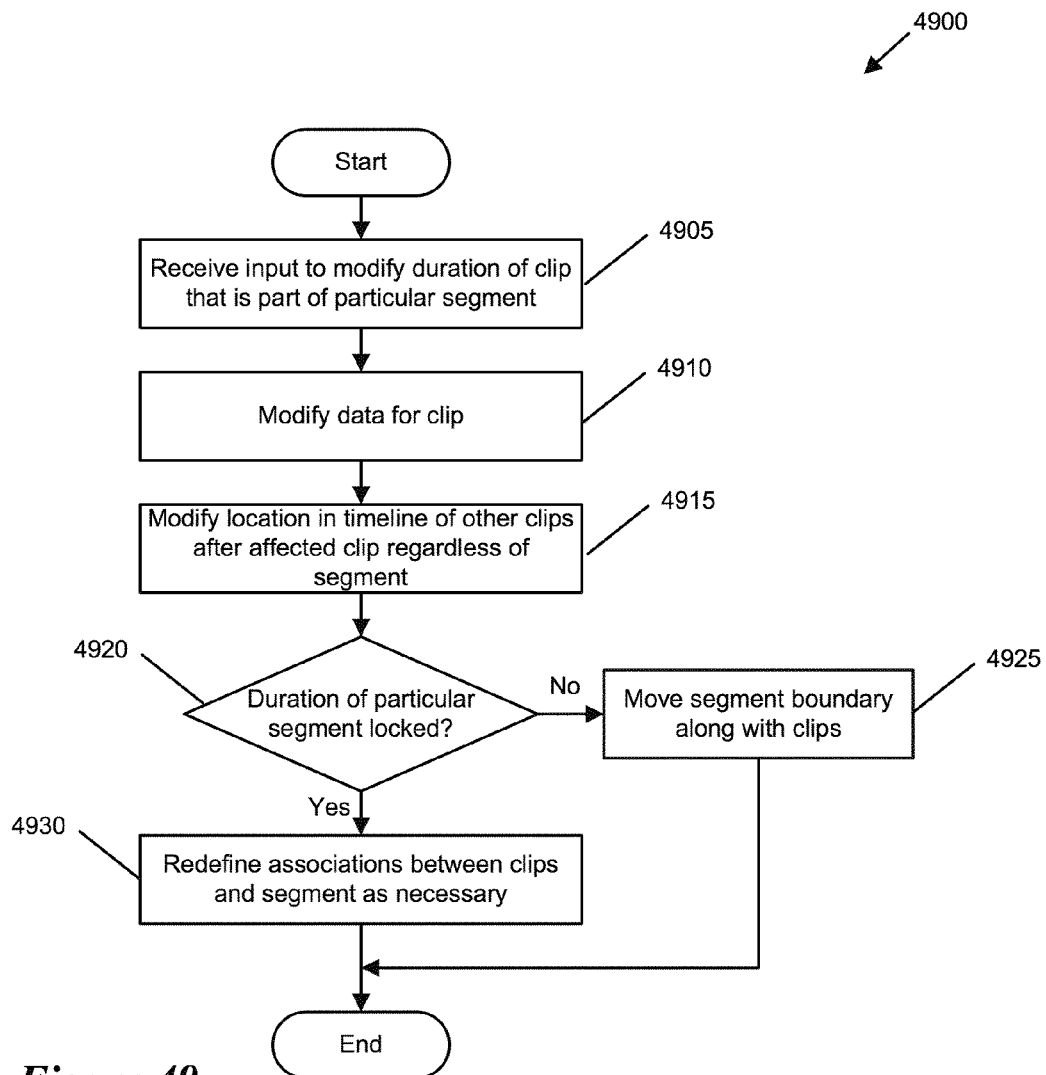
FIG. 49 conceptually illustrates a similar process for processing an edit (such as a ripple edit) to a clip within a particular segment where the effects of the edit are not contained within the particular segment.

FIG. 49 conceptually illustrates a similar process 4900 for processing an edit (such as a ripple edit) to a clip within a particular segment where the effects of the edit are not contained within the particular segment. Process 4900 begins by receiving (at 4905) input to modify the duration of a clip that is part of a particular segment. As noted, in some embodiments a ripple edit is one such edit. A ripple edit affects the out point of a clip, and without segmenting of a timeline, also affects the location in the timeline of all other clips. Next, process 4900 modifies (at 4910) data for the clip. That is, when the edit is a ripple edit, the process modifies the out point and duration of the edited clip.

The process then modifies (at 4915) the location in the timeline (that is, the start and end time in the composite media presentation) of other clips that are after the affected clip regardless of which segment the affected clips are in. Clips before the edited clip are not affected in some embodiments. As shown in FIG. 45, the edit applied to clips 4525 also affects the location of clips 4545 (in the same segment as the edited clips) and clips 4550 (in the next segment).

Next, process 4900 determines (at 4920) whether the duration of the affected segment is locked. In some embodiments, this is a user option for each segment. That is, a user can open a segment properties window or other such interface and set a flag (e.g., with a checkbox or similar UI item) for the segment to determine whether it has a set duration. The user can also use a hotkey or set of keystrokes while performing the edit to the clip to determine whether the segment duration is affected in some embodiments.

When the duration of the segment is locked, the process redefines (at 4930) associations between the media content (the clips) and the segments as is necessary. This example is not illustrated in the above figures, but would be the situation if the clips moved as in FIG. 45 but the segment boundary 4540 stayed at its time of approximately 1:11:15:00 along the timeline. In that case, clips 4545 would be associated with both segment 4555 and the next segment as well, as opposed to only being associated with segment 4555. Process 4900 then ends.

When the edit expands the duration of one of the clips, according to process 4900 the duration of the timeline will expand as well. If any of the segments after the particular segment that includes the edited clip has an unlocked duration, then the first such segment will expand in duration in some embodiments to accommodate the change in the timeline duration. If, however, the durations of all segments are locked, some embodiments create a new segment at the end of the timeline to accommodate clips that are pushed out of the last segment. Other embodiments shorten the duration of the last clip in the timeline, similar to the treatment of clips 4635 in FIG. 46).

When the duration of the particular segment is not locked, the process moves (at 4925) the segment boundary along with the clips, as illustrated in FIG. 45, and the process then ends. One of ordinary skill in the art will recognize that the same result is reached for process 4800 and process 4900 when the segment duration is not fixed, as this is the most likely desirable result for an editor of a composite media presentation. In general, especially if the segments represent scenes, a user modifying the length of a clip within a scene will simply want the length of the scene to extend by that amount. However, in some cases, the duration of a segment may need to be fixed, for instance when the segment represents a portion of a television program that is set to a particular time between commercial breaks. In this case, either the clips will move across the segment boundary (as in process 4900) or the last clip in the segment will be modified (as in process 4800).

VI. Navigation of the Timeline Via the Story Outline

In addition to having various uses for editing (e.g., moving many clips at once, inserting time by creating new segments, other uses described below, etc.), segments defined for a timeline of a composite media presentation can have various uses in navigating the timeline in the composite display area of a media-editing application. Specifically, the selectable segment items in the outline window representing the different segments may be used as navigation tools in addition to the other uses. For example, the segment items may be used to jump to a particular segment or to zoom in on a particular segment or segments in some embodiments.

A. Navigating to a Particular Segment

As mentioned, in some embodiments the story outline may be used to navigate directly to a particular segment. This can be especially useful in a long composite presentation with many segments. Rather than using a scrollbar to attempt to find the particular desired segment, the user can simply click on the segment item in the story outline and the timeline will scroll through the composite display area directly to the segment. The user can then edit the clips in the segment as desired.

Figure 50:
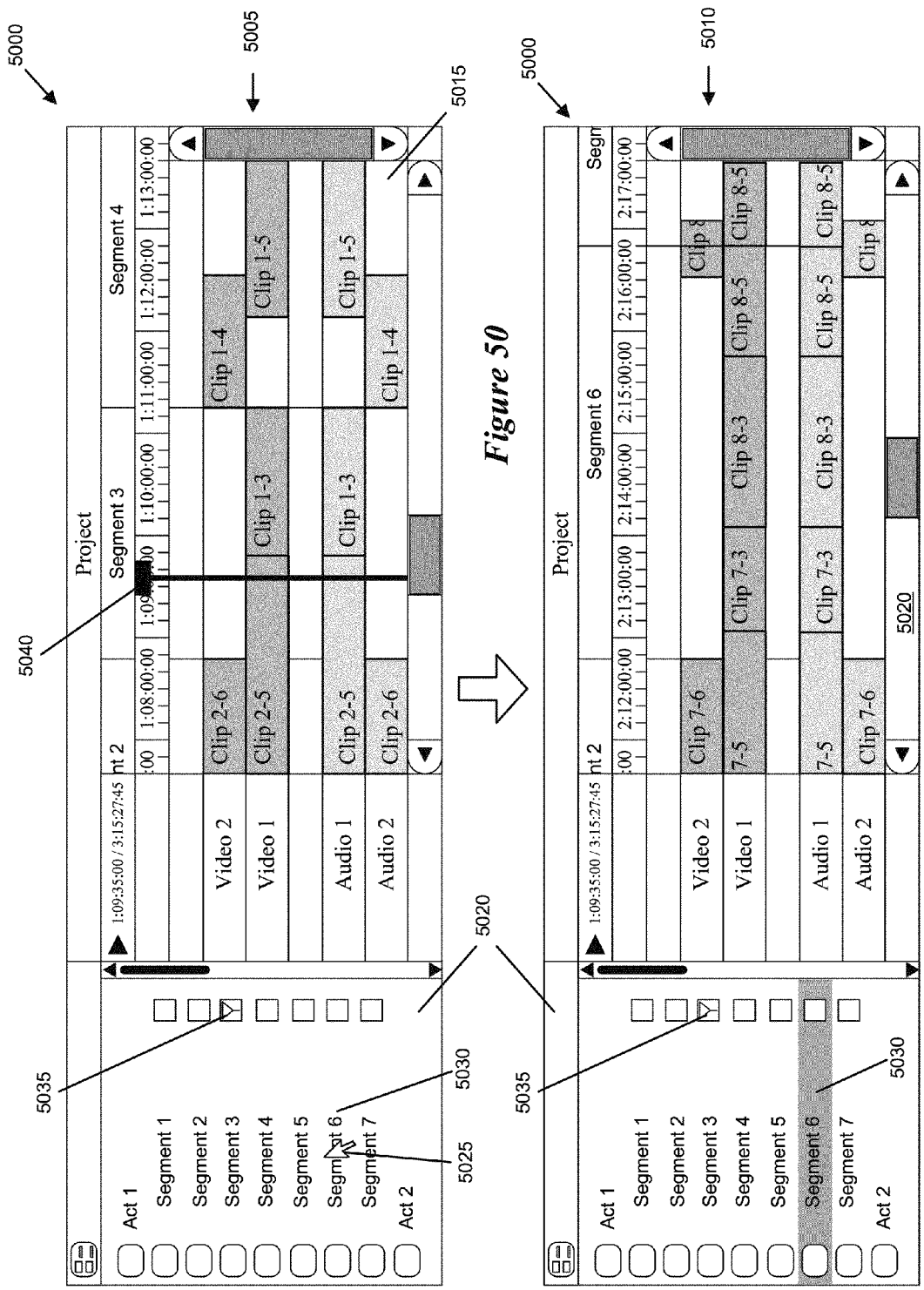
FIG. 50 illustrates the use of the outline window to jump to a particular segment in the composite display area.

FIG. 50 illustrates the use of the outline window to jump to a particular segment in the composite display area. Specifically FIG. 50 illustrates a GUI 5000 in two stages, a first stage 5005 before a user has clicked on a segment item in the story outline and a second stage 5010 after the user has caused the story outline to jump.

GUI 5000 includes a composite display area 5015 and an outline window 5020 that include many similar features to the display areas in GUI 1300. As can be seen from story outline 5020, the timeline of the composite media presentation represented in composite display area 5015 includes at least two supersegments, the first of which includes seven segments. Each of these segments is represented in the outline window by a segment item that includes a thumbnail, segment name, and playhead indicator.

Stage 5005 also includes a cursor 5025 above the segment item 5030 for Segment 6. The playhead icon 5035 is presently in the playhead indicator for Segment 3, as the playhead 5040 is within segment 3 in the timeline. In order to jump to Segment 6 in the timeline, the user can select the segment item 5030. In some embodiments, this is achieved by providing selection input such as pressing a button on a cursor controller with the cursor located over the segment item.

Stage 5010 illustrates the result of a user clicking on the segment item 5030. In this stage, the timeline has moved within the composite display area 5010 such that Segment 6 is centered in the display. The scroll thumb within horizontal scrollbar 5050 has moved to the right accordingly. However, the playhead 5040 is no longer in the composite display area 5015. As the user did not take any action to move the playhead, it remains in Segment 3. Thus, the preview display area of the media-editing application will continue displaying an image from Segment 3. In the story outline, the playhead icon 5035 remains in the indicator for Segment 3, but segment item 5030 is now highlighted to indicate that the segment is selected. As such, in some embodiments a user could apply various editing features to Segment 6 as described above, such as inserting a segment before or after it.

Figure 51:
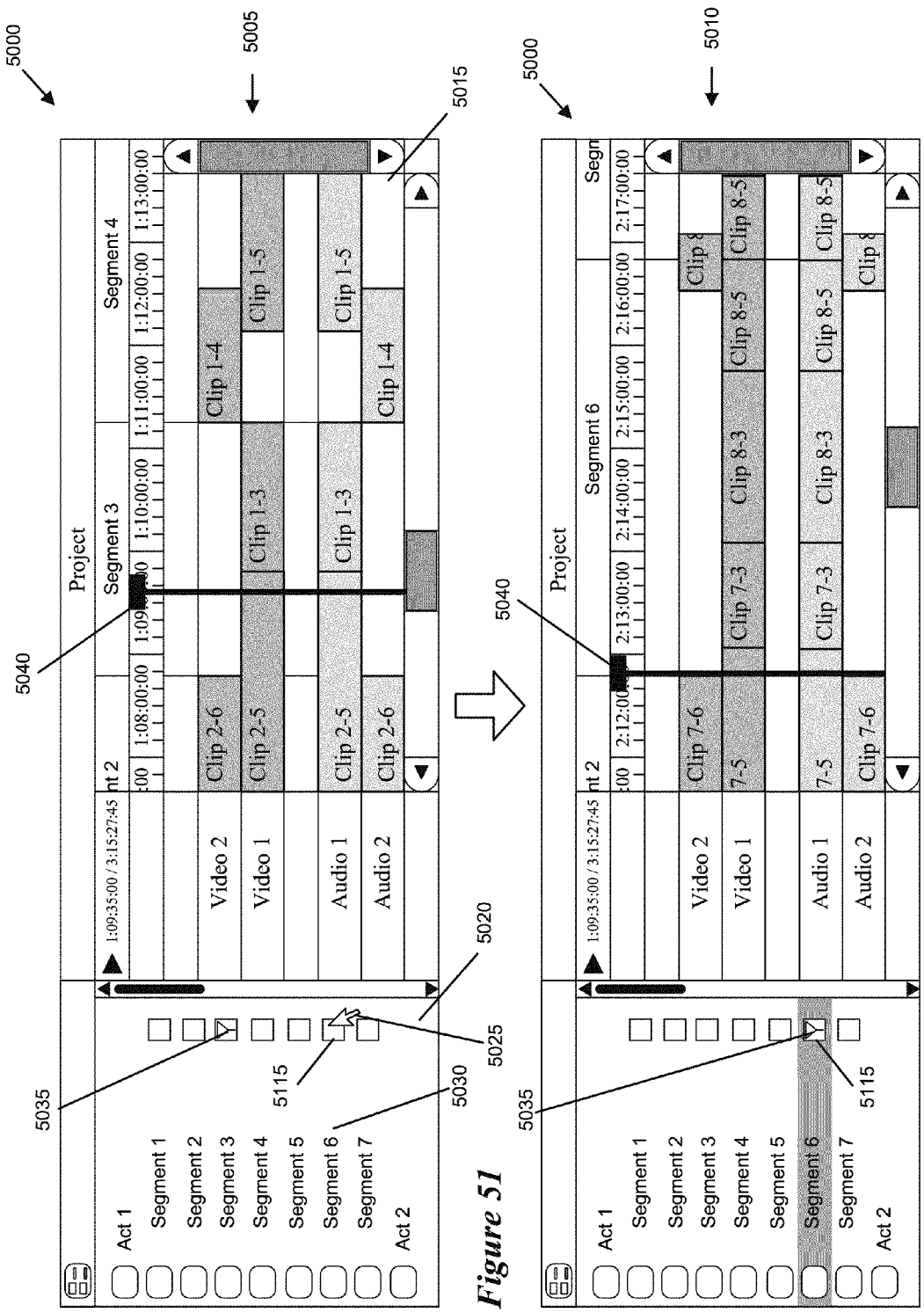
FIG. 51 illustrates the use of the playhead indicator in the outline window to jump to a particular segment in the composite display area and move the playhead as well.

In some embodiments, the playhead may be moved to the selected segment if the user clicks in the playhead icon for the segment item. FIG. 51 illustrates such an action for the GUI 5000. FIG. 51 also illustrates GUI 5000 in two stages, a first stage 5105 before a user has clicked on the playhead indicator 5115 for segment item 5030 and a second stage 5110 after the user has done so, causing the story outline to jump and the playhead 5040 to move as well.

The GUI 5000 is the same in stage 5105 as in stage 5005, except that the cursor 5025 is located over the playhead indicator 5115 that is part of segment item 5030. Stage 5110 illustrates GUI 5000 after the user has clicked on playhead indicator 5115. In this case, the GUI is the same as in stage 5010, with two significant differences. For one, in addition to jumping the timeline in the composite display area to be centered on Segment 6, playhead 5040 is now at the start of the selected segment. Some embodiments, rather than placing the playhead at the start, move it to the center of the segment or another location in the segment. Secondly, the playhead indicator icon 5035 is now in the playhead indicator 5115.

The above examples illustrate the case where the selected segment is centered in the composite display area. In some cases, the segment will be too long to fit entirely in the composite display area. In some embodiments, the middle of the segment is still centered in the composite display area, and if the playhead indicator was selected, then the playhead would be moved to the start of the segment but not actually displayed. Regardless of the length of the segment, some embodiments instead display the start of the selected segment at the left edge of the composite display area.

In some embodiments, when moving from one portion of the timeline to another via the segment items in the story outline, the jump is instantaneous. That is, at one point in time the first portion of the timeline is displayed (e.g., stage 5005) and then as soon as the input is received the new portion of the timeline is displayed (e.g., stage 5010).

Figure 52:
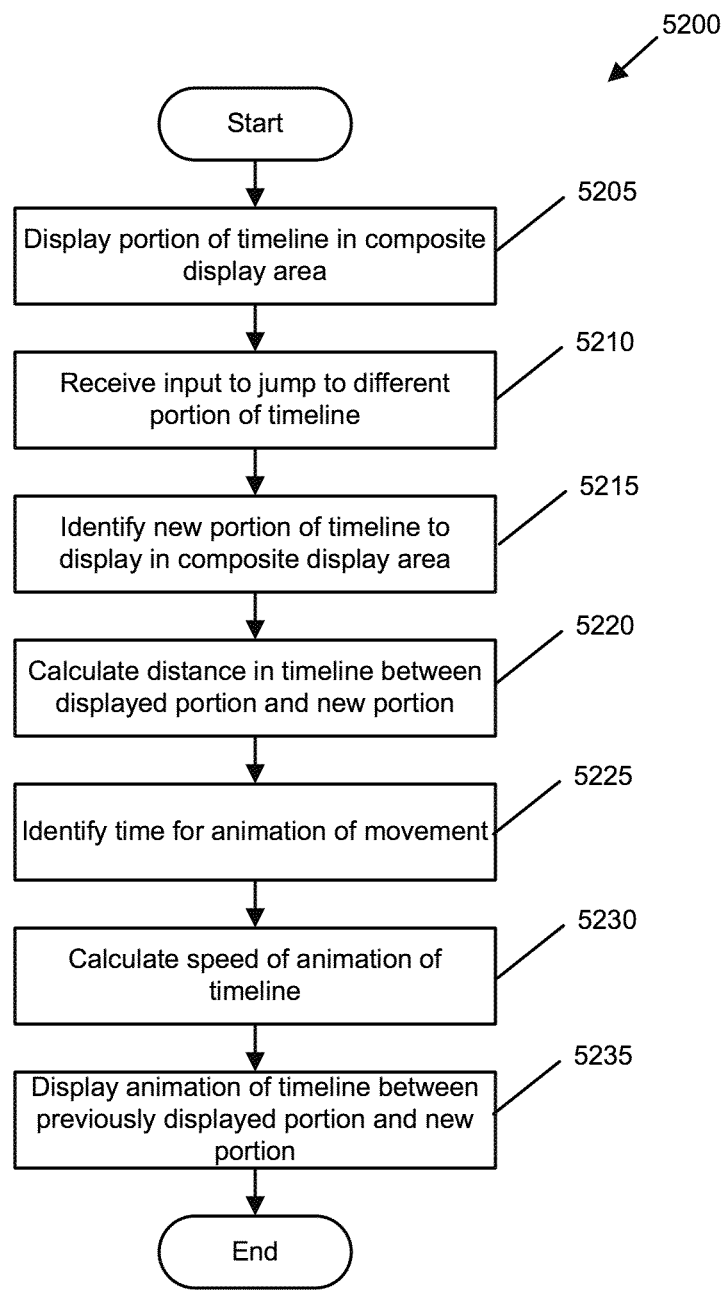
FIG. 52 conceptually illustrates a process of some embodiments for providing animation when jumping to a selected segment.

However, some embodiments instead animate the display change in such a way that the user is given an idea of the distance in the timeline covered by the move. FIG. 52 conceptually illustrates a process 5200 for providing such animation. Process 5200 begins by displaying (at 5205) a portion of a timeline of a composite media presentation in a composite display area. The GUI as illustrated in stage 5005 of FIG. 50 is an example of such a timeline portion.

The process then receives (at 5210) input to jump to a different portion of the timeline. As described above, this is input from a cursor controller selecting a segment in a story outline window in some embodiments. The input could be touchscreen input in some embodiments, or from a different input device (e.g., a keyboard). When the input is received, the process identifies (at 5215) a new portion of the timeline to display in the composite display area. The new portion, in some embodiments, will have the selected segment centered in the composite display area.

Next, process 5200 calculates (at 5220) the distance in the timeline between the displayed portion and the new portion. This calculation may be in units of time or units of distance (using the notion of the entire timeline displayed in an infinitely long composite display area) such as the number of pixels. The process also identifies (at 5225) the time for displaying the animation of the timeline. In some embodiments, this is a fixed time that is set regardless of the distance to be moved. Next, the process calculates (at 5230) the speed of animation of the timeline. In some embodiments, this involves simply dividing the calculated distance over the identified time for a constant speed. Other embodiments, however, use more involved calculations that factor in having the timeline speed up at the start and slow down at the end.

Some embodiments, rather than using a fixed time, use a fixed speed for the animation and calculate the time instead based on the distance and the speed. Rather than a constant fixed speed, some embodiments may include a fixed acceleration and/or deceleration of the timeline as well.

Finally, process 5200 displays (at 5235) the animation of the timeline between the previously displayed portion and the new portion. In the case of FIG. 50, the animation would start at stage 5005 and end at stage 5010. In between, the composite display area would move quickly by, thereby giving the user a notion of how far in the timeline the display had moved.

B. Focusing on a Particular Segment or Segments

In some embodiments, the outline window can be used to focus on a particular segment or segments so that those segments occupy the entirety of the composite display area. In some cases, this will involve zooming out (e.g., when there are multiple segments being focused upon) while other cases will involve zooming in (e.g., when only one segment is selected for focusing). An editor may use such a feature if they want to see the overall presentation (focusing on multiple segments) or if they want to make precise edits to a particular segment (focusing on one segment).

Some embodiments include one or both of two different possible focus features. The first such feature enables a user to select a set of segments in the story outline and focus (or zoom) on all segments from the first to the last selected segment, including those in between that are not selected. A second such feature enables the user to select a set of segments in the story outline and focus on only the selected segments, removing the other segments from the display.

Figure 53:
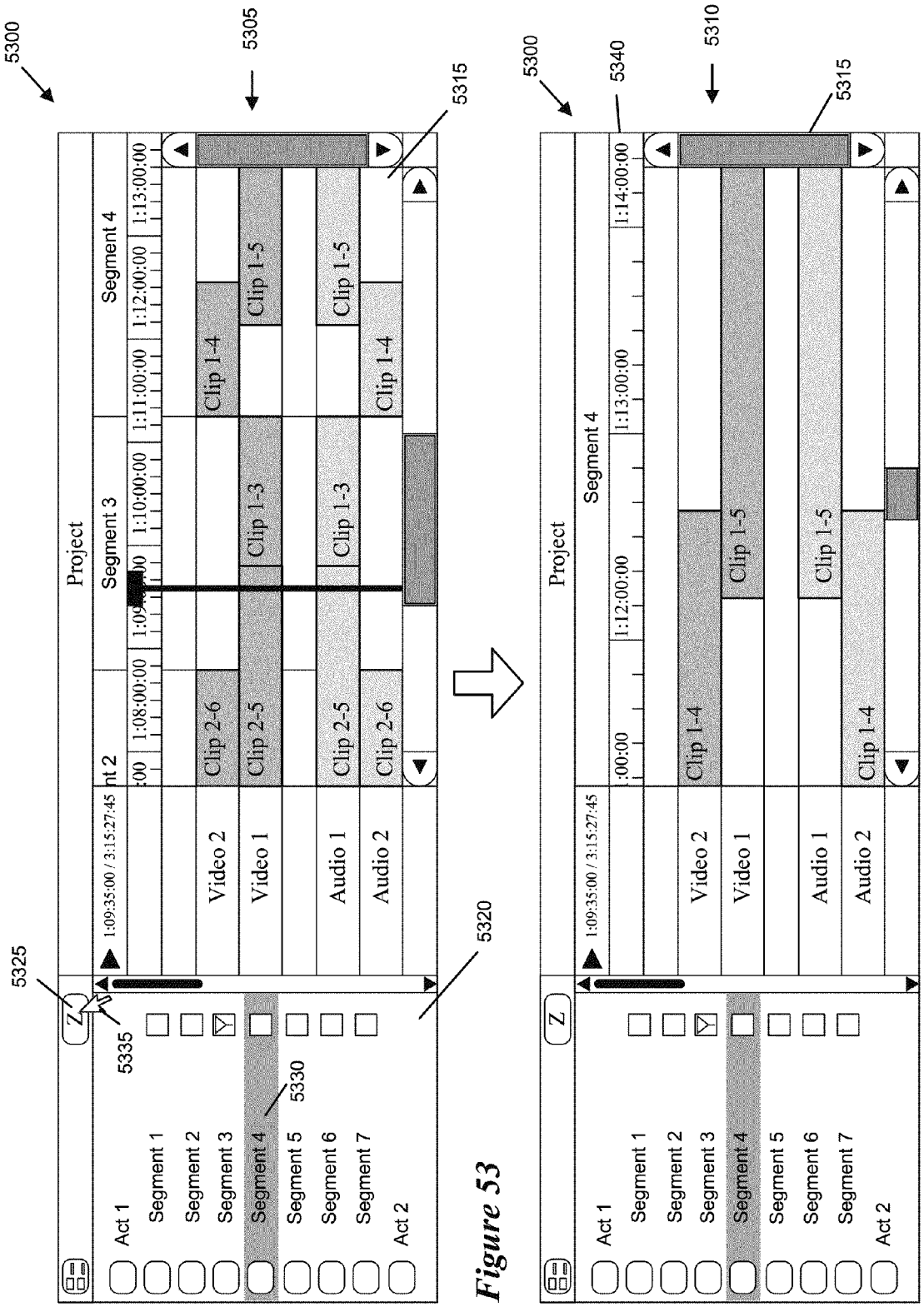
FIG. 53 illustrates the use of a focus feature that focuses the composite display area on a particular selected segment.

FIG. 53 illustrates the use of the first focus feature to zoom to fit on a single particular segment. Specifically, FIG. 53 illustrates a GUI 5300 in two stages, a first stage 5305 prior to a user focusing on a particular segment and a second stage 5310 after the user has focused the timeline in the composite display area on the particular segment.

GUI 5300 includes a composite display area 5315 and an outline window 5320 that include many similar features to the display areas of GUI 1300. Outline window 5320 also includes a UI item 5325 for focusing on a selected segment or group of segments. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. Yet other embodiments allow the user to access the focusing feature through multiple different UI items, including those not mentioned in the above paragraph.

The first stage 5305 of FIG. 53 illustrates that segment item 5330 (for Segment 4) is selected, as indicated by the gray highlighting. In stage 5305, a cursor 5335 is located over the UI item 5325. Stage 5310 illustrates the result of the user selecting the UI item 5325 to focus on the selected segment. In order to zoom in and focus only on Segment 4 in the composite display area, the timeline ruler 5340 has changed in scale, and the clip shapes have been enlarged accordingly.

Figure 54:
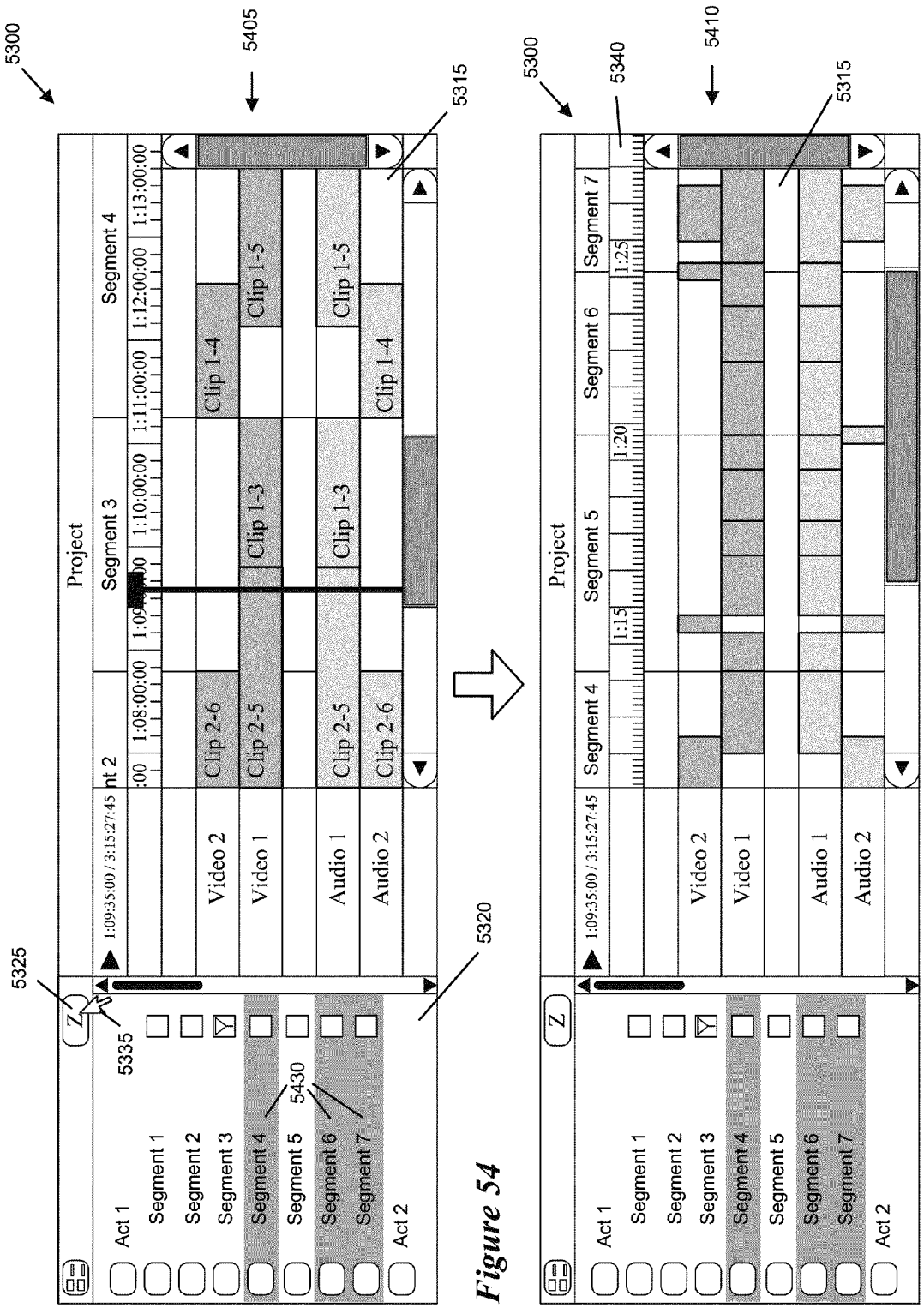
FIG. 54 illustrates the use of a focus feature that focuses the composite display area on a group of selected segments without hiding any segments.

This feature may also be used to focus on a group of segments, sometimes resulting in shrinking the clip shapes from the normal view. FIG. 54 illustrates the use of this focus feature to zoom to fit on a particular group of segments. Specifically, FIG. 54 illustrates GUI 5300 in two stages, a first stage 5405 prior to a user focusing on a group of segments and a second stage 5410 after the user has focused the timeline in the composite display area 5315 on the group of segments.

The first stage 5405 of FIG. 54 illustrates that three segment items 5430 (for Segments 4, 6, and 7) are selected, as indicated by the gray highlighting. In stage 5405, cursor 5335 is located over UI item 5325. Stage 5410 illustrates the result of the user selecting the UI item 5325 to focus on the selected group of segments. Although Segment 5 is not selected, it is included in the group of segments displayed in composite display area 5315. In order to fit all four segments in the composite display area, the timeline ruler 5340 has changed in scale, and the clip shapes have shrunk horizontally accordingly.

Figure 55:
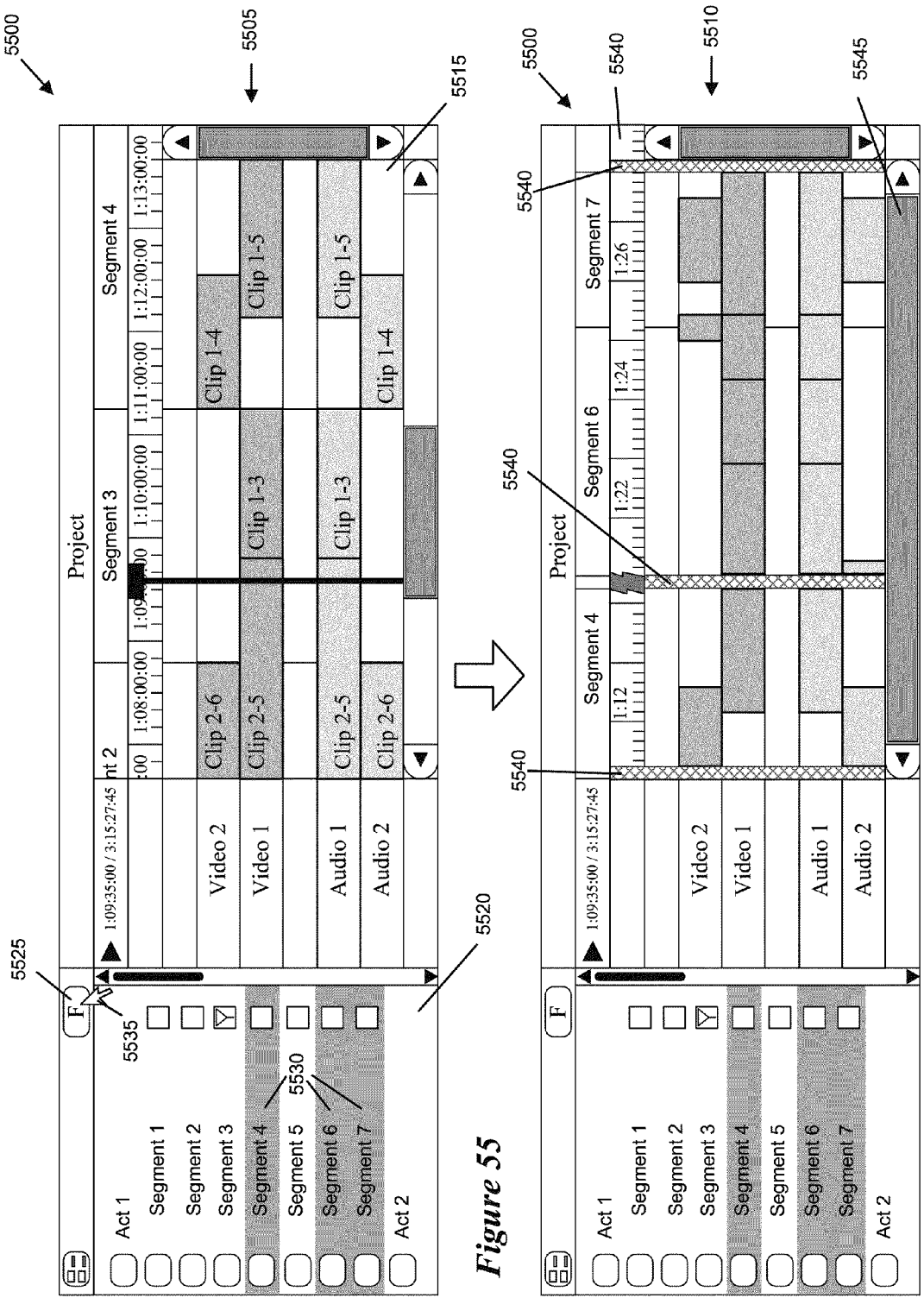
FIG. 55 illustrates the use of a focus feature that focuses the composite display area on only selected segments.

As mentioned above, some embodiments include a focus feature that only focuses on the selected segments, removing from the display segments that are not selected. FIG. 55 illustrates the use of such a focus feature. Specifically, FIG. 55 illustrates a GUI 5500 in two stages, a first stage 5505 before the selection of the focus feature and a second stage 5510 after the focus feature has been selected.

GUI 5500 includes a composite display area 5515 and an outline window 5520 that include many similar features to the display areas of GUI 1300. Outline window 5520 also includes a UI item 5525 for focusing on a selected group of segments. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. Yet other embodiments allow the user to access the focusing feature through multiple different UI items, including those not mentioned in the above paragraph.

The first stage 5505 of FIG. 55 illustrates that three segment items 5530 (for Segments 4, 6, and 7) are selected, as indicated by the gray highlighting. In stage 5505, a cursor 5535 is located over the UI item 5525. Stage 5510 illustrates the result of the user selecting the UI item 5525 to focus on the selected group of segments. Because Segment 5 is not selected, it is not included in the group of segments displayed in the composite display area 5515. In order to fit all three segments in the composite display area, the timeline ruler 5540 has changed in scale, and the clip shapes have shrunk horizontally accordingly. Because there is a segment missing (and, thus, time missing) in the display, a break is indicated between Segment 4 and Segment 6 in the timeline ruler 5540. Different embodiments use different visual indicators to note such a break. Also, as only the segments selected in story outline 5520 are displayed in the composite display area, the first three segments in Act 1 and all segments after Act 1 are removed as well. As such, the scroll thumb 5545 for the horizontal scroll bar has expanded to fill the entire scrollbar.

In some embodiments, as shown, the composite display area also includes placeholder items (or "handles") to represent the removed areas when the focus feature is applied. Composite display area 5515 includes handles 5550-5560 to represent the end of Segment 3, the removed Segment 5, and the start of Act 2.

In the case of either focus feature, some embodiments also include a UI item (not shown) for restoring the zoom factor on the timeline to normal. This enables a user to get back to the standard view of the timeline without having to select a different set of segments to focus on, and restores any segments hidden as a result of the second focus feature.

Figure 56:
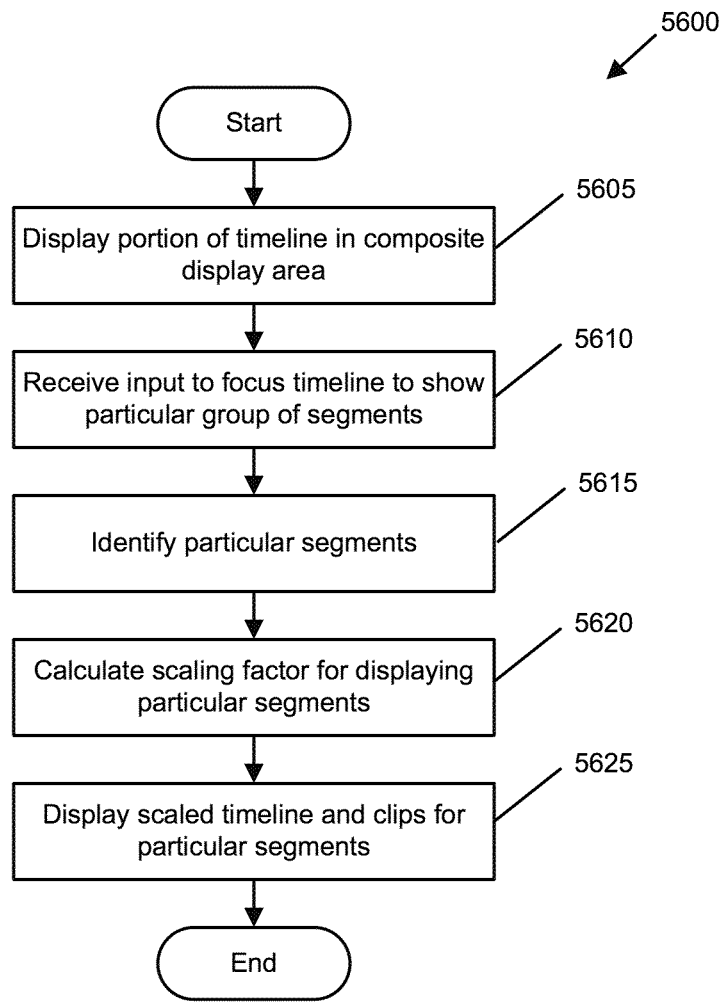
FIG. 56 conceptually illustrates a process of some embodiments for displaying a portion of a timeline focusing on a particular set of segments.

FIG. 56 conceptually illustrates a process 5600 of some embodiments for displaying a portion of a timeline focusing on a particular set of segments according to either of the above-described focus features. Process 5600 begins by displaying (at 5605) a portion of a timeline in the composite display area. Stage 5305 of FIG. 53 is an example of such a display.

The process then receives (at 5610) input to focus the timeline on a particular group of segments. The particular group of segments can be anywhere from one segment to many segments (e.g., all of the segments) in some embodiments. In some embodiments, the input involves a user selecting a group of segments (e.g., by selecting segment items in the story outline) and then selecting a focus option (e.g., from a drop-down menu).

The process then identifies (at 5615) the particular segments. For example, if the first focus feature is used, the process identifies all of the segments between the first selected segment and the last selected segment including those that are not selected. On the other hand, if the second focus feature is used, the process only identifies the segments that are actually selected in the story outline.

Next, the process calculates (at 5620) a scaling factor for displaying the particular identified segments. In some embodiments, the clips and the timeline (i.e., the timeline ruler) are scaled up or down so that the particular segments fit exactly in the composite display area. Thus, each clip spans the same duration and is displayed as such, but is a different size in the GUI. This is illustrated by comparing stage 5305 (non-focused) to stage 5310 (focused). The calculation is performed by determining the ratio of media presentation time normally shown in the composite display area to the time covered by the segments identified for display.

Finally, process 5600 displays (at 5625) the scaled timeline and clips for the particular identified segments in the composite display area, and ends. Some embodiments also incorporate animation similar to process 5200 when modifying the display in response to the selection of a focus feature.

C. Hiding a Segment in the Composite Display Area

In addition to focusing on particular segments, in some cases a user will want to hide a particular segment. While this can be done with the second focus feature by selecting all segments except the desired hidden segment, this can be a time-consuming and irritating process if there are numerous segments and the user only wishes to hide one of them.

Figure 57:
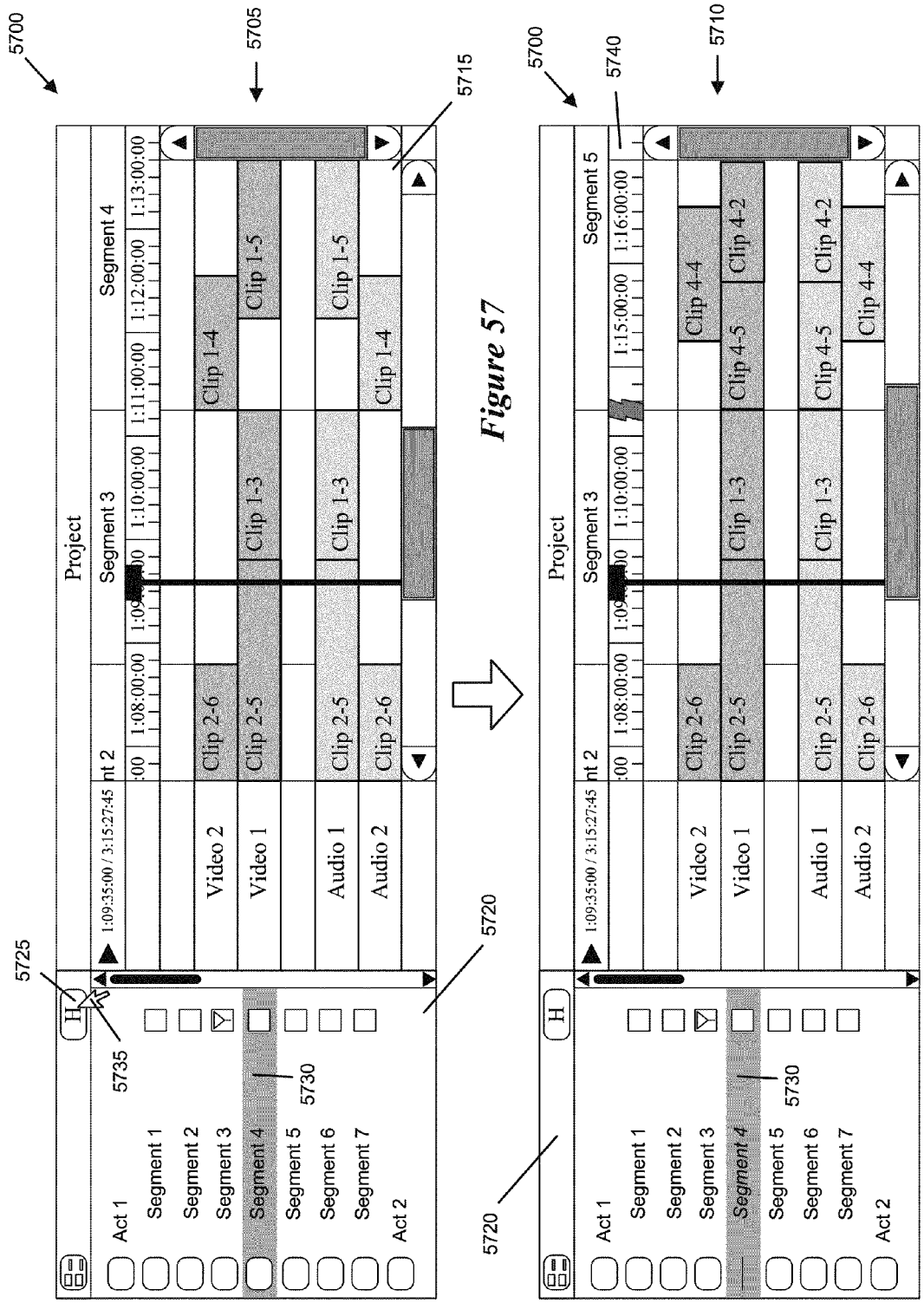
FIG. 57 illustrates the use of a feature that hides a selected segment from display in the composite display area.

FIG. 57 illustrates the use of a separate segment hiding feature. Specifically, FIG. 57 illustrates a GUI 5700 in two stages, a first stage 5705 prior to a user hiding a particular segment and a second stage 5710 after the user has hidden the particular segment from display in the composite display area.

GUI 5700 includes a composite display area 5715 and an outline window 5720 that include many similar features to the display areas of GUI 1300. Outline window 5720 also includes a UI item 5725 for hiding a particular segment or segments. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. Yet other embodiments allow the user to access the segment hiding feature through multiple different UI items, including those not mentioned in the above paragraph.

The first stage 5705 illustrates that segment item 5730 (the segment item for Segment 4) is selected in story outline 5720. Currently displayed in the composite display area is a portion of Segment 2, all of Segment 3, and a portion of Segment 4. A cursor 5735 is located over the UI item 5725.

Stage 5710 illustrates the result of the user selecting the UI item 5725. In the composite display area, Segment 4 is no longer displayed, and has been replaced by a portion of Segment 5. As a result, there is now a break in the timeline ruler 5740 that displays the time in the composite media presentation. Different embodiments include different manners for displaying this break (e.g., an obvious break in the ruler as is shown, a discontinuity in the time, etc.).

Also, the display of segment item 5730 in the outline window 5720 is modified. In this case, the segment name is italicized and the thumbnail to the left is displayed as a line. Different embodiments use other display indicators, such as graying out the name, etc. Some embodiments also remove the selection highlighting from the segment item when its segment is hidden as well.

Some embodiments provide a UI item that allows the user to unhide all hidden segments or selected hidden segments. This could be provided as a UI button, in a menu along with the hide segment command, etc. In some embodiments, a user can also click (or double-click, or a similar selection command from any sort of input device) on the minimized thumbnail in the segment header for a hidden segment in order to restore the segment in the composite display area.

VII. Media Editing with Segments

The above sections described, in part, various uses for segments related to editing the content of a composite media presentation: rearranging segments to modify the story of the presentation, using segments to modify the application of a ripple edit, creating new segments (which modifies the duration of the presentation in some embodiments), etc. However, segments have many more uses in the media-editing process as well, some of which are detailed in the following section.

A. Skipping Segments on Rendering

In addition to being able to hide segments in the composite display area (as described above in Section V.C), some embodiments of the media editing application are capable of rendering or previewing a composite media presentation while skipping particular segments. Previewing the presentation, in some embodiments, involves playing the presentation in a preview display area, or canvas, such as display area 805 of FIG. 8. When a presentation is previewed, the media-editing application pulls the data for each clip in the presentation from the source file for that clip. Rendering, on the other hand, does not necessarily involve actually playing the presentation in some embodiments. Rather, the media-editing application pulls the data for each clip in the presentation and composites all the necessary data into an output (rendered) file that can then be viewed or exported as the presentation itself.

Figure 58:
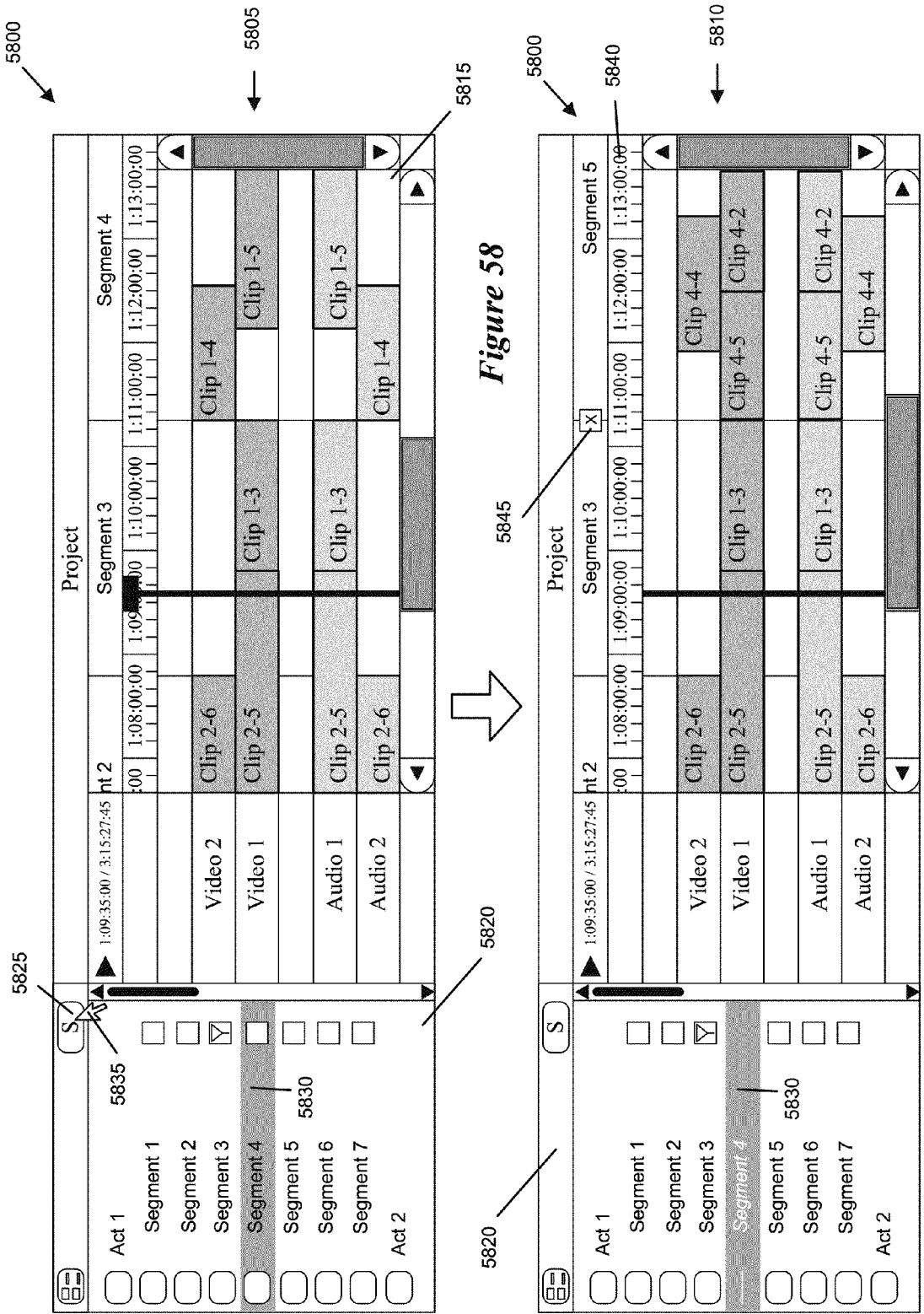
FIG. 58 illustrates the use of a feature that removes a selected segment from the composite media presentation.

Some embodiments provide a variation on the hiding of segments (as described for FIG. 57 above) that marks selected segments to be skipped and removes them from the composite media presentation, but preserves the segment for easy reinstatement back into the composite presentation. FIG. 58 illustrates such a skip feature. Specifically, FIG. 58 illustrates a GUI 5800 in two stages, a first stage 5805 prior to a user removing a segment and a second stage 5810 after the user has invoked the skip and remove feature.

GUI 5800 includes a composite display area 5815 and a story outline 5820 that include many similar features to the display areas of GUI 1300. Outline window 5820 also includes a UI item 5825 for marking a particular segment or segments to be skipped and removing the segments from the composite media presentation. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. Yet other embodiments allow the user to access the segment hiding feature through multiple different UI items, including those not mentioned in the above paragraph.

The first stage 5805 illustrates that segment item 5830 (the segment item for Segment 4) is selected in story outline 5820. Currently displayed in the composite display area is a portion of Segment 2, all of Segment 3, and a portion of Segment 4. A cursor 5835 is located over UI item 5825.

Stage 5810 illustrates the result of the user selecting the UI item 5825. In the composite display area, Segment 4 is no longer displayed, and has been replaced by a portion of Segment 5. Furthermore, a small icon 5845 is displayed between the segment headers for Segment 3 and Segment 5 to indicate that a segment is missing at that point. In some embodiments, an icon is instead displayed within the timeline ruler 5840, along the segment boundary in the composite display area, or is not displayed at all. As opposed to FIG. 57, there is no break in timeline ruler 5840 in stage 5810. Because Segment 4 is removed from the presentation, Segment 5 (and the clips therein) have moved forward in the presentation. In some embodiments, clicking on the icon 5845 will reinstate Segment 4 back into the presentation. Some embodiments have a UI item similar to item 5825 for reinstating a segment.

When a segment is removed, much as is the case with moving segments, clips that overlap the boundaries of the removed segment become a problem. These clips can be removed completely (the equivalent of an inclusive selection of the removed segment), left behind completely (the equivalent of an exclusive selection), or razored at the segment boundaries. When a clip is left behind completely, it will at least overlap into what is now the next (or previous) segment and possibly overlap another clip in its track. Some embodiments handle clip overlaps in one or more of the different ways described in Section IV.C.

Figure 59:
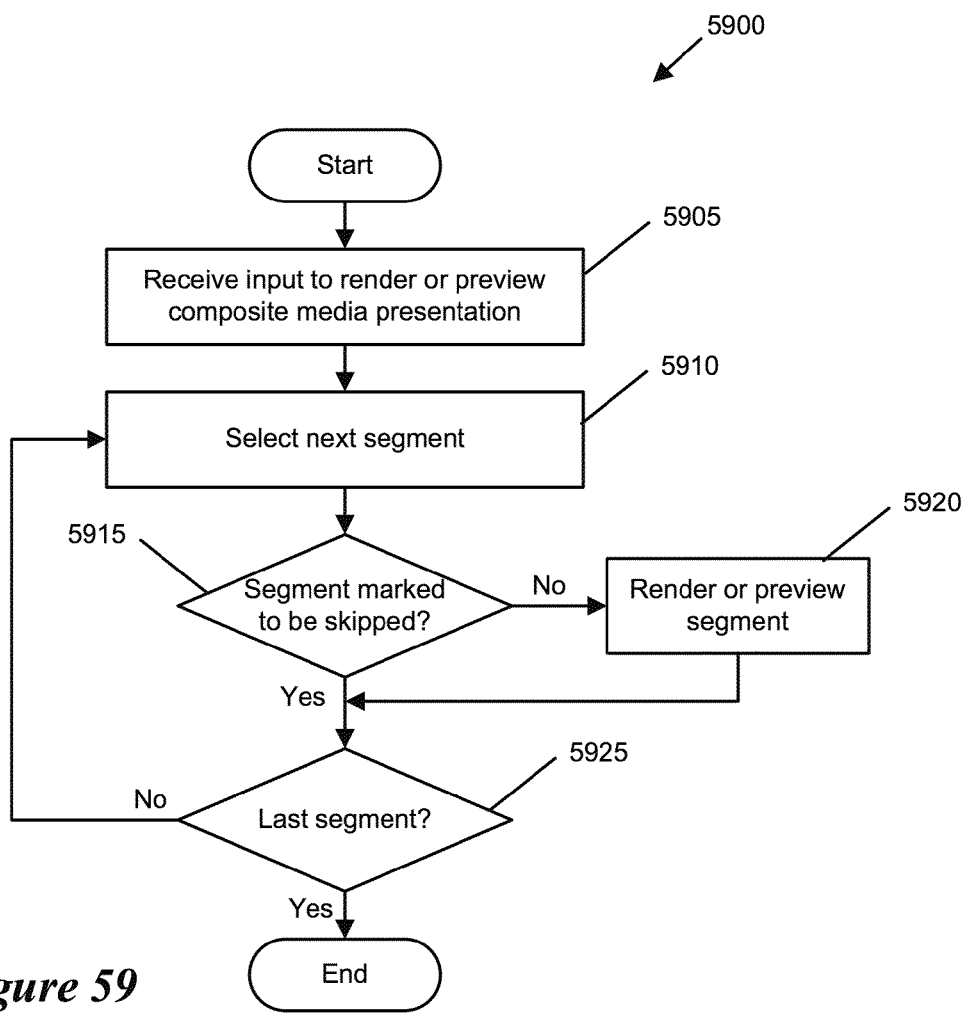
FIG. 59 conceptually illustrates a process of some embodiments for previewing or rendering a composite media presentation.

As mentioned, segments that are removed may be skipped when previewing or rendering the composite media presentation. FIG. 59 conceptually illustrates a process 5900 for previewing or rendering a composite media presentation. Process 5900 begins by receiving (at 5905) input to render or preview a composite media presentation. This input can be selection of an option from a menu, selection of a UI button, keystroke input, etc. In some embodiments, when rendering the presentation the media-editing application also plays the presentation for viewing/listening by the user.

The process then selects (at 5910) the next segment in the composite media presentation. In some embodiments, the preview and/or render starts at the beginning of the timeline for the composite media presentation and proceeds sequentially through the timeline. Thus, the first segment selected at 5910 is the first segment in the timeline.

Process 5900 then determines (at 5915) whether the selected segment is marked to be skipped. In some embodiments, any segments removed from the composite display area (as described above with respect to FIG. 58) are marked to be skipped. In some embodiments, any segments that are hidden (as described above in Section VI.C) are automatically skipped, though other embodiments require further action on the part of the user to skip a segment for rendering or output.

When the segment is not marked to be skipped, the process renders or previews (at 5920) the segment, depending on whether the input received is to render or preview the presentation. As noted above, to either render or preview a segment, data for each clip is pulled from the source file for the clip. To render the presentation, the data is combined into one rendered file for the presentation.

When the segment is marked for skipping, no data for the clips in the segment is retrieved, and the process proceeds directly to determine (at 5925) whether the recently processed segment is the last segment in the presentation. When more segments remain, the process proceeds to 5910 to select the next segment. Once all segments have been processed, the process ends.

Skipping a segment when rendering or previewing a composite presentation can have a variety of uses. An editor might be previewing a presentation and be completely satisfied with a group of segments but unsure about others, so the editor will choose to preview only the segments that are not definitely complete. In some cases, a director of a movie will want to render the movie without a particular scene (for example, for an edited-for-television version of a movie that omits a particularly objectionable scene). Various other reasons for skipping a segment exist as well.

B. Different Versions of Segments

As noted in the subsection above, an editor can create different versions of a composite presentation by skipping a segment. However, in some cases, the editor will want to create different versions of a composite presentation without omitting an entire segment. For instance, in many cases a movie will have a theater version that is rated R but also an unrated DVD version that does not include any new scenes but rather has extra clips or longer clips that have more nudity, violence, etc. An editor might also use this feature when trying to decide which of two slightly different versions of a scene works best for a film, television show, etc.

Figure 60:
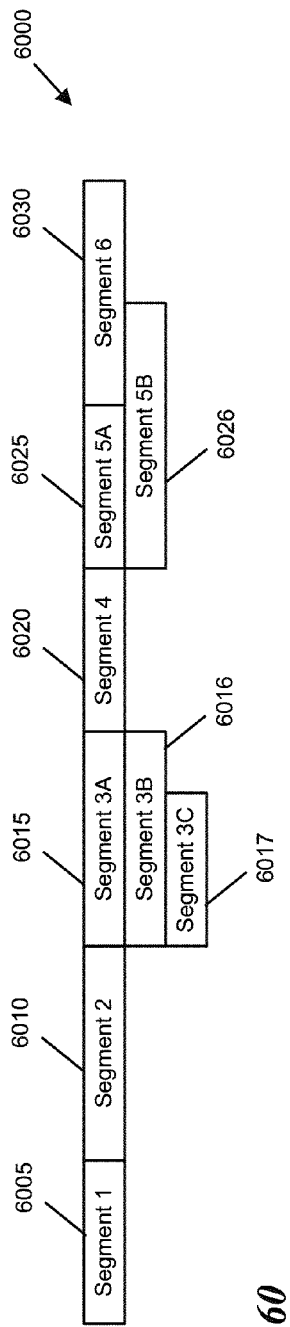
FIG. 60 conceptually illustrates a timeline for a composite media presentation that includes segments with multiple versions.

FIG. 60 conceptually illustrates a timeline 6000 for a composite media presentation that includes segments with multiple versions. The primary version of timeline 6000 includes six segments 6005-6030. However, the third segment has three versions 6015, 6016, and 6017, and the fifth segment includes two versions 6025 and 6026. In some embodiments, a user can choose which version of each segment to use in rendering or previewing the presentation. That is, the user could mix and match with segment 3B 6016 and segment 5A 6025, segment 3C 6017 and segment 5B 6026, etc.

Figure 61:
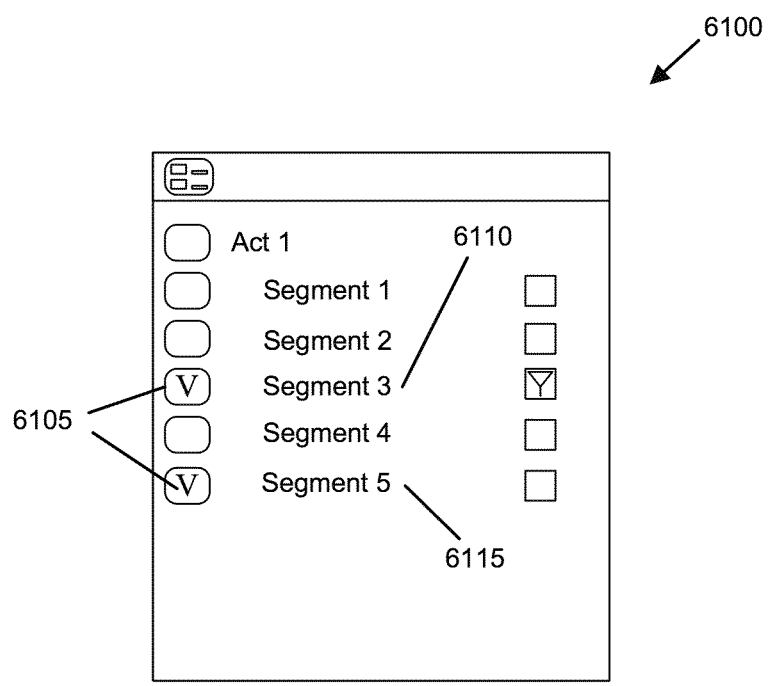
FIG. 61 illustrates a story outline for the timeline of FIG. 60.

In some embodiments, when a particular segment includes multiple versions, this is indicated in the story outline of the media-editing application GUI. FIG. 61 illustrates such a story outline 6100 for timeline 6000. Story outline 6100 includes segment items for each segment, but also includes a "V" indicator in the thumbnails 6105 for segment items 6110 and 6115. The indicator in the thumbnails 6105 visually indicates to a user that those particular segments have multiple versions. In some embodiments, clicking on the thumbnail (or right-clicking, or some other form of input from a cursor controller or other input device) brings up a drop-down menu of the different version choices for the particular segment so that a user can switch easily between versions.

Figure 62:
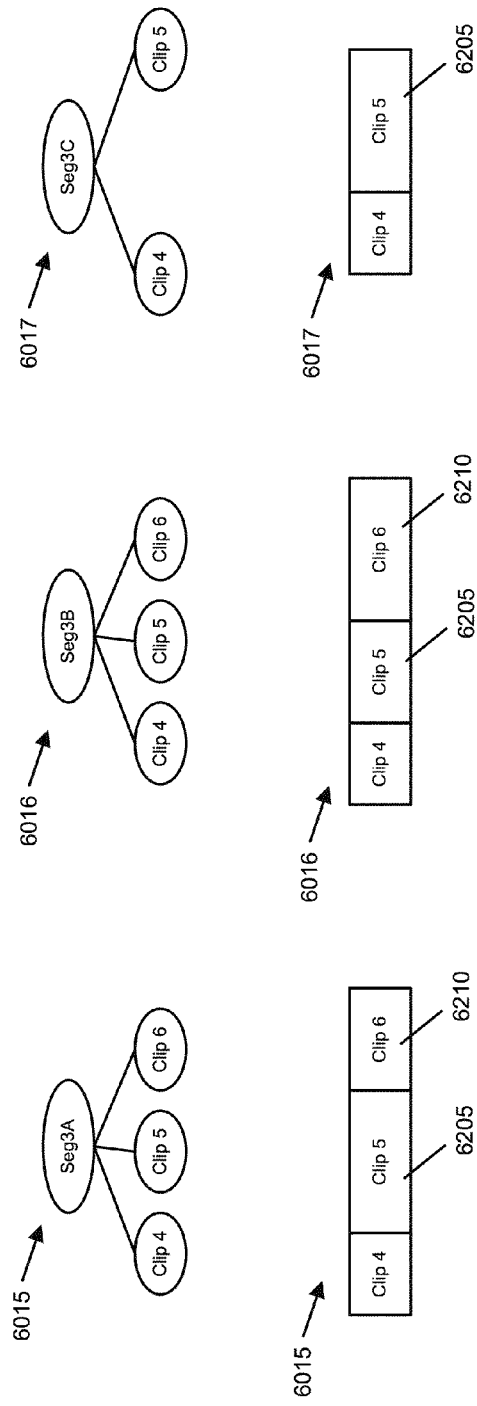
FIG. 62 conceptually illustrates the three different versions of one of the segments from FIG. 60.

FIG. 62 conceptually illustrates the three different versions 6015-6017 of segment 3 from timeline 6000. FIG. 62 illustrates both the clips in the segment and the associations in the structured hierarchy for the timeline 6000. As can be seen, the first two versions 6015 and 6016 include the same three clips, and thus the associations appear the same. However, version 6015 includes more of Clip 5 6205 and less of Clip 6 6210 as compared to version 6016, although both versions end up being the same length. On the other hand, the shorter version 6017 includes the longer Clip 5 6205 and leaves out Clip 6 6210 altogether. This illustrates that different versions can include different clips, clips from the same source file with different in and out points, etc.

Another use for the versioning feature (and segments generally) is the ability for multiple editors to collaborate on a project. For instance, an editor might want to extract a copy of a segment (Version 1) and send that segment to a second editor. The second editor can then work on the segment (add or remove clips, modify transitions, etc.) in order to create a new version of that segment (Version 2). The editors (or another editor) can then determine which version of the segment to use in the final presentation.

C. Applying an Effect to an Entire Segment

The uses for segments described above in subsections A and B involved various ways of creating different versions of a composite media presentation. Another use for segments in the editing process is enabling some effects to be applied to all clips in a segment but not to clips outside the segment. This concept is illustrated above for an edit in FIG. 46, in which a ripple edit is contained within a segment and does not affect other clips. Ripple edits, though, normally affect all clips after the edited clip, although the out point modification is only applied to the edited clip. Effects, though, are normally applied to only affect one clip. However, a user might want the effect to instead affects all clips in the segment. Examples of such effects include color correction, blurring, audio effects (e.g., volume changes), etc.

Figure 63:
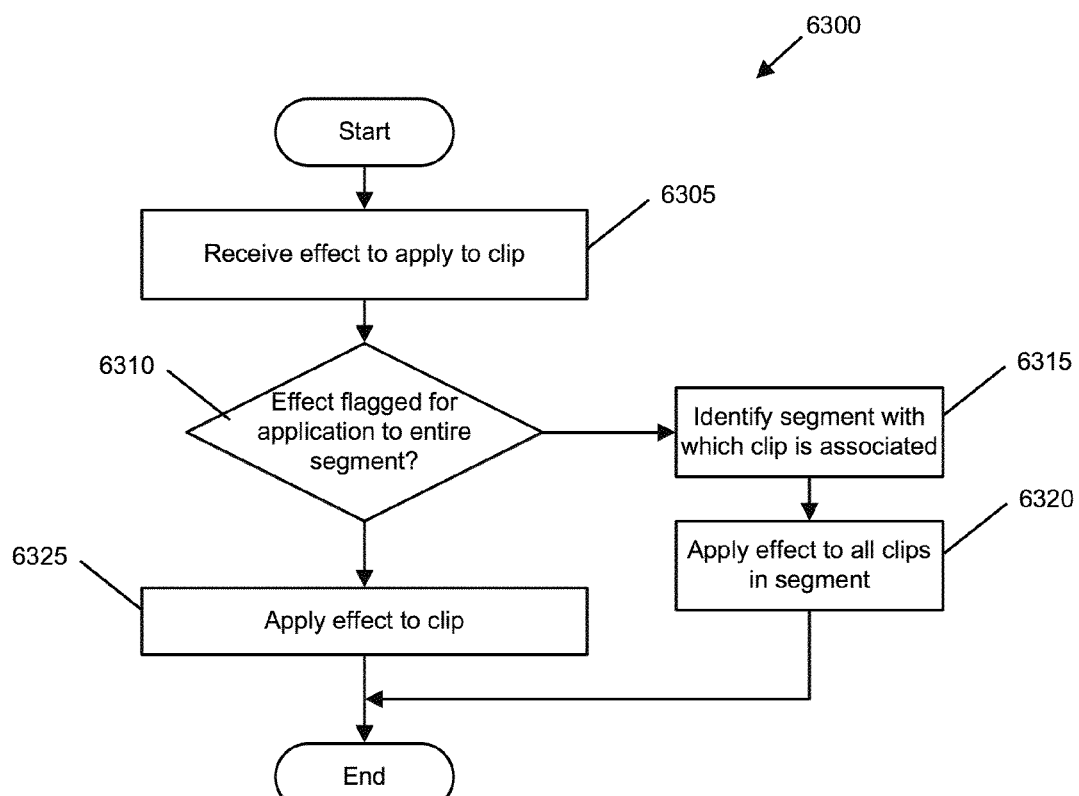
FIG. 63 conceptually illustrates a process of some embodiments for applying an edit to either a single clip or an entire segment.

FIG. 63 conceptually illustrates a process 6300 of some embodiments for applying an effect to either a single clip or an entire segment. Process 6300 begins by receiving (at 6305) an effect to apply to a clip. Such effects include color gradient modifications, transitions (e.g., fade out, cross-dissolve, etc.), audio adjustments, etc.

The process then determines (at 6310) whether the effect is flagged for application to the entire segment that contains the clip. In some embodiments, a user can set particular effects to apply to an entire segment. This can be done either at the time the effect is applied or as a default for the effect. For instance, when an effect that could apply to an entire segment is applied, some embodiments provide an option (e.g., as a popup or in similar fashion) for application to the entire segment. In other embodiments, such an option is accessed by a keystroke or set of keystrokes as the user applies the effect.

When the effect is not flagged for application to the entire segment, the process applies (at 6315) the effect to the clip, then ends. In some cases, the effect is not flagged for application to the entire segment because the user chooses to only apply the effect to the single clip. In other cases, though, the effect is one that cannot be applied to more than one segment (or a segment and its neighbors). However, most effects are of the sort that a user might want to apply to all clips in a segment (i.e., to give that segment a particular look and/or sound) or might want to apply to only one clip.

When the effect is flagged for application to the entire segment, the process identifies (at 6320) any segments with which the affected clip is associated. In most cases, a clip is only associated with one segment. However, as illustrated in FIG. 5, clips can be associated with multiple segments, and some embodiments apply the effect to all clips in all such segments. Process 6300 then applies (at 6325) the effect to all clips in the segment, and ends.

D. Copying and Pasting Segments

Figure 64:
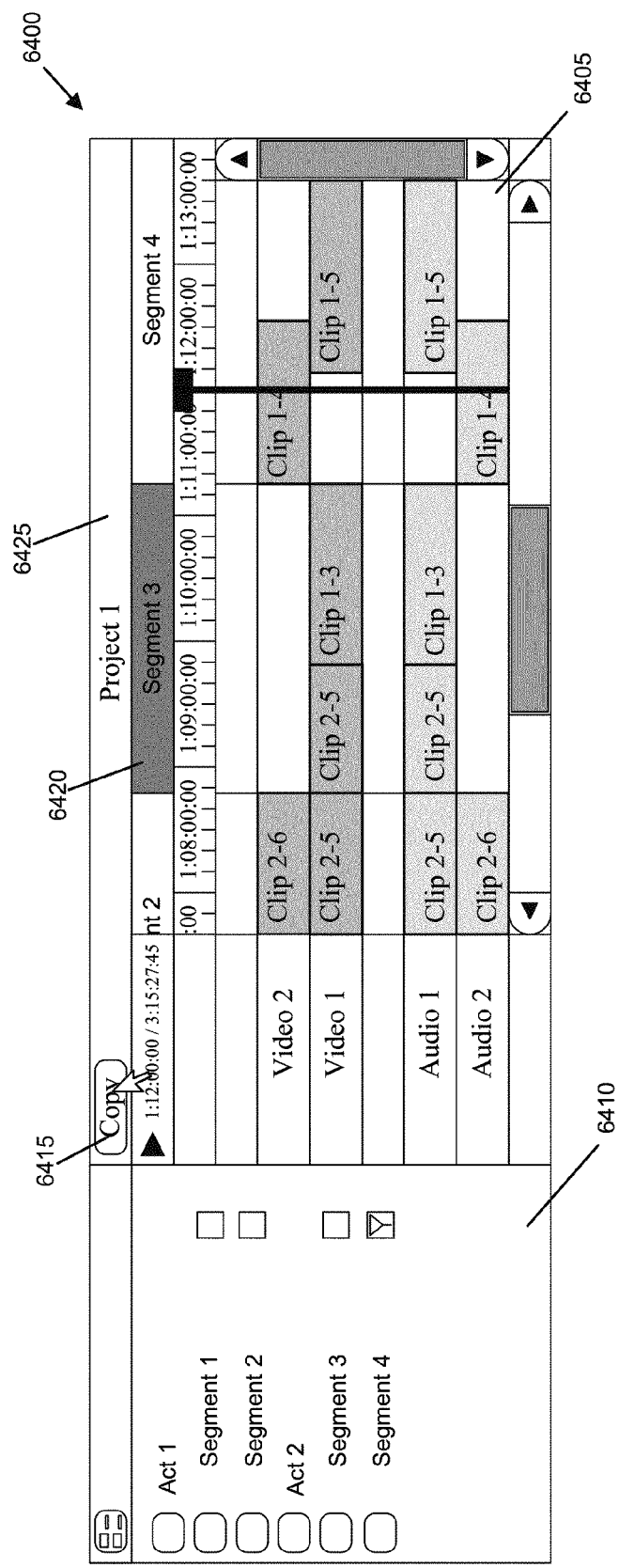
FIG. 64 illustrates a GUI with a UI item for copying a segment.

Along the line of moving (rearranging) segments, creating new segments, etc., some embodiments allow users to copy and paste segments of a composite media presentation. FIG. 64 illustrates a GUI 6400 that includes a UI item 6415 for copying a segment. GUI 6400 includes a composite display area 6405 and an outline window 6410 that include many features similar to those of the display areas in GUI 1300.

In composite display area 6405, the segment header 6420 for Segment 3 is highlighted, indicating that Segment 3 is presently selected. Composite display area 6405 also includes a timeline header 6425 for the present timeline, "Project 1". In addition, composite display area 6405 includes UI item 6415 for copying a selected segment. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. Yet other embodiments allow the user to access the segment copy feature through multiple different UI items, including those not mentioned in the above paragraph.

When a user selects UI item 6415, nothing changes visually in some embodiments, but the selected segment or segments are copied to a temporary storage (i.e., a clipboard). The user can then paste the copied segment into another timeline or elsewhere in the same timeline. While the UI item 6415 is illustrated as part of the composite display area, one of ordinary skill in the art will recognize that segments could just as easily be copied using the outline window as well. In some embodiments, a user can select a segment item in the outline window and select a segment copy UI item in order to copy the segment into the clipboard.

Figure 65:
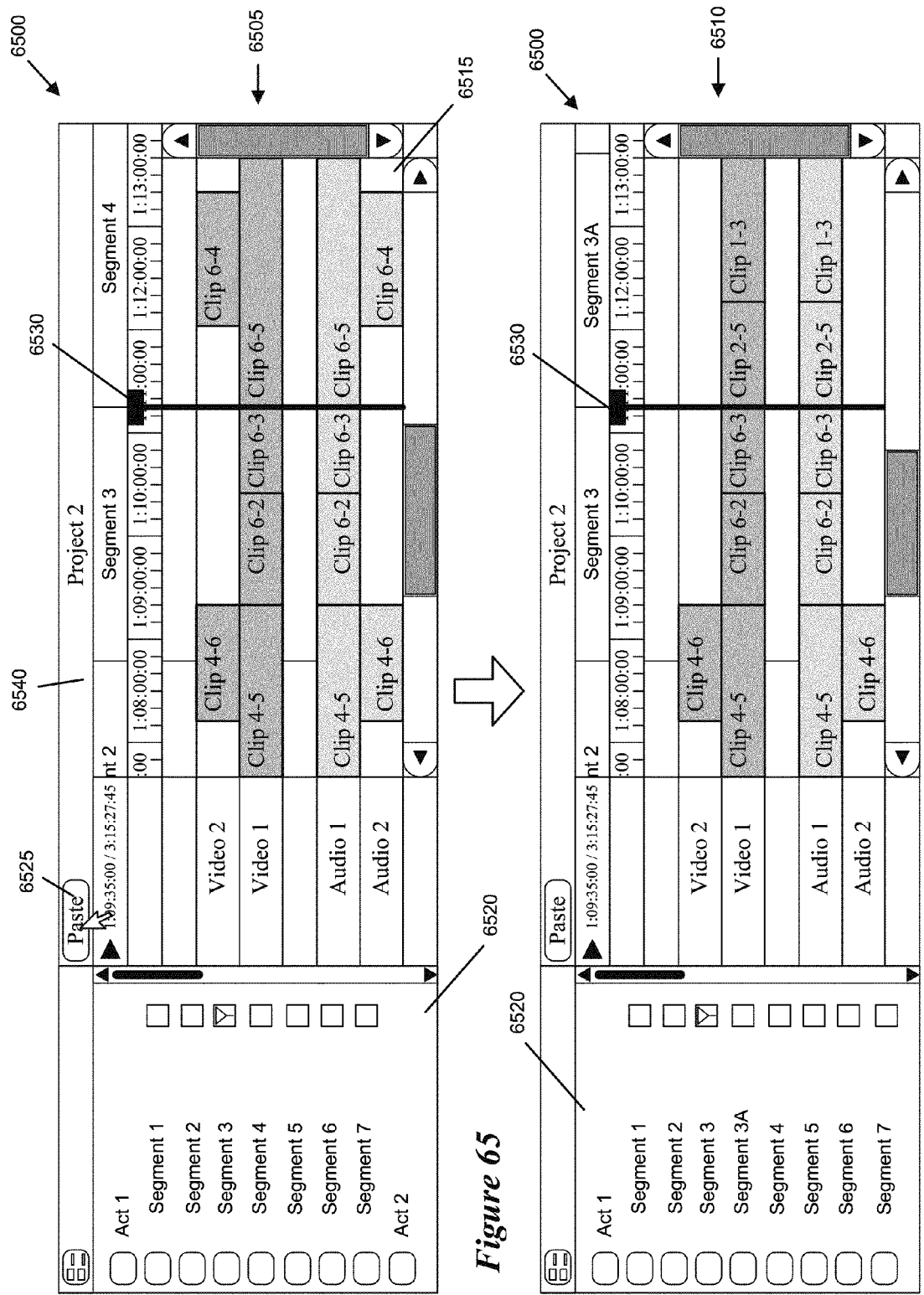
FIG. 65 illustrates the use of a paste feature that inserts a previously copied segment into a timeline.

FIG. 65 illustrates the use of a paste feature that inserts a previously copied segment into a timeline. Specifically, FIG. 65 illustrates a GUI 6500 in two stages, a first stage 6505 before the use of the paste feature and a second stage 6510 after the use of the paste feature. GUI 6500 is similar to GUI 6400, having a composite display area 6515 and an outline window 6520. The composite display area 6515 includes playhead 6530 that is at the boundary between Segment 3 and Segment 4. The composite display area also includes a timeline header 6540 for the present timeline, "Project 2".

The composite display area 6515 also includes a UI item 6525 for inserting a copied segment. Different embodiments of the invention implement the UI item differently. Some embodiments implement it as a UI button, others as a command that can be selected in a pull-down menu, drop-down menu, contextual menu that appears from a right-click, or other type of menu, and still others as a command invoked through one or more keystroke operations. Yet other embodiments allow the user to access the paste feature through multiple different UI items, including those not mentioned in the above paragraph.

The first stage 6505 illustrates that a cursor 6535 is located over the UI item 6525. Stage 6510 illustrates the result of the user selecting the UI item 6525 to paste a previously selected segment at the location of the playhead 6530. The pasted segment is Segment 3, copied from the "Project 1" timeline of FIG. 64. In addition to inserting Segment 3 and its clips, a segment item for the inserted segment is now located in outline window 6520 in the appropriate order. In some embodiments, the media-editing application will attempt to preserve the segment name, especially if it is a user-defined descriptive scene name. In some embodiments, the clips associated with a segment but not actually part of the media presentation (i.e., the clips displayed in the media browser when the segment is selected in the browser navigation pane) are also brought with the segment when the segment is copied.

In the case illustrated in FIG. 65, the copied segment is inserted at the location of the playhead. One of ordinary skill will recognize that the various options available for inserting a new segment, described above in Section III, will also be available in some embodiments for inserting a copied segment. Thus, the copied segment could be inserted before or after a segment in which the playhead is located or assigned selected in the outline window as well.

E. Using a Timeline as a Media Clip in Another Timeline

Similar to copying and pasting a segment, in some embodiments a user can paste an entire first timeline (sometimes referred to as a sequence) into another timeline. In some embodiments, the first timeline is treated as a media clip in the second timeline. If the first timeline is divided into segments, then the segment boundaries are preserved in the clip as trim boundaries in some embodiments. That is, when a user performs a trim edit on the sequence/clip, the edit will automatically snap to the preserved segment boundaries.

Figure 66:
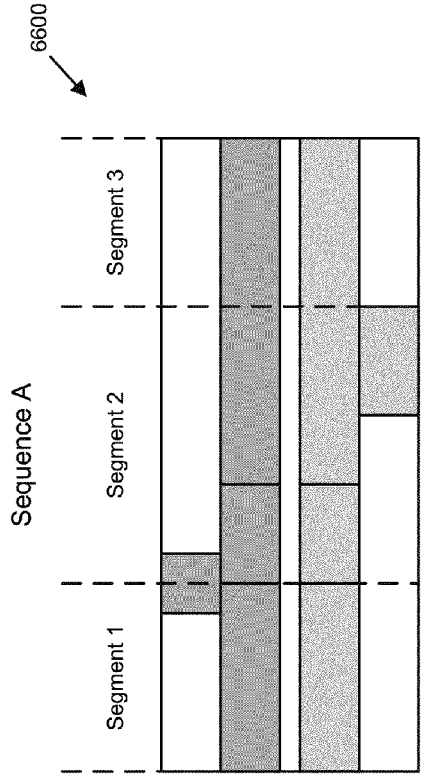
FIG. 66 illustrates a sequence that is divided into three segments.
Figure 67:
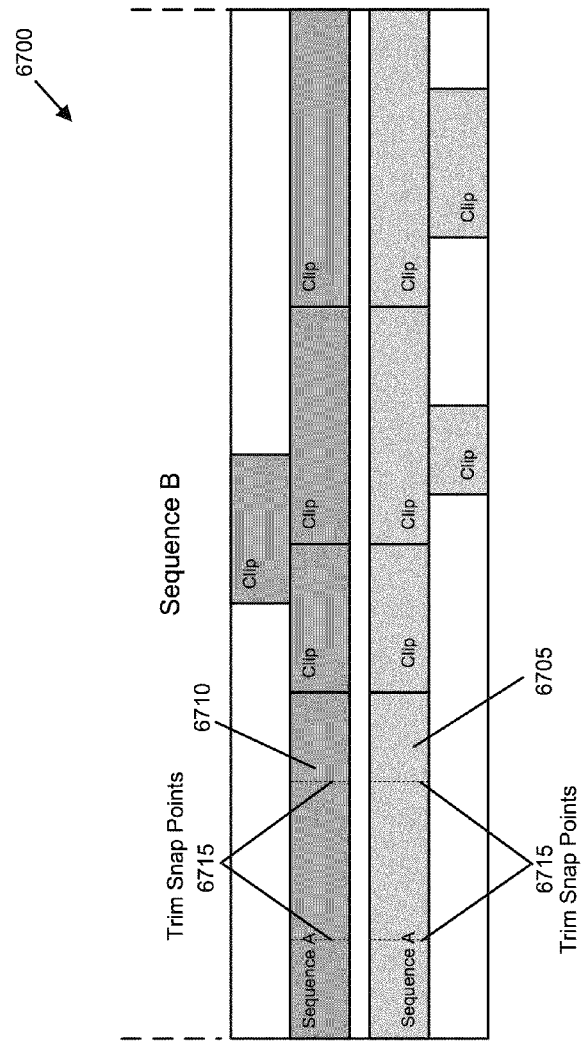
FIG. 67 illustrates a second sequence that includes the first sequence as a clip.

FIG. 66 illustrates a sequence 6600 that is divided into three segments. These segments need not necessarily correspond to the boundaries of the clips that are contained within the sequence. As mentioned, the sequence 6600 can be pasted into another sequence as a clip in some embodiments. In some embodiments, the sequence is actually pasted as two clips—an audio clip and a video clip. FIG. 67 illustrates a sequence 6700 that includes a number of clips. These clips include the audio section 6705 and the video section 6710 of sequence 6600. FIG. 67 also illustrates that the sequence 6600 as a clip includes trim snap points 6715 at the locations that correspond to the segment boundaries of the sequence. Some embodiments display the trim snap points in the composite display area, some only display the trim snap points while the user is performing a trim edit that affects the clip/sequence, and others do not display the trim snap points at all.

Trim edits, in some embodiments, include (1) ripple edits that modify the out point of a clip (see, for example, FIG. 46 above), (2) slide edits that move a clip in the timeline while modifying the out point of a clip prior to the moved clip and the in point of a clip after the selected clip, (3) slip edits that do not modify a clip's location or duration in the timeline, but do modify its in and out points, and (4) roll edits that move a boundary between two clips such that the out point of the first clip and the in point of the second clip (and their durations) change. When applying these trim edits to modify the in and out points for the sequence 6600 as a clip, some embodiments automatically snap to the segment boundaries (trim snap points 6715) as in or out points for the clip when the in or out point is moved close enough (i.e., within a particular threshold of) to the segment boundary.

F. Timeline Libraries

Some embodiments of the media-editing application include stored libraries of preconfigured sequences. The sequences in these libraries are divided ahead of time into one or more segments. When a user wants to begin a project, the user can open the library (e.g., from a drop-down menu, through keyboard input, etc.) to display a list of the different preconfigured sequences. When the user chooses a sequence, that sequence is displayed in the composite display area and the list of segments and supersegments is displayed in the outline window in some embodiments.

Examples of uses of the timeline include sequences with preset durations for the segments and sequences with segments defining a common story arc. For example, preconfigured sequences could be available for half-hour and one hour television programs. Such preconfigured sequences have fixed-duration segments to mandate the time between commercial breaks. As another example, a preconfigured sequence might have non-fixed-duration segments for various common plot segments—exposition, conflict, climax, etc. Some embodiments also allow users to define and save their own sequences to the library.

The above description lists a wide variety of ways that segments can be used to aid the media editing process: rearranging segments, copying and pasting segments, deleting segments, applying operations to entire segments, creating different versions of a presentation, etc. However, one of ordinary skill in the art will recognize that the above description is not exhaustive of all the possible ways that segments could be used for editing a composite media presentation. For instance, editors often create each scene in a media-editing application as a separate timeline, then paste the scenes into a master timeline. However, this creates a problem in that it is very difficult to move the scenes around after creating the master timeline. Using segments, the user can either create one timeline from the beginning and segment the timeline into scenes, or create a new segment for the master timeline for each scene as the scene is pasted in. In either case, changing the order of the scenes at a late stage of production is no longer an especially difficult procedure.

VIII. Software Architecture

Figure 68:
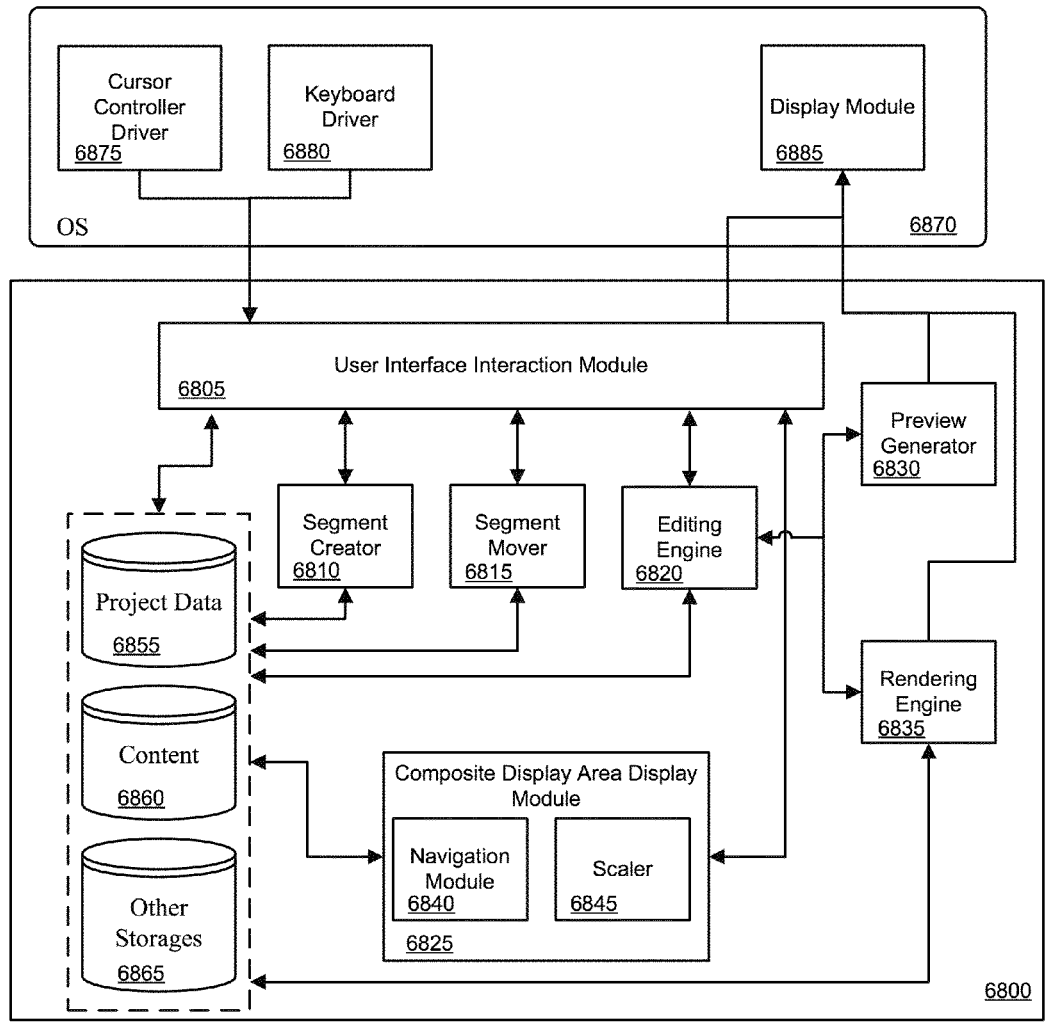
FIG. 68 conceptually illustrates the software architecture of a media-editing application of some embodiments.

In some embodiments, the processes described above are implemented as software running on a particular machine, such as a computer or a handheld device, or stored in a computer readable medium. FIG. 68 conceptually illustrates the software architecture of a media-editing application 6800 of some embodiments. In some embodiments, the media-editing application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

Media-editing application 6800 includes a user interface (UI) interaction module 6805, a segment creator 6810, a segment mover 6815, an editing engine 6820, a composite display area display module 6825, a preview generator 6830, and a rendering engine 6835. The media-editing application also includes project data storage 6855, content storage 6860, and other storages 6865. In some embodiments, the project data storage 6855 stores data about a composite media presentation, such as in and out points for media clips, information about transitions between media clips, etc. The project data storage 6855 also stores data about segments in some embodiments, such as the start and end times for segments, associations between content and segments, associations between segments and supersegments, segment properties (e.g., whether to render the segment, whether the segment has multiple versions, etc.), and other such segment-related information. Content storage 6860 includes the media clips that are used by the media-editing application to create a composite presentation. In some embodiments, storages 6855, 6860, and 6865 are all one physical storage. In other embodiments, the storages are in separate physical storages, or two of the storages are in one physical storage while other storages are in a different physical storage.

FIG. 68 also illustrates an operating system 6870 that includes cursor controller driver 6875, keyboard driver 6880, and display module 6885. In some embodiments, as illustrated, the cursor controller driver 6875, keyboard driver 6880, and display module 6885 are part of the operating system 6870 even when the media-editing application 6800 is an application separate from the operating system.

A user interacts with the user interface via input devices (not shown). The input devices, such as cursor controllers (mouse, tablet, touchpad, etc.) and keyboards, send signals to the cursor controller driver 6855 and keyboard driver 6860, which translate those signals into user input data that is provided to the UI interaction module 6805.

The present application describes a graphical user interface that provides users with numerous ways to perform different sets of operations and functionalities. In some embodiments, these operations and functionalities are performed based on different commands that are received from users through different input devices (e.g., keyboard, trackpad, touchpad, mouse, etc.). For example, the present application describes the use of a cursor in the graphical user interface to control (e.g., select, move) objects in the graphical user interface. However, in some embodiments, objects in the graphical user interface can also be controlled or manipulated through other controls, such as touch control. In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

The UI interaction module 6805 interprets the user input data and passes it to various modules, including the segment creator 6810, the segment mover 6815, the editing engine 6820, and the composite display area display module 6825. In some embodiments, the input data directly affects the project data or other data stored in the storages 6855-6865. For instance, when a user modifies a segment property (e.g., whether the segment should be rendered), this is directly modified in the project data 6855 in some embodiments.

The UI interaction module 6805 also manages the display of the UI, and outputs display information to the display module 6885. This display information may be based on information from the storages, the various modules 6810-6825, or directly from input data (e.g., when a user moves an item in the UI that does not affect the presentation) in some embodiments.

Segment creator 6810 receives information from the UI interaction module 6805. When the input indicates to create a new segment, the segment creator 6810 uses any necessary information from the project data 6855 (segment information, clip association and location information, etc.) as well as any other required information (e.g., the location of the playhead in the timeline) to create a new segment according to the instructions. In some embodiments, the segment creator also re-associates any affected clips in the timeline as necessary, and stores association and segment information in the project data storage 6855.

Similarly, segment mover 6815 receives information from the UI interaction module 6805. When the input indicates to move a segment from one location in the timeline to another, the segment mover 6815 uses any necessary information from the project data 6855 (segment information, clip association and location information, etc.) as well as any required input information (whether the selection is inclusive, exclusive, or razored, how to treat any overlapping clips, etc.) to move the segment according to the instructions. In some embodiments, the segment mover 6815 also re-associates any affected clips in the timeline as necessary and re-associates the moved segment with a supersegment as necessary. The segment mover stores the association and segment information in the project data storage 6855.

The editing engine 6820 also receives information from the UI interaction module 6805. The editing engine 6820 performs a variety of editing functions in some embodiments according to these instructions, such as standard edits unrelated to segments, modifying segment duration, applying edits to entire segments, etc. To perform some of these functions, the editing engine uses data from the project data 6855 and stores the result of the edits in the project data as well. The editing engine also redefines any associations between clips and segments as required. The editing engine is also responsible for passing information to the preview generator 6830 and rendering engine 6835 to create the composite presentation.

In some embodiments, application 6800 also includes an association module that performs re-association for the segment creator 6810, the segment mover 6815, and the editing engine 6820 based on actions taken by those modules. The association module then stores the new association data in the project data 6855.

Composite display area display module 6825 manages the display of the composite display area of the GUI of the editing application based on input received through the UI interaction module 6805. The composite display area display module 6825 includes the navigation module 6840 and the scaler 6845.

Navigation module 6840 handles the navigation of the timeline in the composite display area. For instance, when a user uses a scroll bar to scroll through the timeline, this is managed by the navigation module. The navigation module also receives input through the story outline to jump to a particular segment. When this information is received, navigation module 6840 calculates the animation to move to the particular segment and passes the display information to the UI interaction module 6805.

Scaler 6845 performs scaling of the timeline and clip shapes in the composite display area. For example, when input is received to focus on a particular segment or group of segments, the scaler 6845 calculates the appropriate scaling in order to properly display the segments. The display information is then passed to the UI interaction module 6805.

Preview generator 6830 enables the output of audio and video from the media-editing application so that a user can preview the composite presentation. The preview generator 6830, based on information from the editing module 6820 (and, in some embodiments, other modules), sends information about how to display each pixel of a presentation to the display module 6885.

Rendering engine 6835 enables the storage or output of audio and video from the media-editing application 6800. Rendering engine 6835 receives data from the editing engine 6820 and, in some embodiments creates a composite media presentation from source files in the content storage 6860. The composite media presentation can be stored in the storages or output to the display module 6885.

While many of the features have been described as being performed by one module (e.g., the segment creator 6810 or segment mover 6815), one of ordinary skill would recognize that the functions might be split up into multiple modules, and the performance of one feature might even require multiple modules.

IX. Process for Defining a Media-Editing Application

Figure 69:
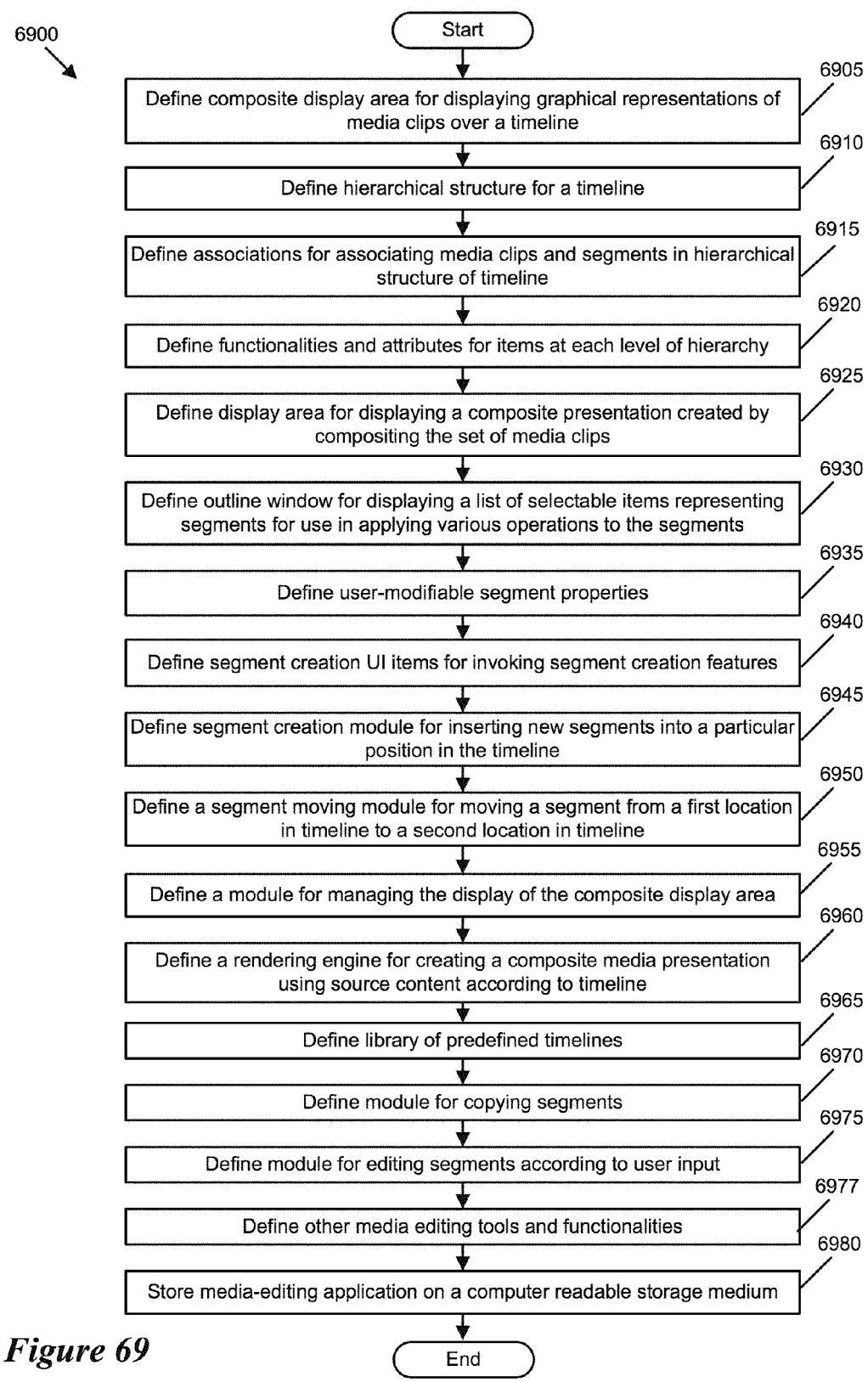
FIG. 69 conceptually illustrates a process of some embodiments for manufacturing a computer readable medium that stores a computer program.

FIG. 69 conceptually illustrates a process 6900 of some embodiments for manufacturing a computer readable medium that stores a media-editing application such as the application 6800 described above. In some embodiments, the computer readable medium is a distributable CD-ROM. As shown, process 6900 begins by defining (at 6905) a composite display area for displaying graphical representations of media clips over a timeline. For instance, the composite display areas 220 and 810 of FIGS. 2 and 8 are examples of the defined composite display area. The process next defines (at 6910) a hierarchical structure for a timeline. For example, the structures illustrated in timeline 400 are such structures. Process 6900 then defines (at 6915) associations for associating media clips and segments in the hierarchical structure of a timeline, such as the associations illustrated in FIG. 5. Process 6900 then defines (at 6920) functionalities and attributes for items at each level of the hierarchy, such as the functionalities 725-735 of FIG. 7.

The process next defines (at 6925) a display area for displaying a composite presentation created by compositing the set of media clips. The preview display areas 805 and 1005 of FIG. 8 and FIG. 10 are examples of such display areas. Process 6900 then defines (at 6930) an outline window for displaying a list of selectable items representing segments for use in applying various operations to the segments. Outline windows 815 and 915 of FIG. 8 and FIG. 9 are examples of such windows. The process then defines (at 6935) user-modifiable segment properties, such as whether to include the segment in rendering, whether the duration of the segment is fixed, etc.

The process next defines (at 6940) segment creation UI items for invoking segment creation features, such as items 1325-1340 of FIG. 13. Next, the process defines (at 6945) a segment creation module for inserting new segments into a particular position in the timeline. Segment creator 6810 is an example of such a module. The process defines (at 6950) a segment moving module for moving a segment from a first location in a timeline to a second location in the timeline, such as segment mover 6815.

Next, the process defines (at 6955) a module for managing the display of the composite display area. Composite display area display module 6825, that manages navigating the composite display area and scaling items in the composite display area, is one such module. The process then defines (at 6960) a rendering engine for creating a composite media presentation using source content according to a timeline, such as rendering engine 6835. The process defines (at 6965) a library of predefined timelines, defines (at 6970) a module for copying segments, and defines (at 6975) a module for editing segments according to user input. Editing engine 6825 is an example of the latter.

The process then defines (at 6977) other media editing tools and functionalities. Examples of such editing tools may include zoom, color enhancement, blemish removal, audio mixing, trim tools, etc. In addition, various other media editing functionalities may be defined. Such functionalities may include library functions, format conversion functions, etc. The process defines these additional tools in order to create a media editing application that has many additional features to the features described above.

Figure 70:
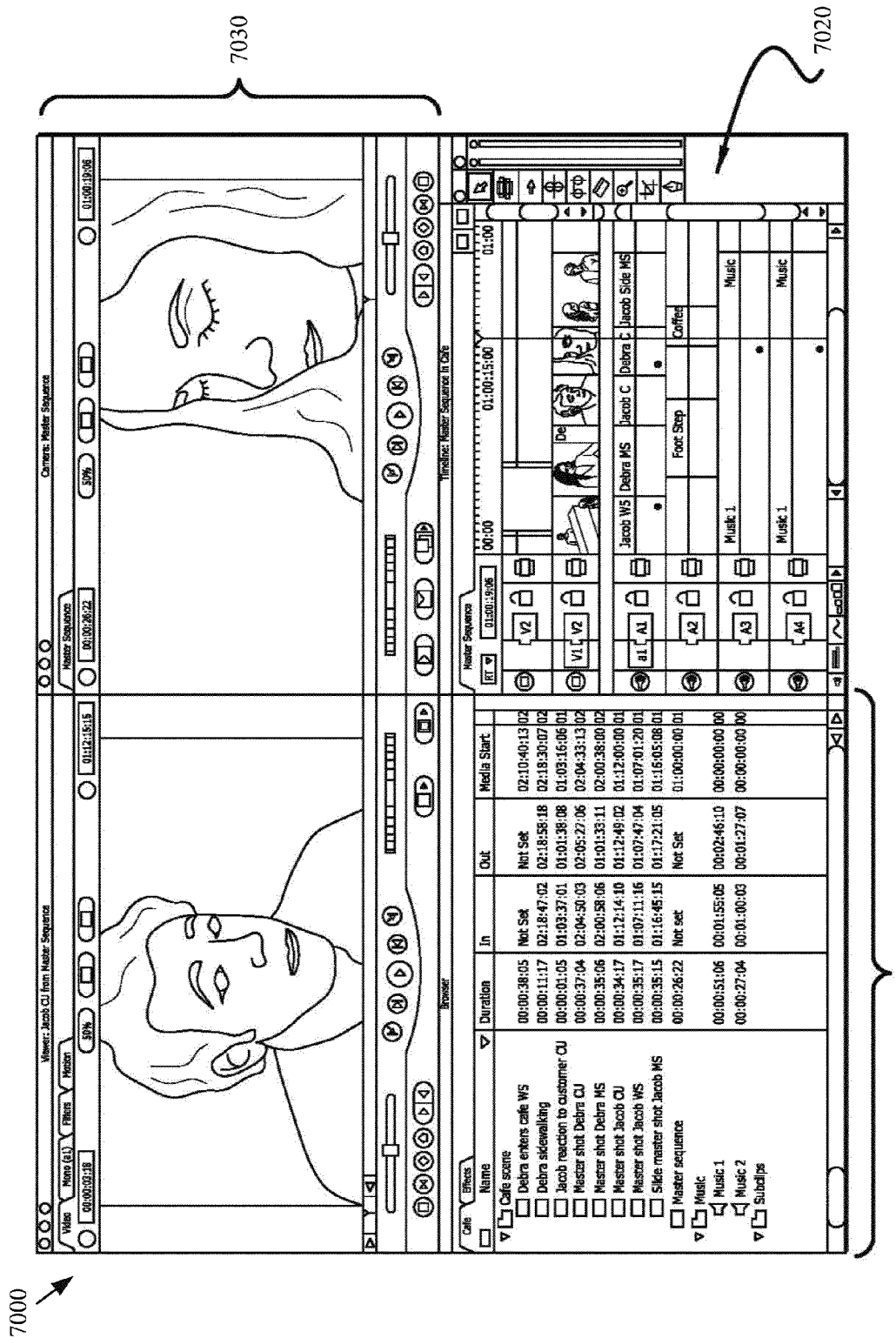
FIG. 70 illustrates an alternative GUI of the media editing application of some embodiments.

A more detailed view of a media editing application with these additional features is illustrated in FIG. 70. Specifically, this figure shows a media editing application with these additional tools. FIG. 70 illustrates a list of video and/or audio clips 7010, video editing tools 7020, and video displays 7030. The list of clips 7010 includes video clips along with metadata (e.g., timecode information) about the video clips. In some embodiments, the list of video clips is the list of video clips in a particular sequence of video clips, and the metadata specifies in and out points, durations, etc. for the video clips.

The video editing tools 7020 include tools that allow a user to graphically set in and out points for video clips (in other words, where in the final product a specific clip or part of a clip will be shown). The video editing tools 7020 can be used to modify the temporal sequence of the video frame and to synchronize audio tracks with video tracks (e.g., in order to add music over a video clip). In some embodiments, video editing tools 7020 also give users the ability to edit in effects or perform other video editing functions. In some embodiments, the video editing tools include trim tools for performing edits such as slide edits, ripple edits, slip edits, roll edits, etc.

Video displays 7030 allow a user to watch multiple video clips at once, thereby enabling easier selection of in and out points for the video clips. The screen shot 7000 illustrates a few of many different editing tools that a video editing application of some embodiments may have to edit digital video.

In some cases, some or all of the video clips that are displayed in the list of clips 7010, played in displays 7030, and edited by a user with video editing tools 7020, are video clips of real-world objects (e.g., people, landscapes, etc.) filmed by a camera and include real-world audio (e.g., conversations, real-world noises, etc.) recorded by a camera, microphone, etc. In some cases, some or all of the video clips are computer-generated animations or include computer generated animations (e.g., animated objects, computer-generated effects, etc.).

Returning to FIG. 69, process 6900 next stores (at 6980) the defined media-editing application on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium.

One of ordinary skill in the art will recognize that the various elements defined by process 6900 are not exhaustive of the modules, rules, processes, and UI items that could be defined and stored on a computer readable storage medium for a media editing application incorporating some embodiments of the invention. In addition, the process 6900 is a conceptual process, and the actual implementations may vary. For example, different embodiments may define the various elements in a different order, may define several elements in one operation, may decompose the definition of a single element into multiple operations, etc. In addition, the process 6900 may be implemented as several sub-processes or combined with other operations within a macro-process.

X. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 71:
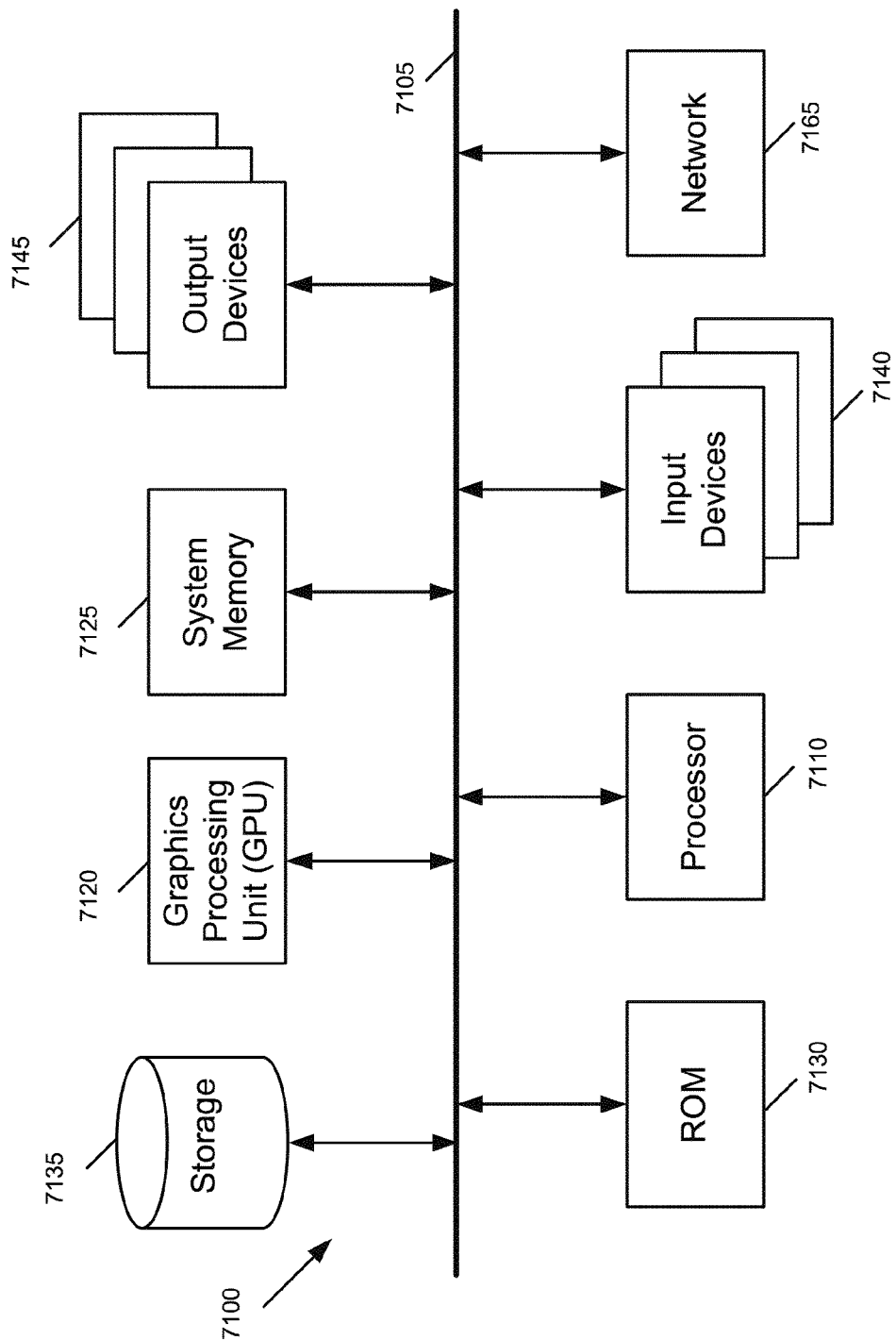
FIG. 71 illustrates a computer system with which some embodiments of the invention are implemented.

FIG. 71 illustrates a computer system with which some embodiments of the invention are implemented. Such a computer system includes various types of computer readable media and interfaces for various other types of computer readable media. Computer system 7100 includes a bus 7105, a processor 7110, a graphics processing unit (GPU) 7120, a system memory 7125, a read-only memory 7130, a permanent storage device 7135, input devices 7140, and output devices 7145.

The bus 7105 collectively represents all system, peripheral, and chipset buses that communicatively connect the numerous internal devices of the computer system 7100. For instance, the bus 7105 communicatively connects the processor 7110 with the read-only memory 7130, the GPU 7120, the system memory 7125, and the permanent storage device 7135.

From these various memory units, the processor 7110 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 7120. The GPU 7120 can offload various computations or complement the image processing provided by the processor 7110. In some embodiments, such functionality can be provided using CoreImage's kernel shading language.

The read-only-memory (ROM) 7130 stores static data and instructions that are needed by the processor 7110 and other modules of the computer system. The permanent storage device 7135, on the other hand, is a read-and-write memory device. This device is a non-volatile memory unit that stores instructions and data even when the computer system 7100 is off. Some embodiments of the invention use a mass-storage device (such as a magnetic or optical disk and its corresponding disk drive) as the permanent storage device 7135.

Other embodiments use a removable storage device (such as a floppy disk, flash drive, or ZIP® disk, and its corresponding disk drive) as the permanent storage device. Like the permanent storage device 7135, the system memory 7125 is a read-and-write memory device. However, unlike storage device 7135, the system memory is a volatile read-and-write memory, such a random access memory. The system memory stores some of the instructions and data that the processor needs at runtime. In some embodiments, the invention's processes are stored in the system memory 7125, the permanent storage device 7135, and/or the read-only memory 7130. For example, the various memory units include instructions for processing multimedia items in accordance with some embodiments. From these various memory units, the processor 7110 retrieves instructions to execute and data to process in order to execute the processes of some embodiments.

The bus 7105 also connects to the input and output devices 7140 and 7145. The input devices enable the user to communicate information and select commands to the computer system. The input devices 7140 include alphanumeric keyboards and pointing devices (also called "cursor control devices"). The output devices 7145 display images generated by the computer system. The output devices include printers and display devices, such as cathode ray tubes (CRT) or liquid crystal displays (LCD).

Finally, as shown in FIG. 71, bus 7105 also couples computer 7100 to a network 7165 through a network adapter (not shown). In this manner, the computer can be a part of a network of computers (such as a local area network ("LAN"), a wide area network ("WAN"), or an Intranet, or a network of networks, such as the internet. Any or all components of computer system 7100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For example, many of the media editing application GUIs illustrated in the figures show only a composite display area and a story outline. One of ordinary skill in the art will understand that the features illustrated in these figures may be incorporated into a more complete media editing GUI such as is illustrated in FIG. 8-10 or 70.

In addition, a number of the figures (including FIGS. 6, 21, 22, 42, 48, 49, 52, 56, 59, and 69) conceptually illustrate processes. The specific operations of these processes may not be performed in the exact order shown and described. the specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for defining a media-editing application, the method comprising:
    defining a hierarchical structure for a timeline that includes pieces of content, the hierarchical structure comprising at least two levels of hierarchy;
    defining items at each level of the hierarchy, the items at the lowest level of the hierarchy for representing the pieces of content and the items at each of the other levels for representing segments of time in the timeline; and
    defining associations for associating items at the lowest level of the hierarchy with items representing segments of time at a higher level of the hierarch such that a first segment of time is associated with a plurality of pieces of content at least two of which do not overlap in the timeline, wherein when a boundary of the first segment of time in the timeline is not shared with boundaries of any of the plurality of pieces of content with which the first segment of time is associated, at least one of the plurality of pieces of content is associated with the first segment of time in addition to a second, different segment of time.

2. The method of claim 1, wherein each of a plurality of items at the lowest level is for associating with exactly one item at the second lowest level.

3. The method of claim 1, wherein the pieces of content comprise media clips.

4. The method of claim 3, wherein the pieces of content comprise audio clips.

5. The method of claim 3, wherein the pieces of content comprise video clips.

6. The method of claim 1, wherein the timeline is a timeline of a composite media presentation.

7. The method of claim 6, wherein the items at the lowest level of the hierarchy are editable to edit the composite media presentation.

8. The method of claim 6, wherein the time segment items of at least one of the levels above the items are editable to edit the composite media presentation.

9. A non-transitory machine-readable medium storing a program for execution by at least one processing unit, the program for defining a media-editing application, the program comprising sets of instructions for:
    defining a hierarchical structure for a timeline that includes pieces of content, the hierarchical structure comprising at least two levels of hierarchy;
    defining items at each level of the hierarchy, the items at the lowest level of the hierarchy for representing the pieces of content and the items at each of the other levels for representing segments of time in the timeline; and
    defining associations for associating items at the lowest level of the hierarchy with items representing segments of time at a higher level of the hierarch such that a first segment of time is associated with a plurality of pieces of content and the plurality of pieces of content do not overlap in the timeline, wherein when a boundary of the first segment of time in the timeline is not shared with boundaries of any of the plurality of pieces of content with which the first segment of time is associated, at least one of the plurality of pieces of content is associated with the first segment of time in addition to a second, different segment of time.

10. The non-transitory machine-readable medium of claim 9, wherein each of a plurality of items at the lowest level is for associating with exactly one item at the second lowest level.

11. The non-transitory machine-readable medium of claim 9, wherein the pieces of content comprise media clips.

12. The non-transitory machine-readable medium of claim 11, wherein the pieces of content comprise audio clips.

13. The non-transitory machine-readable medium of claim 11, wherein the pieces of content comprise video clips.

14. The non-transitory machine-readable medium of claim 9, wherein the timeline is a timeline of a composite media presentation.

* * * * *